US011181875B2

(12) United States Patent
Kummer et al.

(10) Patent No.: US 11,181,875 B2
(45) Date of Patent: Nov. 23, 2021

(54) SYSTEMS AND METHODS FOR MONITORING AND CONTROLLING A CENTRAL PLANT

(71) Applicant: Johnson Controls Technology Company, Plymouth, MI (US)

(72) Inventors: James P. Kummer, Wales, WI (US); Matthew J. Asmus, Watertown, WI (US); Michael J. Wenzel, Grafton, WI (US); Carol T. Tumey, Wauwatosa, WI (US); Lisa E. Strand, Wauwatosa, WI (US); Dennis J. Flood, Milwaukee, WI (US); Nicole A. Madison, Milwaukee, WI (US); Peter A. Kinsella, Elkhorn, WI (US); Joseph P. Carmody, Saukville, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 133 days.

(21) Appl. No.: 15/387,512

(22) Filed: Dec. 21, 2016

(65) Prior Publication Data

US 2017/0212488 A1 Jul. 27, 2017

Related U.S. Application Data

(60) Provisional application No. 62/286,287, filed on Jan. 22, 2016.

(51) Int. Cl.
*G05B 19/042* (2006.01)

(52) U.S. Cl.
CPC .. *G05B 19/042* (2013.01); *G05B 2219/25011* (2013.01)

(58) Field of Classification Search
CPC ........ G05B 19/042; G05B 2219/25011; G05B 15/02; G05B 19/41865;
(Continued)

(56) References Cited

U.S. PATENT DOCUMENTS 6,220,223 B1 * 4/2001 Weisman, II ......... F02D 41/222 123/436
7,580,775 B2 8/2009 Kulyk et al.
(Continued)

FOREIGN PATENT DOCUMENTS

CN 101072629 11/2007
CN 201827989 5/2011
(Continued)

OTHER PUBLICATIONS

U.S. Appl. No. 14/815,845, filed Jul. 31, 2015, Johnson Controls Technology Company.
(Continued)

*Primary Examiner* — M. N. Von Buhr
(74) *Attorney, Agent, or Firm* — Foley & Lardner LLP

(57) ABSTRACT

A system for monitoring and controlling a central plant includes a high level optimizer, a subplant monitor, a user interface, and a dispatch graphical user interface (GUI) generator. The central plant includes a plurality of subplants configured to serve a thermal energy load. The high level optimizer is configured to determine recommended subplant loads for each of the plurality of subplants. The subplant monitor is configured to monitor the central plant and identify actual subplant loads for each of the plurality of subplants. The user interface is configured to receive manual subplant loads specified by a user. The dispatch GUI generator is configured to generate a dispatch GUI and present the dispatch GUI via the user interface. The dispatch GUI includes the recommended subplant loads, the actual subplant loads, and the manual subplant loads.

20 Claims, 24 Drawing Sheets

(58) Field of Classification Search
CPC . G05B 2219/32252; F24F 11/30; F24F 11/46; F24F 11/47; F24F 11/52; F24F 11/54; F24F 11/58; F24F 11/62; F24F 2110/10; F24F 2110/20; F24F 2110/40; F24F 2221/54; F24F 2140/50; G06F 3/04847; F28F 27/00; Y02P 80/114
See application file for complete search history.

(56) References Cited

U.S. PATENT DOCUMENTS 7,894,946 B2 2/2011 Kulyk et al.
8,527,108 B2 9/2013 Kulyk et al.
8,527,109 B2 9/2013 Kulyk et al.
8,762,942 B2 6/2014 Langworthy et al.
8,903,554 B2 12/2014 Stagner
8,918,223 B2 12/2014 Kulyk et al.
9,110,647 B2 8/2015 Kulyk et al.
9,429,923 B2 8/2016 Ward et al.
9,623,562 B1 * 4/2017 Watts ..................... B25J 9/1689
9,703,339 B2 7/2017 Kulyk et al.
10,139,877 B2 11/2018 Kulyk et al.
2003/0105984 A1 * 6/2003 Masuyama ............... G06F 1/26 713/330
2006/0137018 A1 * 6/2006 Herschaft ................ H04N 5/76 726/26
2006/0236248 A1 * 10/2006 Eischeid ............. G06F 3/04847 715/751
2007/0208682 A1 * 9/2007 Mancisidor .............. G06N 5/04 706/60
2008/0167756 A1 * 7/2008 Golden .................. G05B 15/02 700/297
2010/0262298 A1 * 10/2010 Johnson ................. F24F 11/001 700/277
2011/0035071 A1 * 2/2011 Sun .......................... H02J 3/00 700/291
2011/0066258 A1 * 3/2011 Torzhkov ............. G05B 13/042 700/29
2011/0087988 A1 4/2011 Ray et al.
2012/0083927 A1 * 4/2012 Nakamura ........... G05B 13/026 700/278
2012/0286051 A1 * 11/2012 Lyle ................... G05D 23/1902 236/47
2012/0296480 A1 * 11/2012 Raman ................. G05B 13/026 700/277
2012/0310418 A1 * 12/2012 Harrod ................. G05B 19/042 700/276
2012/0310560 A1 * 12/2012 Ozaki .................... G01R 22/10 702/62
2013/0307702 A1 * 11/2013 Pal ...................... A47L 15/0047 340/870.02
2014/0163759 A1 * 6/2014 Anderson .............. G06Q 50/06 700/291
2014/0249876 A1 * 9/2014 Wu ........................ G05B 15/02 705/7.12
2015/0234409 A1 * 8/2015 Griner .................... G05B 15/02 700/291
2015/0256549 A1 9/2015 Spurlock et al.
2015/0309495 A1 10/2015 Delorme et al.
2015/0316902 A1 11/2015 Wenzel et al.
2015/0316903 A1 11/2015 Asmus et al.
2015/0316907 A1 11/2015 Elbsat et al.
2015/0331689 A1 11/2015 Blahaerath et al.
2015/0369503 A1 12/2015 Flaherty et al.
2016/0020608 A1 1/2016 Carrasco et al.
2016/0102881 A1 * 4/2016 Kim ......................... F24F 11/30 165/218
2016/0105023 A1 * 4/2016 De Ridder ................ H02J 3/24 700/295
2016/0210180 A1 * 7/2016 Muttur .................. G06F 11/004
2016/0350080 A1 12/2016 Ravindran et al.
2016/0370814 A1 * 12/2016 Hanley ..................... G05F 1/66
2016/0377306 A1 12/2016 Drees et al.
2017/0006135 A1 1/2017 Siebel
2017/0031962 A1 2/2017 Turney et al.
2017/0102162 A1 4/2017 Drees et al.
2017/0102433 A1 4/2017 Wenzel et al.
2017/0102434 A1 4/2017 Wenzel et al.
2017/0102675 A1 4/2017 Drees
2017/0103483 A1 4/2017 Drees et al.
2017/0104332 A1 4/2017 Wenzel et al.
2017/0104336 A1 4/2017 Elbsat et al.
2017/0104337 A1 4/2017 Drees
2017/0104342 A1 4/2017 Elbsat et al.
2017/0104343 A1 4/2017 Elbsat et al.
2017/0104344 A1 4/2017 Wenzel et al.
2017/0104345 A1 4/2017 Wenzel et al.
2017/0104346 A1 4/2017 Wenzel et al.
2017/0104449 A1 4/2017 Drees
2017/0171215 A1 * 6/2017 Brucker ................ H04L 63/102
2017/0185133 A1 * 6/2017 Browning ............... G06F 1/329
2017/0212488 A1 7/2017 Kummer et al.

FOREIGN PATENT DOCUMENTS

CN 104633829 5/2015
EP 2 344 959 B1 5/2017
GB 2 541 170 A 2/2017
JP 6144346 B2 6/2017
WO WO-2017/007990 A1 1/2017

OTHER PUBLICATIONS https://developers.google.com/protocol-buffers/docs/csharptutorial, updated May 12, 2017. (8 pages).
International Search Report and Written Opinion on International Patent Application No. PCT/US2018/021288 dated Aug. 13, 2018. 20 pages.
Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
Diederik Kingma and Jimmy Ba. Adam: A Method for Stochastic Optimization. In International Conference on Learning Representations (ICLR), 2015, 15 pages.
George EP Box, Gwilym M Jenkins, Gregory C Reinsei, and Greta M Ljung. Time Series Analysis: Forecasting and Control. John Wiley & Sons, 2015, chapters 13-15. 82 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. system Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609.05191,2016, 44 pages.
Nevena et al. Data center cooling using model-predictive control, 10 pages.
Sergio Bittanti, Marco C Campi, et al. Adaptive Control of Linear Time Invariant Systems: The “Bet on the Best” Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal

(56) References Cited

OTHER PUBLICATIONS

Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.
Extended European Search Reported on EP Patent Application No. 18176474 dated Sep. 5, 2018. 8 pages.
PJM Economic Demand Resource in Energy Market, PJM State and Member Training Department, 2014, 119 pages.
PJM Manual 11: Energy & Ancillary Services Market Operations, pp. 122-137, PJM, 2015.
PJM Open Access Transmission Tariff, Section 3.3A, Apr. 4, 2016, 10 pages.
Office Action on CN 201710045507.2, dated Oct. 23, 2020, 28 pages with English translation.
Office Action on CN 201710045507.2, dated Jul. 22, 2021, 11 pages.

* cited by examiner

FROM FIG. 7A

HWG SUBPLANT — 1802, 1106

| HOT WATER GENERATOR | STATUS | | HEATING Q | | | FUEL USAGE | | | POWER | | | HOT WATER TEMPERATURE | | |
|---|---|---|---|---|---|---|---|---|---|---|---|---|---|---|
| | EOS | Metasys | ACTUAL | EOS | Metasys | ACTUAL | EOS | Metasys | ACTUAL | EOS | Metasys | ACTUAL | EOS | Metasys | ACTUAL |
| HWG 1 | On | On | Off | 20.0 mmBtu/h | | 54.6 mmBtu/h | 22.9 mmBtu/h | | 63.5 mmBtu/h | 5.55 kW | | | 190 deg F | 188 deg F | 187 deg F |
| HWG 2 | Off | Off | Off | 0.0 mmBtu/h | | 0.331 mmBtu/h | 0.0 mmBtu/h | | 0.0 mmBtu/h | 0.0 kW | | | 190 deg F | 191 deg F | 188 deg F |
| HWG 3 | Off | Off | Off | 0.0 mmBtu/h | | 1.57 mmBtu/h | 0.0 mmBtu/h | | 0.0 mmBtu/h | 0.0 kW | | | 190 deg F | 189 deg F | 189 deg F |

EXCESS HEAT EXCHANGER SUBPLANT — 1702

| HEAT EXCHANGER | HEAT REJECTION Q | | | HOT SIDE FLOW | | | COLD SIDE FLOW | | | DISPATCHED TEMPERATURE SETPOINT HW | | |
|---|---|---|---|---|---|---|---|---|---|---|---|---|
| | EOS | Metasys | ACTUAL | EOS | Metasys | ACTUAL | EOS | Metasys | ACTUAL | EOS | Metasys | ACTUAL |
| HEAT EXCHANGER 1 | 0.0 mmBtu/h | | 0.021 mmBtu/h | 0.0 gpm | 0.0 gpm | 12.1 gpm | 0.0 gpm | | 15.4 gpm | | | 59.2 deg F |

COLD WATER STORAGE — 1108

| COLD THERMAL STORAGE | STATUS | | | COOLING Q | | |
|---|---|---|---|---|---|---|
| | EOS | Metasys | ACTUAL | EOS | Metasys | ACTUAL |
| COLD TES TANK 1 | CHANGE | | CHANGE | 1,392 tons | | 1,397 tons |
| COLD TES TANK 2 | CHANGE | | CHANGE | 1,392 tons | | 1,397 tons |

HOT WATER STORAGE — 1110

| HOT THERMAL STORAGE | STATUS | | | DISPATCHED FLOW SETPOINT | | | HEATING Q | | |
|---|---|---|---|---|---|---|---|---|---|
| | EOS | Metasys | ACTUAL | EOS | Metasys | ACTUAL | EOS | Metasys | ACTUAL |
| HOT TES TANK 1 | CHANGE | | CHANGE | | | -3,874 gpm | 20.6 mmBtu/h | | 51.4 mmBtu/h |

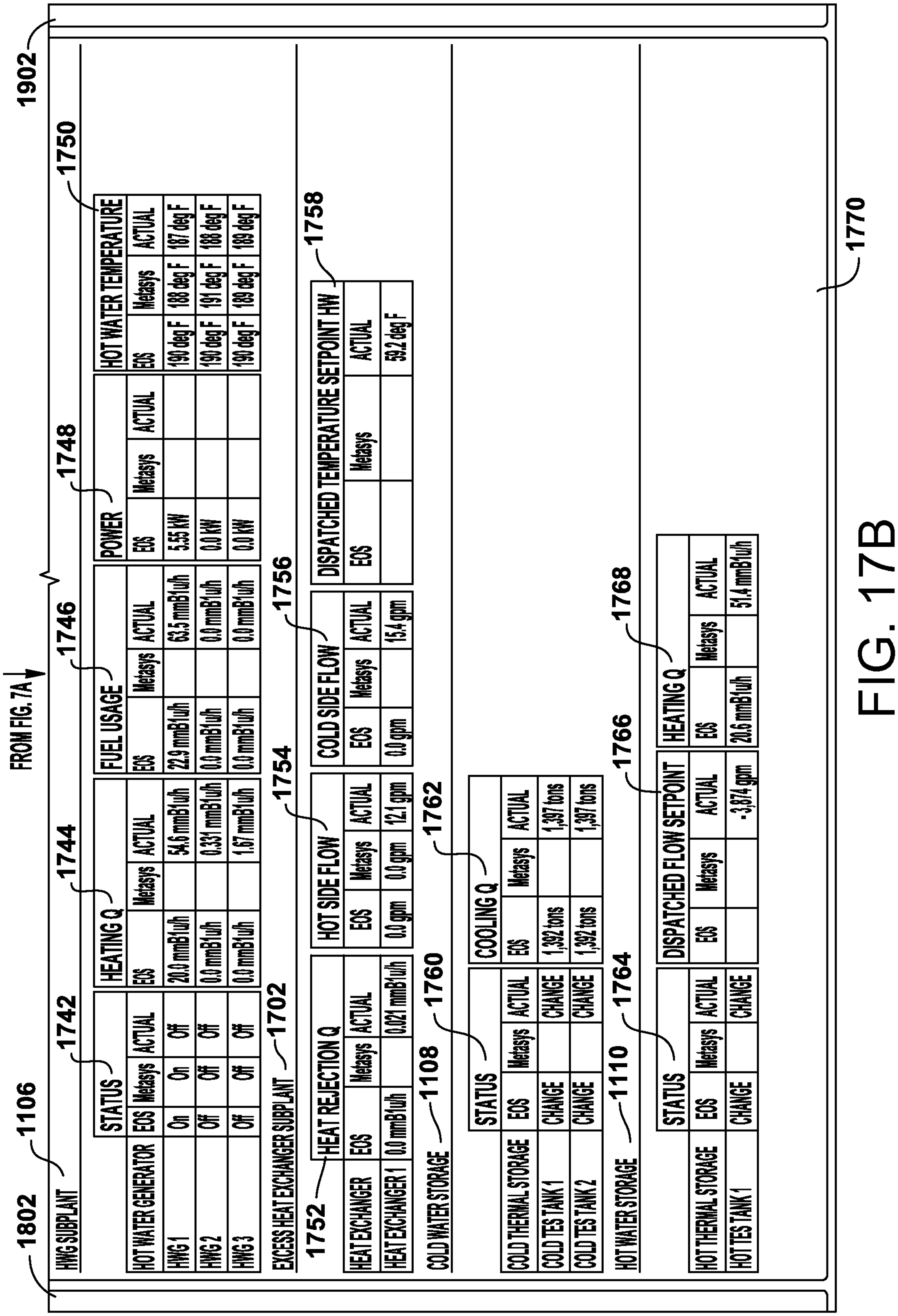

Figure 18A:
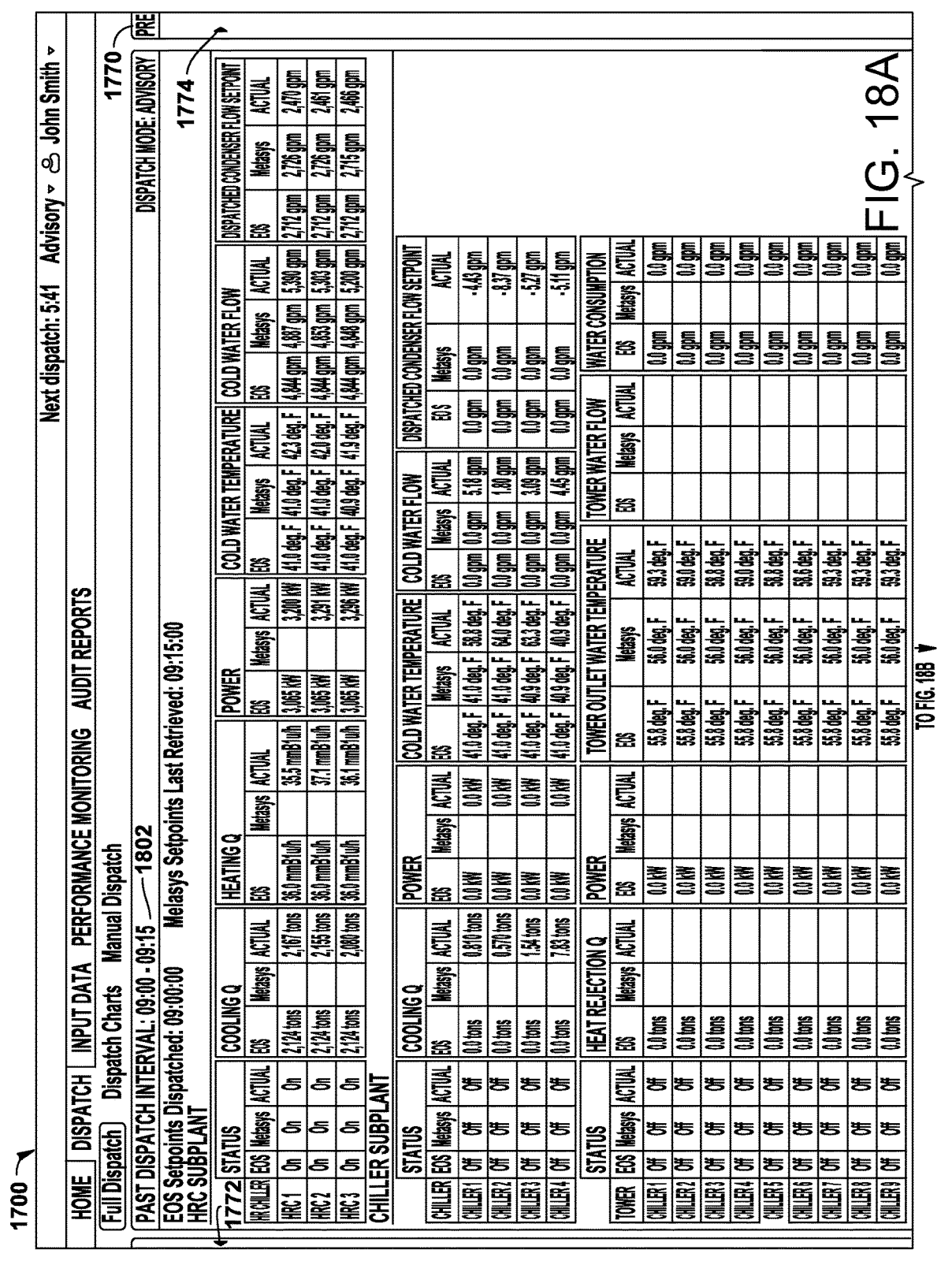

Next dispatch: 5:41 Advisory ▾ John Smith ▾

HOME | DISPATCH | INPUT DATA | PERFORMANCE MONITORING | AUDIT REPORTS

Full Dispatch | Dispatch Charts | Manual Dispatch

1770 PRE

PAST DISPATCH INTERVAL: 09:00 - 09:15 — 1802 DISPATCH MODE: ADVISORY

EOS Setpoints Dispatched: 09:00:00 Melasys Setpoints Last Retrieved: 09:15:00

1774

HRC SUBPLANT

1772

| | STATUS | | | COOLING Q | | | HEATING Q | | | POWER | | | COLD WATER TEMPERATURE | | | COLD WATER FLOW | | | DISPATCHED CONDENSER FLOW SETPOINT | | |
|---|---|---|---|---|---|---|---|---|---|---|---|---|---|---|---|---|---|---|---|---|---|
| HR CHILLER | EOS | Metasys | ACTUAL | EOS | Metasys | ACTUAL | EOS | Metasys | ACTUAL | EOS | Metasys | ACTUAL | EOS | Metasys | ACTUAL | EOS | Metasys | ACTUAL | EOS | Metasys | ACTUAL |
| HRC 1 | On | On | On | 2,124 tons | | 2,167 tons | 36.0 mmB1u/h | | 35.5 mmB1u/h | 3,065 kW | | 3,200 kW | 41.0 deg. F | 41.0 deg. F | 42.3 deg. F | 4,844 gpm | 4,887 gpm | 5,390 gpm | 2,712 gpm | 2,726 gpm | 2,470 gpm |
| HRC 2 | On | On | On | 2,124 tons | | 2,155 tons | 36.0 mmB1u/h | | 37.1 mmB1u/h | 3,065 kW | | 3,291 kW | 41.0 deg. F | 41.0 deg. F | 42.0 deg. F | 4,844 gpm | 4,853 gpm | 5,303 gpm | 2,712 gpm | 2,726 gpm | 2,461 gpm |
| HRC 3 | On | On | On | 2,124 tons | | 2,080 tons | 36.0 mmB1u/h | | 36.1 mmB1u/h | 3,065 kW | | 3,296 kW | 41.0 deg. F | 40.9 deg. F | 41.9 deg. F | 4,844 gpm | 4,848 gpm | 5,200 gpm | 2,712 gpm | 2,715 gpm | 2,466 gpm |

CHILLER SUBPLANT

| | STATUS | | | COOLING Q | | | POWER | | | COLD WATER TEMPERATURE | | | COLD WATER FLOW | | | DISPATCHED CONDENSER FLOW SETPOINT | | |
|---|---|---|---|---|---|---|---|---|---|---|---|---|---|---|---|---|---|---|
| CHILLER | EOS | Metasys | ACTUAL | EOS | Metasys | ACTUAL | EOS | Metasys | ACTUAL | EOS | Metasys | ACTUAL | EOS | Metasys | ACTUAL | EOS | Metasys | ACTUAL |
| CHILLER 1 | Off | Off | Off | 0.0 tons | | 0.810 tons | 0.0 kW | | 0.0 kW | 41.0 deg. F | 41.0 deg. F | 58.8 deg. F | 0.0 gpm | 0.0 gpm | 5.18 gpm | 0.0 gpm | 0.0 gpm | -4.43 gpm |
| CHILLER 2 | Off | Off | Off | 0.0 tons | | 0.570 tons | 0.0 kW | | 0.0 kW | 41.0 deg. F | 41.0 deg. F | 64.0 deg. F | 0.0 gpm | 0.0 gpm | 1.80 gpm | 0.0 gpm | 0.0 gpm | -8.37 gpm |
| CHILLER 3 | Off | Off | Off | 0.0 tons | | 1.54 tons | 0.0 kW | | 0.0 kW | 41.0 deg. F | 40.9 deg. F | 63.3 deg. F | 0.0 gpm | 0.0 gpm | 3.09 gpm | 0.0 gpm | 0.0 gpm | -5.27 gpm |
| CHILLER 4 | Off | Off | Off | 0.0 tons | | 7.83 tons | 0.0 kW | | 0.0 kW | 41.0 deg. F | 40.9 deg. F | 40.9 deg. F | 0.0 gpm | 0.0 gpm | 4.45 gpm | 0.0 gpm | 0.0 gpm | -5.11 gpm |

| | STATUS | | | HEAT REJECTION Q | | | POWER | | | TOWER OUTLET WATER TEMPERATURE | | | TOWER WATER FLOW | | | WATER CONSUMPTION | | |
|---|---|---|---|---|---|---|---|---|---|---|---|---|---|---|---|---|---|---|
| TOWER | EOS | Metasys | ACTUAL | EOS | Metasys | ACTUAL | EOS | Metasys | ACTUAL | EOS | Metasys | ACTUAL | EOS | Metasys | ACTUAL | EOS | Metasys | ACTUAL |
| CHILLER 1 | Off | Off | Off | 0.0 tons | | | 0.0 kW | | | 55.8 deg. F | 56.0 deg. F | 59.3 deg. F | | | | 0.0 gpm | | 0.0 gpm |
| CHILLER 2 | Off | Off | Off | 0.0 tons | | | 0.0 kW | | | 55.8 deg. F | 56.0 deg. F | 59.0 deg. F | | | | 0.0 gpm | | 0.0 gpm |
| CHILLER 3 | Off | Off | Off | 0.0 tons | | | 0.0 kW | | | 55.8 deg. F | 56.0 deg. F | 58.8 deg. F | | | | 0.0 gpm | | 0.0 gpm |
| CHILLER 4 | Off | Off | Off | 0.0 tons | | | 0.0 kW | | | 55.8 deg. F | 56.0 deg. F | 59.0 deg. F | | | | 0.0 gpm | | 0.0 gpm |
| CHILLER 5 | Off | Off | Off | 0.0 tons | | | 0.0 kW | | | 55.8 deg. F | 56.0 deg. F | 58.8 deg. F | | | | 0.0 gpm | | 0.0 gpm |
| CHILLER 6 | Off | Off | Off | 0.0 tons | | | 0.0 kW | | | 55.8 deg. F | 56.0 deg. F | 58.6 deg. F | | | | 0.0 gpm | | 0.0 gpm |
| CHILLER 7 | Off | Off | Off | 0.0 tons | | | 0.0 kW | | | 55.8 deg. F | 56.0 deg. F | 59.3 deg. F | | | | 0.0 gpm | | 0.0 gpm |
| CHILLER 8 | Off | Off | Off | 0.0 tons | | | 0.0 kW | | | 55.8 deg. F | 56.0 deg. F | 59.3 deg. F | | | | 0.0 gpm | | 0.0 gpm |
| CHILLER 9 | Off | Off | Off | 0.0 tons | | | 0.0 kW | | | 55.8 deg. F | 56.0 deg. F | 59.3 deg. F | | | | 0.0 gpm | | 0.0 gpm |

Figure 18B:
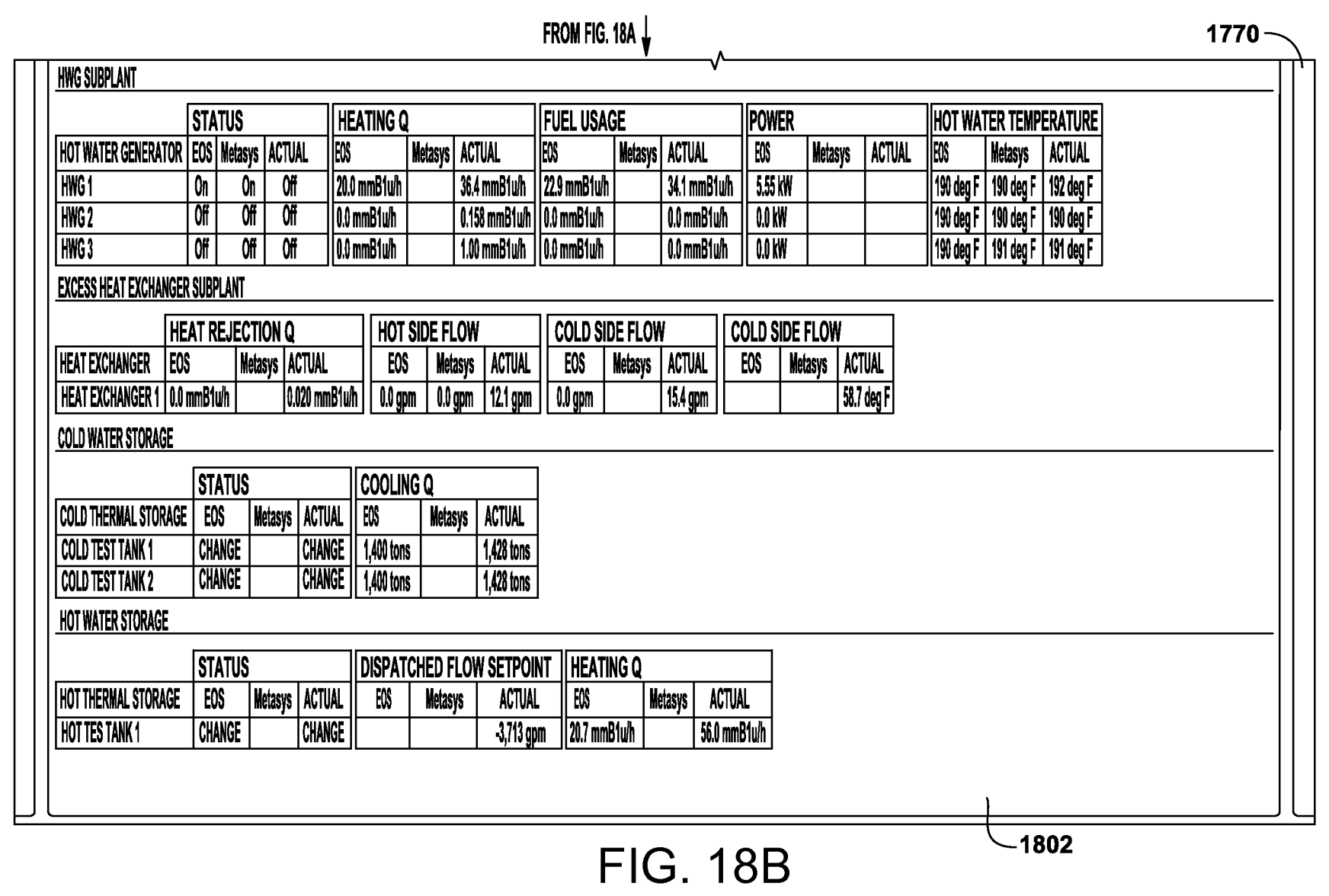

FROM FIG. 18A

1770

HWG SUBPLANT

| | STATUS | | | HEATING Q | | | FUEL USAGE | | | POWER | | | HOT WATER TEMPERATURE | | |
|---|---|---|---|---|---|---|---|---|---|---|---|---|---|---|---|
| HOT WATER GENERATOR | EOS | Metasys | ACTUAL | EOS | Metasys | ACTUAL | EOS | Metasys | ACTUAL | EOS | Metasys | ACTUAL | EOS | Metasys | ACTUAL |
| HWG 1 | On | On | Off | 20.0 mmB1u/h | | 36.4 mmB1u/h | 22.9 mmB1u/h | | 34.1 mmB1u/h | 5.55 kW | | | 190 deg F | 190 deg F | 192 deg F |
| HWG 2 | Off | Off | Off | 0.0 mmB1u/h | | 0.158 mmB1u/h | 0.0 mmB1u/h | | 0.0 mmB1u/h | 0.0 kW | | | 190 deg F | 190 deg F | 190 deg F |
| HWG 3 | Off | Off | Off | 0.0 mmB1u/h | | 1.00 mmB1u/h | 0.0 mmB1u/h | | 0.0 mmB1u/h | 0.0 kW | | | 190 deg F | 191 deg F | 191 deg F |

EXCESS HEAT EXCHANGER SUBPLANT

| | HEAT REJECTION Q | | | HOT SIDE FLOW | | | COLD SIDE FLOW | | | COLD SIDE FLOW | | |
|---|---|---|---|---|---|---|---|---|---|---|---|---|
| HEAT EXCHANGER | EOS | Metasys | ACTUAL | EOS | Metasys | ACTUAL | EOS | Metasys | ACTUAL | EOS | Metasys | ACTUAL |
| HEAT EXCHANGER 1 | 0.0 mmB1u/h | | 0.020 mmB1u/h | 0.0 gpm | 0.0 gpm | 12.1 gpm | 0.0 gpm | | 15.4 gpm | | | 58.7 deg F |

COLD WATER STORAGE

| | STATUS | | | COOLING Q | | |
|---|---|---|---|---|---|---|
| COLD THERMAL STORAGE | EOS | Metasys | ACTUAL | EOS | Metasys | ACTUAL |
| COLD TEST TANK 1 | CHANGE | | CHANGE | 1,400 tons | | 1,428 tons |
| COLD TEST TANK 2 | CHANGE | | CHANGE | 1,400 tons | | 1,428 tons |

HOT WATER STORAGE

| | STATUS | | | DISPATCHED FLOW SETPOINT | | | HEATING Q | | |
|---|---|---|---|---|---|---|---|---|---|
| HOT THERMAL STORAGE | EOS | Metasys | ACTUAL | EOS | Metasys | ACTUAL | EOS | Metasys | ACTUAL |
| HOT TES TANK 1 | CHANGE | | CHANGE | | | -3,713 gpm | 20.7 mmB1u/h | | 56.0 mmB1u/h |

Figure 19A:
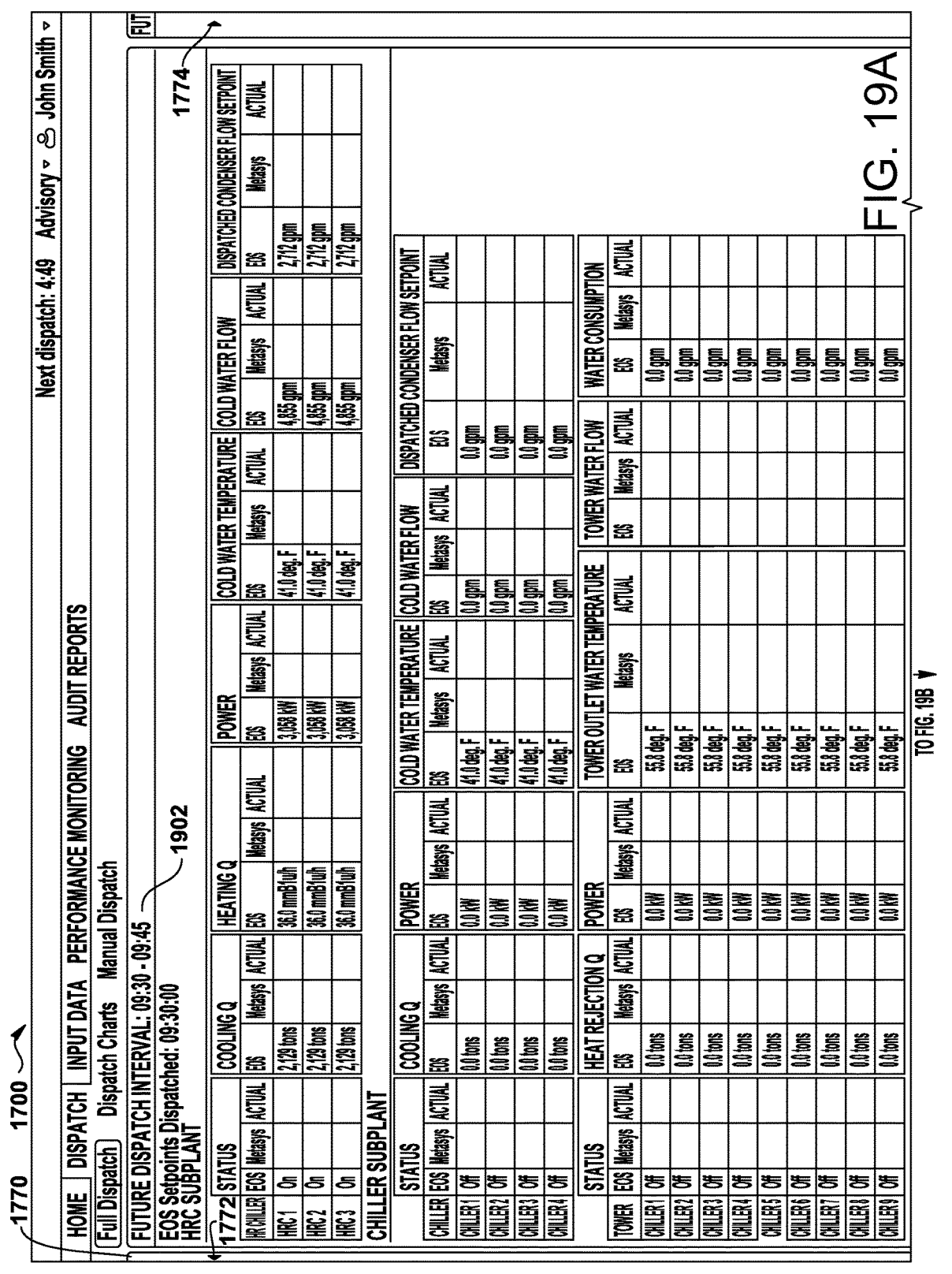

Next dispatch: 4:49 Advisory ▿ John Smith ▿

HOME | DISPATCH | INPUT DATA | PERFORMANCE MONITORING | AUDIT REPORTS

Full Dispatch | Dispatch Charts | Manual Dispatch

FUTURE DISPATCH INTERVAL: 09:30 - 09:45 — 1902

EOS Setpoints Dispatched: 09:30:00

HRC SUBPLANT — 1774

1772

| | STATUS | | | COOLING Q | | | HEATING Q | | | POWER | | | COLD WATER TEMPERATURE | | | COLD WATER FLOW | | | DISPATCHED CONDENSER FLOW SETPOINT | | |
|---|---|---|---|---|---|---|---|---|---|---|---|---|---|---|---|---|---|---|---|---|---|
| HR CHILLER | EOS | Metasys | ACTUAL | EOS | Metasys | ACTUAL | EOS | Metasys | ACTUAL | EOS | Metasys | ACTUAL | EOS | Metasys | ACTUAL | EOS | Metasys | ACTUAL | EOS | Metasys | ACTUAL |
| HRC 1 | On | | | 2,129 tons | | | 36.0 mmBtu/h | | | 3,058 kW | | | 41.0 deg. F | | | 4,855 gpm | | | 2,712 gpm | | |
| HRC 2 | On | | | 2,129 tons | | | 36.0 mmBtu/h | | | 3,058 kW | | | 41.0 deg. F | | | 4,855 gpm | | | 2,712 gpm | | |
| HRC 3 | On | | | 2,129 tons | | | 36.0 mmBtu/h | | | 3,058 kW | | | 41.0 deg. F | | | 4,855 gpm | | | 2,712 gpm | | |

CHILLER SUBPLANT

| | STATUS | | | COOLING Q | | | POWER | | | COLD WATER TEMPERATURE | | | COLD WATER FLOW | | | DISPATCHED CONDENSER FLOW SETPOINT | | |
|---|---|---|---|---|---|---|---|---|---|---|---|---|---|---|---|---|---|---|
| CHILLER | EOS | Metasys | ACTUAL | EOS | Metasys | ACTUAL | EOS | Metasys | ACTUAL | EOS | Metasys | ACTUAL | EOS | Metasys | ACTUAL | EOS | Metasys | ACTUAL |
| CHILLER 1 | Off | | | 0.0 tons | | | 0.0 kW | | | 41.0 deg. F | | | 0.0 gpm | | | 0.0 gpm | | |
| CHILLER 2 | Off | | | 0.0 tons | | | 0.0 kW | | | 41.0 deg. F | | | 0.0 gpm | | | 0.0 gpm | | |
| CHILLER 3 | Off | | | 0.0 tons | | | 0.0 kW | | | 41.0 deg. F | | | 0.0 gpm | | | 0.0 gpm | | |
| CHILLER 4 | Off | | | 0.0 tons | | | 0.0 kW | | | 41.0 deg. F | | | 0.0 gpm | | | 0.0 gpm | | |

| | STATUS | | | HEAT REJECTION Q | | | POWER | | | TOWER OUTLET WATER TEMPERATURE | | | TOWER WATER FLOW | | | WATER CONSUMPTION | | |
|---|---|---|---|---|---|---|---|---|---|---|---|---|---|---|---|---|---|---|
| TOWER | EOS | Metasys | ACTUAL | EOS | Metasys | ACTUAL | EOS | Metasys | ACTUAL | EOS | Metasys | ACTUAL | EOS | Metasys | ACTUAL | EOS | Metasys | ACTUAL |
| CHILLER 1 | Off | | | 0.0 tons | | | 0.0 kW | | | 55.8 deg. F | | | | | | 0.0 gpm | | |
| CHILLER 2 | Off | | | 0.0 tons | | | 0.0 kW | | | 55.8 deg. F | | | | | | 0.0 gpm | | |
| CHILLER 3 | Off | | | 0.0 tons | | | 0.0 kW | | | 55.8 deg. F | | | | | | 0.0 gpm | | |
| CHILLER 4 | Off | | | 0.0 tons | | | 0.0 kW | | | 55.8 deg. F | | | | | | 0.0 gpm | | |
| CHILLER 5 | Off | | | 0.0 tons | | | 0.0 kW | | | 55.8 deg. F | | | | | | 0.0 gpm | | |
| CHILLER 6 | Off | | | 0.0 tons | | | 0.0 kW | | | 55.8 deg. F | | | | | | 0.0 gpm | | |
| CHILLER 7 | Off | | | 0.0 tons | | | 0.0 kW | | | 55.8 deg. F | | | | | | 0.0 gpm | | |
| CHILLER 8 | Off | | | 0.0 tons | | | 0.0 kW | | | 55.8 deg. F | | | | | | 0.0 gpm | | |
| CHILLER 9 | Off | | | 0.0 tons | | | 0.0 kW | | | 55.8 deg. F | | | | | | 0.0 gpm | | |

FUT

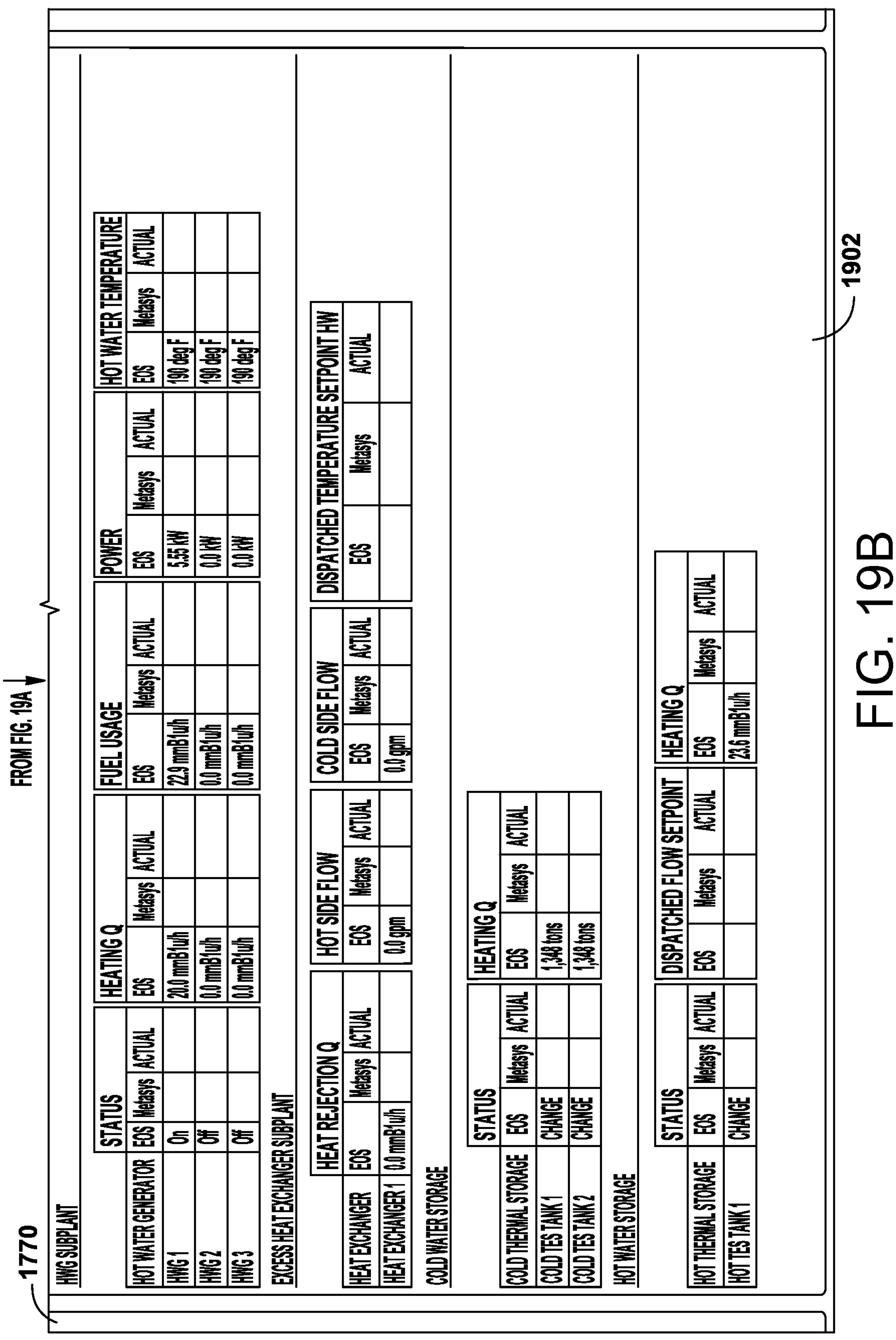

FIG. 19B

FROM FIG. 19A

1770

HWG SUBPLANT

| HOT WATER GENERATOR | STATUS | | | HEATING Q | | | FUEL USAGE | | | POWER | | | HOT WATER TEMPERATURE | | |
|---|---|---|---|---|---|---|---|---|---|---|---|---|---|---|---|
| | EOS | Metasys | ACTUAL | EOS | Metasys | ACTUAL | EOS | Metasys | ACTUAL | EOS | Metasys | ACTUAL | EOS | Metasys | ACTUAL |
| HWG 1 | On | | | 20.0 mmBtuh | | | 22.9 mmBtuh | | | 5.55 kW | | | 190 deg F | | |
| HWG 2 | Off | | | 0.0 mmBtuh | | | 0.0 mmBtuh | | | 0.0 kW | | | 190 deg F | | |
| HWG 3 | Off | | | 0.0 mmBtuh | | | 0.0 mmBtuh | | | 0.0 kW | | | 190 deg F | | |

EXCESS HEAT EXCHANGER SUBPLANT

| HEAT EXCHANGER | HEAT REJECTION Q | | | HOT SIDE FLOW | | | COLD SIDE FLOW | | | DISPATCHED TEMPERATURE SETPOINT HW | | |
|---|---|---|---|---|---|---|---|---|---|---|---|---|
| | EOS | Metasys | ACTUAL | EOS | Metasys | ACTUAL | EOS | Metasys | ACTUAL | EOS | Metasys | ACTUAL |
| HEAT EXCHANGER 1 | 0.0 mmBtuh | | | 0.0 gpm | | | 0.0 gpm | | | | | |

COLD WATER STORAGE

| COLD THERMAL STORAGE | STATUS | | | HEATING Q | | | DISPATCHED FLOW SETPOINT | | |
|---|---|---|---|---|---|---|---|---|---|
| | EOS | Metasys | ACTUAL | EOS | Metasys | ACTUAL | EOS | Metasys | ACTUAL |
| COLD TES TANK 1 | CHANGE | | | 1,348 tons | | | | | |
| COLD TES TANK 2 | CHANGE | | | 1,348 tons | | | | | |

HOT WATER STORAGE

| HOT THERMAL STORAGE | STATUS | | | HEATING Q | | |
|---|---|---|---|---|---|---|
| | EOS | Metasys | ACTUAL | EOS | Metasys | ACTUAL |
| HOT TES TANK 1 | CHANGE | | | 23.6 mmBtuh | | |

1902

SYSTEMS AND METHODS FOR MONITORING AND CONTROLLING A CENTRAL PLANT

CROSS-REFERENCE TO RELATED PATENT APPLICATION

This application claims the benefit of and priority to U.S. Provisional Patent Application No. 62/286,287 filed Jan. 22, 2016, the entire disclosure of which is incorporated by reference herein.

BACKGROUND

The present disclosure relates generally to a central plant that includes two or more subplants configured to serve thermal energy loads. The present disclosure relates more particularly to systems and methods for monitoring and controlling the two or more subplants and the equipment within each of the subplants.

A central plant may include a number of subplants configured to serve the heating and cooling loads of a building or campus. For example, the central plant may include a heater subplant, a chiller subplant, a heat recovery chiller subplant, a hot thermal energy storage (TES) subplant, and/or a cold TES subplant. The subplants may include a variety of HVAC equipment configured to serve heating and cooling loads (e.g., heaters, chillers, heat recovery chillers, cooling towers, etc.). The central plant may be controlled by a central plant controller that distributes a requested or predicted thermal energy load (e.g., a heating load or a cooling load) across the plurality of subplants. It can be difficult and challenging to monitor and control the operation of a central plant.

SUMMARY

One implementation of the present disclosure is a system for monitoring and controlling a central plant having a plurality of subplants configured to serve a thermal energy load. The system includes a high level optimizer, a user interface, a dispatch graphical user interface (GUI) generator, a low level optimizer, and a building automation system (BAS). The high level optimizer is configured to determine recommended subplant loads for each of the plurality of subplants. The user interface is configured to receive manual subplant loads specified by a user. The dispatch GUI generator configured to generate a dispatch GUI and present the dispatch GUI via the user interface. The dispatch GUI includes the recommended subplant loads and the manual subplant loads. The low level optimizer is configured to determine recommended equipment setpoints for equipment of the central plant based on at least one of the recommended subplant loads and the manual subplant loads. The building automation system is configured to provide control signals for the equipment of the central plant based on the recommended equipment setpoints.

In some embodiments, the system is configured to operate in (1) an automatic operating mode in which the low level optimizer is configured to determine a first set of recommended equipment setpoints to achieve the recommended subplant loads and (2) a manual operating mode in which the low level optimizer is configured to determine a second set of recommended equipment setpoints to achieve the manual subplant loads.

In some embodiments, the high level optimizer is configured to determine an amount of overproduction or underproduction resulting from the manual subplant loads by comparing the manual subplant loads to a campus thermal energy load. In some embodiments, the plurality of subplants include a thermal energy storage subplant. The dispatch GUI may include an indication of an amount of time until the thermal energy storage subplant is (1) fully depleted based on the amount of underproduction or (2) filled to capacity based on the amount of overproduction.

In some embodiments, the dispatch GUI generator is configured to update the dispatch GUI in response to a change in the manual subplant loads. In some embodiments, updating the dispatch GUI includes updating the recommended equipment setpoints based on the changed manual subplant loads and presenting the updated equipment setpoints via the dispatch GUI.

In some embodiments, the dispatch GUI generator is configured to update the dispatch GUI before dispatching the changed manual subplant loads or the updated equipment setpoints to the central plant.

Another implementation of the present disclosure is a system for monitoring and controlling a central plant having subplants configured to serve a thermal energy load. The system includes a high level optimizer, a subplant monitor, a user interface, and a dispatch graphical user interface (GUI) generator. The high level optimizer is configured to determine recommended subplant loads for each of the subplants. The subplant monitor is configured to monitor the central plant and identify actual subplant loads for each of the subplants. The user interface is configured to receive manual subplant loads specified by a user. The dispatch GUI generator is configured to generate a dispatch GUI and present the dispatch GUI via the user interface. The dispatch GUI includes the recommended subplant loads, the actual subplant loads, and the manual subplant loads. In some embodiments, the thermal energy load includes at least one of a heating load and a cooling load.

In some embodiments, the system includes a subplant utilization database configured to store the recommended subplant loads, the actual subplant loads, and the manual subplant loads for each of a plurality of dispatch intervals. In some embodiments, the plurality of dispatch intervals include a past dispatch interval, a present dispatch interval, and a future dispatch interval. The dispatch GUI may include at least one of the recommended subplant loads, the actual subplant loads, and the manual subplant loads for each of the dispatch intervals.

In some embodiments, the system includes a low level optimizer configured to determine recommended equipment setpoints for equipment within each of the plurality of subplants based on at least one of the recommended subplant loads and the manual subplant loads. In some embodiments, the low level optimizer is configured to provide a first set of recommended equipment setpoints based on the recommended subplant loads and provide a second set of recommended equipment setpoints based on the manual subplant loads. In some embodiments, the system includes a building automation system configured to provide control signals for the equipment within each of the plurality of subplants based on the recommended equipment setpoints.

In some embodiments, the dispatch GUI includes an operating mode selector configured to display a plurality of operating modes and to receive a user selection of one of the operating modes. The plurality of operating modes may include an automatic operating mode, an advisory operating mode, and a manual operating mode.

In some embodiments, the plurality of subplants include a thermal energy storage subplant. The dispatch GUI may include an indication of an amount of overproduction or underproduction of the thermal energy load based on the manual subplant loads. In some embodiments, the dispatch GUI generator is configured to update the dispatch GUI in response to a change in the manual subplant loads.

Another implementation of the present disclosure is a system for monitoring and controlling a central plant having a plurality of subplants configured to serve a thermal energy load. The system includes a central plant optimizer, a user interface, and a dispatch graphical user interface (GUI) generator. The central plant optimizer is configured to determine subplant load setpoints for each of the plurality of subplants and equipment setpoints to achieve the subplant load setpoints. The dispatch GUI generator is configured to generate a dispatch GUI and present the dispatch GUI via the user interface. The dispatch GUI includes at least one of the subplant load setpoints and the equipment setpoints for each of a plurality of dispatch intervals.

In some embodiments, the plurality of dispatch intervals include a past dispatch interval, a present dispatch interval, and a future dispatch interval. In some embodiments, the dispatch GUI generator is configured to populate the past dispatch interval with actual dispatch data received from the central plant. The dispatch GUI generator may be configured to populate the present dispatch interval with at least one of (1) recommended dispatch data based on recommended subplant loads determined by the central plant optimizer and (2) manual dispatch data based on manual subplant loads specified by a user via the user interface. In some embodiments, the dispatch GUI generator is configured to populate the future dispatch interval with recommended dispatch data based on recommended future subplant loads determined by the central plant optimizer.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 17A-17B are drawings of a detailed dispatch information interface which may be generated by the EOS of FIG. 3 showing a snapshot of the detailed dispatch information for a present dispatch interval, according to an exemplary embodiment.

FIGS. 18A-18B are drawings of a detailed dispatch information interface which may be generated by the EOS of FIG. 3 showing a snapshot of the detailed dispatch information for a past dispatch interval, according to an exemplary embodiment.

FIG. 19A-19B are drawings of a detailed dispatch information interface which may be generated by the EOS of FIG. 3 showing a snapshot of the detailed dispatch information for a future dispatch interval, according to an exemplary embodiment.

DETAILED DESCRIPTION

Figure 1:
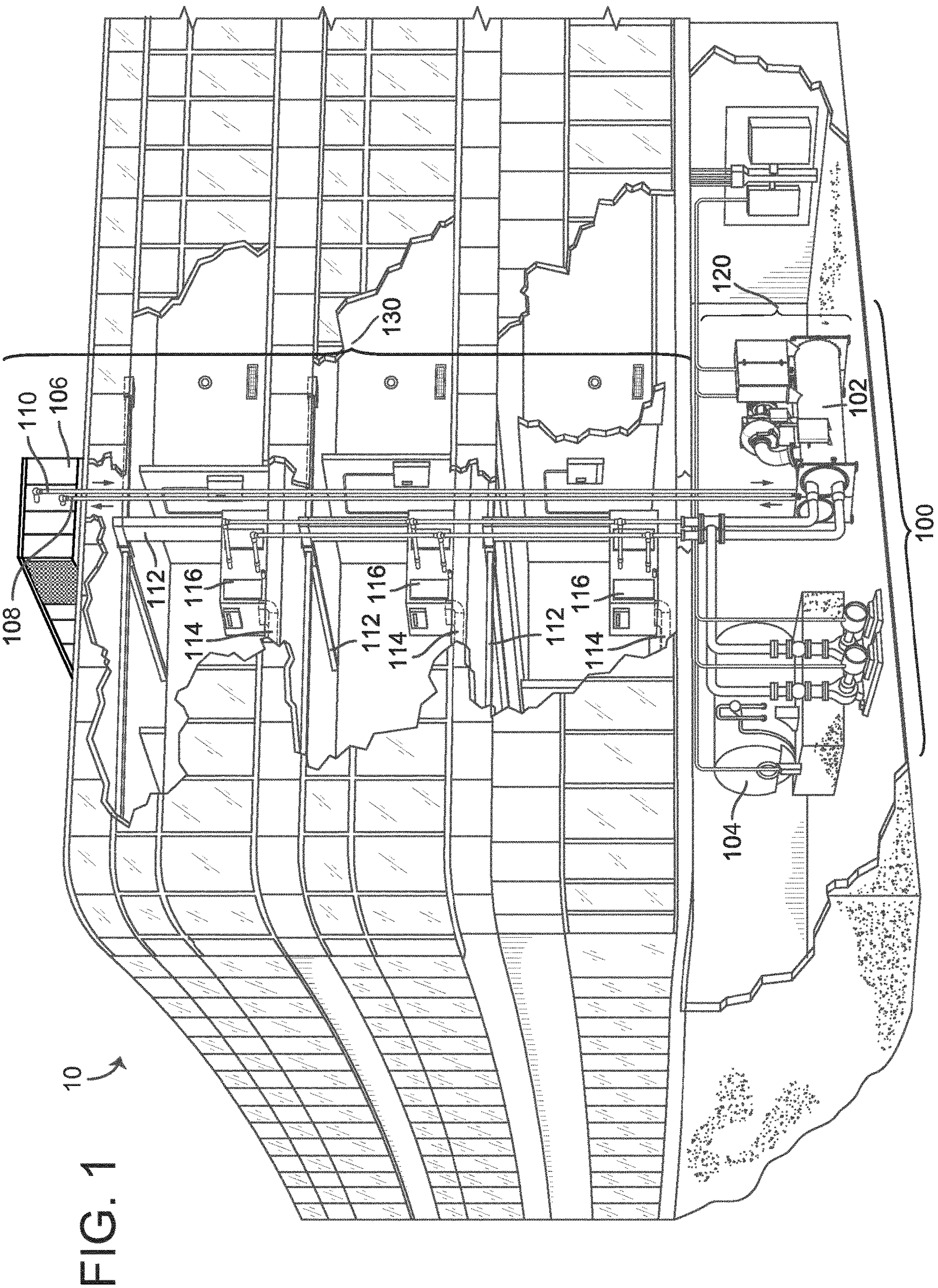
FIG. 1 is a drawing of a building equipped with a building automation system and served by a central plant, according to an exemplary embodiment.

Referring generally to the FIGURES, systems and methods for monitoring and controlling a central plant are shown, according to an exemplary embodiment. The central plant may include a plurality of subplants configured to serve the heating and cooling loads of a building or campus. For example, the central plant may include a heater subplant, a chiller subplant, a heat recovery chiller subplant, a hot thermal energy storage (TES) subplant, and/or a cold TES subplant. The central plant may be controlled by an enterprise optimization system (EOS) that distributes a requested or predicted thermal energy load (e.g., a heating load or a cooling load) across the plurality of subplants. In some embodiments, the EOS performs an optimization process to determine an optimal load distribution across the plurality of subplants for each of a plurality of time steps within a prediction window.

The EOS may predict the loads on each of the subplants throughout the prediction window. In some embodiments, the predicted subplant loads include a heating load served by the heating subplant, a heating load served by the heat recovery chiller subplant, a cooling load served by the heat recovery chiller subplant, a cooling load served by the chiller subplant, a heating load served or stored by the hot TES subplant (e.g., a predicted rate at which the hot TES subplant will be charging or discharging), and/or a cooling load served or stored by the cold TES subplant (e.g., a predicted rate at which the cold TES subplant will be charging or discharging). In some embodiments, the EOS predicts a charge state for the TES subplants defining an amount of thermal energy stored in each of the TES subplants during each of the dispatch intervals. The predicted subplant loads and TES charge states for each of the future time steps may be stored in a subplant utilization database. The actual operation of the central plant may be monitored to determine the actual subplant loads and TES charge stages during each of the time steps. The actual subplant loads and TES charge states may be stored in the subplant utilization database for each of the past and current dispatch intervals.

A dispatch graphical user interface (GUI) generator may access the data stored in the subplant utilization database and use the stored data to generate a dispatch GUI. The dispatch GUI may be a graph or chart that illustrates the actual subplant utilization data (e.g., past and current subplant loads) and the predicted subplant utilization data (e.g., future subplant loads) in a graphical format. In some embodiments, the dispatch GUI indicates the actual and predicted subplant loads for each of the subplants at each of the dispatch intervals represented in the dispatch GUI. The dispatch GUI may be configured to receive manual subplant loads specified by a user.

The dispatch GUI generator may provide the dispatch GUI to a user interface of a client device (e.g., a computer terminal, a workstation, a laptop, a tablet, a smartphone, etc.). In some embodiments, the dispatch GUI generator is a component of the central plant controller. In other embodiments, the dispatch GUI generator may be a component of the client device. For example, the dispatch GUI generator may be a web browser or a specialized application running on the client device. In some embodiments, the dispatch GUI is rendered using specialized viewing software (e.g., a central plant monitoring application) installed on the client device. In other embodiments, the dispatch GUI is provided via a web interface which allows the dispatch GUI to be rendered and viewed using a web browser without requiring any specialized applications or software to be installed on the client device.

The dispatch GUI may present recommended (i.e., optimal) subplant loads, manual subplant loads, and actual subplant loads in a variety of visual formats (e.g., diagrams, charts, graphs, etc.) that illustrate the operation of the central plant. The dispatch GUI may include a first set of recommended equipment setpoints that result from the recommended subplant loads, a second set of recommended equipment setpoints that result from the manual subplant loads, and the actual equipment setpoints to provide details regarding the operation of each subplant. The dispatch GUI may include past dispatch data (e.g., past subplant loads, past equipment setpoints) and current dispatch data (e.g., current subplant loads, current equipment setpoints) to allow a user to view a history of central plant operations. The dispatch GUI may also include future dispatch data (e.g., planned subplant loads, planned equipment setpoints) to allow the user to view planned central plant operations into the future. Additional features and advantages of the dispatch GUI are described in detail below.

Building With HVAC System

Referring now to FIG. 1, a perspective view of a building 10 is shown. Building 10 is served by a building automation system (BAS). A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant and Control System

Figure 2:
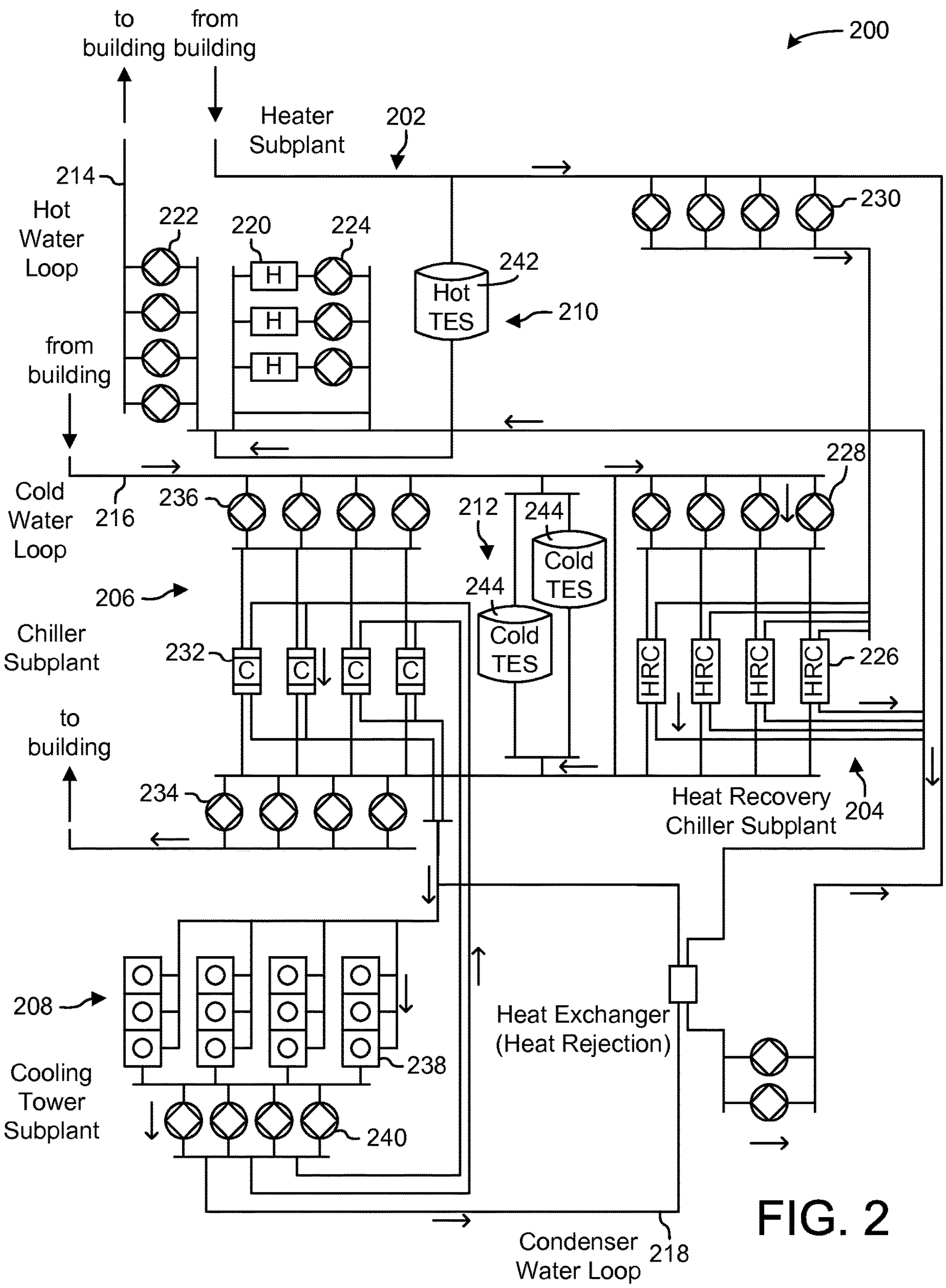
FIG. 2 is a schematic diagram of a central plant including a number of subplants configured to serve the heating and cooling loads of the building of FIG. 1, according to an exemplary embodiment.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
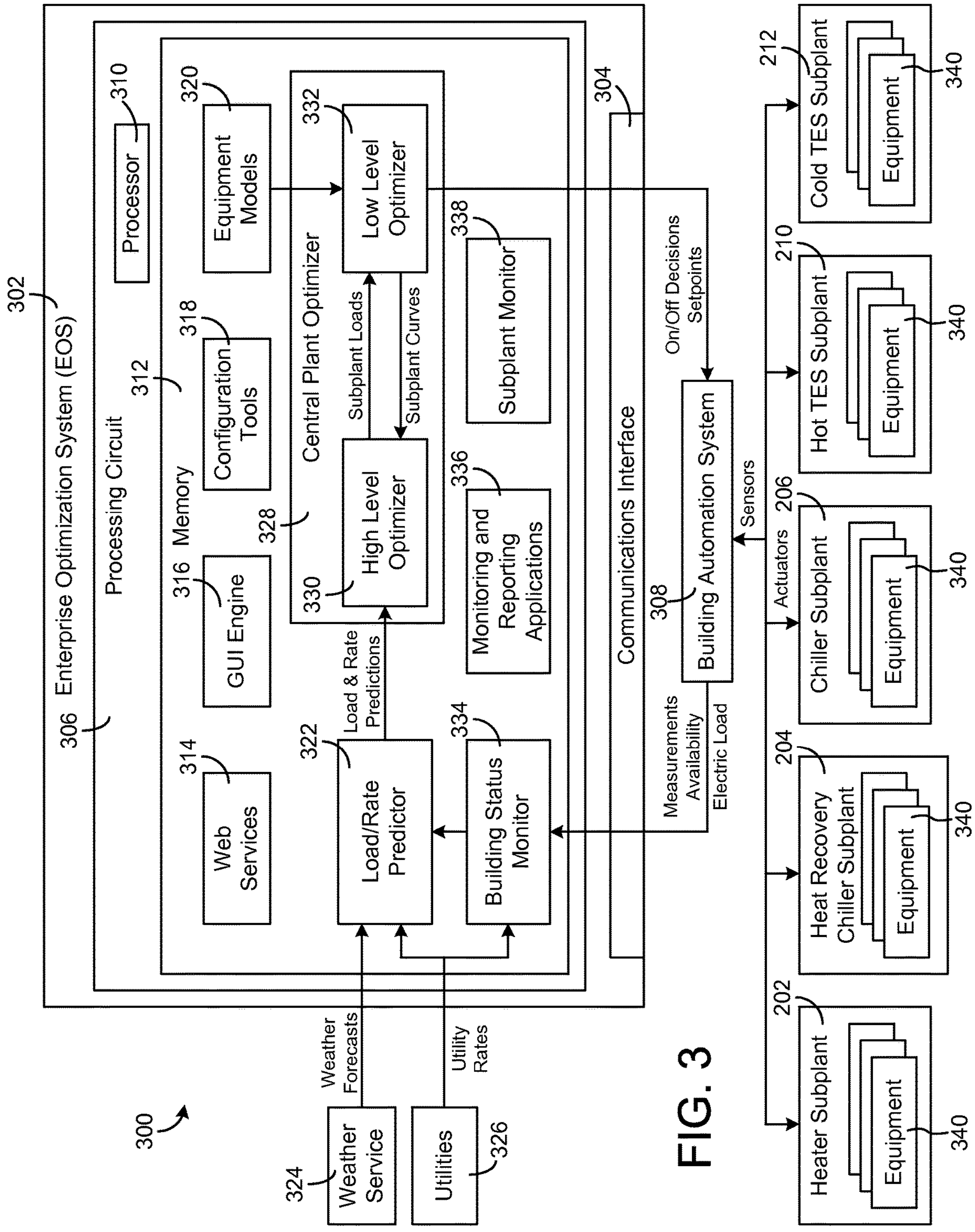
FIG. 3 is a block diagram of an enterprise optimization system (EOS) configured to monitor and control the central plant of FIG. 2, according to an exemplary embodiment.

Referring now to FIG. 3, a block diagram illustrating a central plant system 300 is shown, according to an exemplary embodiment. System 300 is shown to include an enterprise optimization system (EOS) 302, a building automation system (BAS) 308, and a plurality of subplants 202-212. Subplants 202-212 may be the same as previously described with reference to FIG. 2. For example, subplants 202-212 are shown to include a heater subplant 202, a heat recovery chiller subplant 204, a chiller subplant 206, a hot TES subplant 210, and a cold TES subplant 212.

Each of subplants 202-212 is shown to include equipment 340 that can be controlled by EOS 302 and/or building automation system 308 to optimize the performance of central plant 200. Equipment 340 may include, for example, heating devices 220, chillers 232, heat recovery heat exchangers 226, cooling towers 238, thermal energy storage devices 242-244, pumps, valves, and/or other devices of subplants 202-212. Individual devices of equipment 340 can be turned on or off to adjust the thermal energy load served by each of subplants 202-212. In some embodiments, individual devices of equipment 340 can be operated at variable capacities (e.g., operating a chiller at 10% capacity or 60% capacity) according to an operating setpoint received from EOS 302.

In some embodiments, one or more of subplants 202-212 includes a subplant level controller configured to control the equipment 340 of the corresponding subplant. For example, EOS 302 may determine an on/off configuration and global operating setpoints for equipment 340. In response to the on/off configuration and received global operating setpoints, the subplant controllers may turn individual devices of equipment 340 on or off, and implement specific operating setpoints (e.g., damper position, vane position, fan speed, pump speed, etc.) to reach or maintain the global operating setpoints.

In some embodiments, the subplant level controllers receive subplant load setpoints from EOS 302. Each subplant level controller may use the subplant load setpoint for the corresponding subplant to select one or more devices of the equipment 340 within the subplant to activate or deactivate in order to meet the subplant load setpoint in an energy-efficient manner. In other embodiments, the equipment selection and staging decisions (i.e., deciding which devices to turn on/off) are performed by a low level optimizer 332 within EOS 302.

BAS 308 may be configured to monitor conditions within a controlled building or building zone. For example, BAS 308 may receive input from various sensors (e.g., temperature sensors, humidity sensors, airflow sensors, voltage sensors, etc.) distributed throughout the building and may report building conditions to EOS 302. Building conditions may include, for example, a temperature of the building or a zone of the building, a power consumption (e.g., electric load) of the building, a state of one or more actuators configured to affect a controlled state within the building, or other types of information relating to the controlled building. BAS 308 may operate subplants 202-212 to affect the monitored conditions within the building and/or to serve the thermal energy loads of the building.

BAS 308 may receive control signals from EOS 302 specifying on/off states and/or setpoints for equipment 340. BAS 308 may control equipment 340 (e.g., via actuators, power relays, etc.) in accordance with the control signals provided by EOS 302. For example, BAS 308 may operate equipment 340 using closed loop control to achieve the setpoints specified by EOS 302. In various embodiments, BAS 308 may be combined with EOS 302 or may be part of a separate building automation system. According to an exemplary embodiment, BAS 308 is a METASYS® brand building automation system, as sold by Johnson Controls, Inc.

EOS 302 may monitor the status of the controlled building using information received from BAS 308. EOS 302 may be configured to predict the thermal energy loads (e.g., heating loads, cooling loads, etc.) of the building for plurality of time steps in a prediction window (e.g., using weather forecasts from a weather service 324). EOS 302 may generate on/off decisions and/or setpoints for equipment 340 to minimize the cost of energy consumed by subplants 202-212 to serve the predicted heating and/or cooling loads for the duration of the prediction window. In various embodiments, EOS 302 may be integrated within a single computer (e.g., one server, one housing, etc.) or distributed across multiple servers or computers. In some embodiments, EOS 302 is integrated with a smart building manager that manages multiple building systems and/or combined with BAS 308.

EOS 302 may be configured to operate in multiple different operating modes including an automatic mode, an advisory mode, and a manual mode. In the automatic mode, EOS 302 may automatically control central plant 200. For example, EOS 302 may automatically determine optimal subplant loads for each of subplants 202-212. EOS 302 may use the optimal subplant loads to determine optimal on/off decisions and operating setpoints for individual devices of equipment 340. In the automatic mode, EOS 302 may provide the control signals to BAS 308 and/or equipment 340 to control equipment 340 without requiring user intervention or input. BAS 308 may relay the control signals to subplants 202-212 or may be bypassed entirely. In other words, EOS 302 may automatically control central plant 200 in accordance with the optimized load setpoints and/or equipment setpoints when operated in the automatic mode. The automatic mode is described in greater detail with reference to FIGS. 5-6.

In the advisory mode, BAS 308 may control central plant 200, whereas EOS 302 may provide advice. EOS 302 may still determine optimal subplant loads for each of subplants 202-212 and optimal on/off decisions and operating setpoints for equipment 340. However, the optimal values determined by EOS 302 may be provided to BAS 308 as recommended subplant loads and recommended setpoints. The recommended loads and setpoints may also be presented to a user via a user interface. BAS 308 may determine whether to use the recommended loads and setpoints to control central plant 200. In some embodiments, BAS 308 uses input from a user to determine whether to apply the recommended loads and setpoints provided by EOS 302. In some embodiments, EOS 302 displays the recommended loads/setpoints to a user and the user enters the recommended loads/setpoints as an input to BAS 308. In other embodiments, BAS 308 receives the recommended loads/setpoints directly from EOS 302. The advisory mode is described in greater detail with reference to FIGS. 7-8.

In the manual mode, EOS 302 may control central plant 200 based on user input. Similar to the advisory mode, EOS 302 may determine optimal subplant loads for each of subplants 202-212 and optimal on/off decisions and operating setpoints for equipment 340. The optimal values determined by EOS 302 may be presented to a user (e.g., via a user interface) as recommended subplant loads and recommended setpoints. A user can accept the optimized values or enter user-defined (i.e., "manual") values for the subplant loads, equipment on/off decisions, and/or operating setpoints via the user interface. In some embodiments, the user-defined values override the optimized values when EOS 302 is operated in the manual mode. For example, EOS 302 may determine on/off decisions and control setpoints for equipment 340 based on the user-defined load setpoints for each of subplants 302-312. The manual mode is described in greater detail with reference to FIGS. 9-10.

Still referring to FIG. 3, EOS 302 is shown to include a communications interface 304 and a processing circuit 306. Communications interface 304 may include wired or wireless interfaces (e.g., jacks, antennas, transmitters, receivers, transceivers, wire terminals, etc.) for conducting data communications with various systems, devices, or networks. For example, communications interface 304 may include an Ethernet card and port for sending and receiving data via an Ethernet-based communications network and/or a WiFi transceiver for communicating via a wireless communications network. Communications interface 304 may be configured to communicate via local area networks or wide area networks (e.g., the Internet, a building WAN, etc.) and may use a variety of communications protocols (e.g., BACnet, IP, LON, etc.).

Communications interface 304 may be a network interface configured to facilitate electronic data communications between EOS 302 and various external systems or devices (e.g., BAS 308, subplants 202-212, etc.). For example, EOS 302 may receive information from BAS 308 indicating one or more measured states of the controlled building (e.g., temperature, humidity, electric loads, etc.) and one or more states of subplants 202-212 (e.g., equipment status, power consumption, equipment availability, etc.). Communications interface 304 may receive inputs from BAS 308 and/or subplants 202-212 and may provide operating parameters (e.g., on/off decisions, setpoints, etc.) to subplants 202-212 via BAS 308. The operating parameters may cause subplants 202-212 to activate, deactivate, or adjust a setpoint for various devices of equipment 340.

Still referring to FIG. 3, processing circuit 306 is shown to include a processor 310 and memory 312. Processor 310 may be a general purpose or specific purpose processor, an application specific integrated circuit (ASIC), one or more field programmable gate arrays (FPGAs), a group of processing components, or other suitable processing components. Processor 310 may be configured to execute computer code or instructions stored in memory 312 or received from other computer readable media (e.g., CDROM, network storage, a remote server, etc.).

Memory 312 may include one or more devices (e.g., memory units, memory devices, storage devices, etc.) for storing data and/or computer code for completing and/or facilitating the various processes described in the present disclosure. Memory 312 may include random access memory (RAM), read-only memory (ROM), hard drive storage, temporary storage, non-volatile memory, flash memory, optical memory, or any other suitable memory for storing software objects and/or computer instructions. Memory 312 may include database components, object code components, script components, or any other type of information structure for supporting the various activities and information structures described in the present disclosure. Memory 312 may be communicably connected to processor 310 via processing circuit 306 and may include computer code for executing (e.g., by processor 310) one or more processes described herein.

Still referring to FIG. 3, memory 312 is shown to include a building status monitor 334. EOS 302 may receive data regarding the overall building or building space to be heated or cooled with central plant 200 via building status monitor 334. In an exemplary embodiment, building status monitor 334 may include a graphical user interface component configured to provide graphical user interfaces to a user for selecting building requirements (e.g., overall temperature parameters, selecting schedules for the building, selecting different temperature levels for different building zones, etc.).

EOS 302 may determine on/off configurations and operating setpoints to satisfy the building requirements received from building status monitor 334. In some embodiments, building status monitor 334 receives, collects, stores, and/or transmits cooling load requirements, building temperature setpoints, occupancy data, weather data, energy data, schedule data, and other building parameters. In some embodiments, building status monitor 334 stores data regarding energy costs, such as pricing information available from utilities 326 (energy charge, demand charge, etc.).

Still referring to FIG. 3, memory 312 is shown to include a load/rate predictor 322. Load/rate predictor 322 may be configured to predict the thermal energy loads $\hat{l}_k$) of the building or campus for each time step k (e.g., k=1 . . . n) of an optimization period. Load/rate predictor 322 is shown receiving weather forecasts from a weather service 324. In some embodiments, load/rate predictor 322 predicts the thermal energy loads $\hat{l}_k$ as a function of the weather forecasts. In some embodiments, load/rate predictor 322 uses feedback from BAS 308 to predict loads $\hat{l}_k$. Feedback from BAS 308 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 322 receives a measured electric load and/or previous measured load data from BAS 308 (e.g., via building status monitor 334). Load/rate predictor 322 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k=f(\hat{\phi}_w,\text{day},t|Y_{k-1})$$

In some embodiments, load/rate predictor 322 uses a deterministic plus stochastic model trained from historical load data to predict loads $\hat{l}_k$. Load/rate predictor 322 may use any of a variety of prediction methods to predict loads $\hat{l}_k$ (e.g., linear regression for the deterministic portion and an AR model for the stochastic portion). Load/rate predictor 322 may predict one or more different types of loads for the building or campus. For example, load/rate predictor 322 may predict a hot water load $\hat{l}_{Hot,k}$ and a cold water load $\hat{l}_{Cold,k}$ for each time step k within the prediction window.

Load/rate predictor 322 is shown receiving utility rates from utilities 326. Utility rates may indicate a cost or price per unit of a resource (e.g., electricity, natural gas, water, etc.) provided by utilities 326 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 326 or predicted utility rates estimated by load/rate predictor 322.

In some embodiments, the utility rates include demand charges for one or more resources provided by utilities 326. A demand charge may define a separate cost imposed by utilities 326 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, central plant optimizer 328 may be configured to account for demand charges in the high level optimization process performed by high level optimizer 330. Utilities 326 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate predictor 322 may store the predicted loads $\hat{l}_k$ and the utility rates in memory 312 and/or provide the predicted loads $\hat{l}_k$ and the utility rates to central plant optimizer 328. Central plant optimizer 328 may use the predicted loads $\hat{l}_k$ and the utility rates to determine an optimal load distribution for subplants 202-212 and to generate on/off decisions and setpoints for equipment 340.

Still referring to FIG. 3, memory 312 is shown to include an central plant optimizer 328. Central plant optimizer 328 may perform a cascaded optimization process to optimize the performance of central plant 200. For example, central plant optimizer 328 is shown to include a high level optimizer 330 and a low level optimizer 332. High level optimizer 330 may control an outer (e.g., subplant level) loop of the cascaded optimization. High level optimizer 330 may determine an optimal distribution of thermal energy loads across subplants 202-212 for each time step in the prediction window in order to optimize (e.g., minimize) the cost of energy consumed by subplants 202-212. Low level optimizer 332 may control an inner (e.g., equipment level) loop of the cascaded optimization. Low level optimizer 332 may determine how to best run each subplant at the load setpoint determined by high level optimizer 330. For example, low level optimizer 332 may determine on/off states and/or operating setpoints for various devices of equipment 340 in order to optimize (e.g., minimize) the energy consumption of each subplant while meeting the thermal energy load setpoint for the subplant. The cascaded optimization process is described in greater detail with reference to FIG. 4.

Still referring to FIG. 3, memory 312 is shown to include a subplant monitor 338. Subplant monitor 338 may collect and store information regarding the past, current, and future (e.g., planned) utilization of subplants 202-212. For example, subplant monitor 338 may receive actual utilization data from BAS 308 and/or central plant 200 indicating the actual thermal energy loads served by heater subplant 202, heat recovery chiller subplant 204, and chiller subplant 206. The actual utilization data may be current utilization data (e.g., the actual thermal energy loads currently being served) or past utilization data (e.g., the actual thermal energy loads served at a previous time). The actual utilization data may also indicate the past or current charging or discharging rates for hot TES subplant 210 and cold TES subplant 212 and the past or current status (i.e., storage level) of TES subplants 210-212. In some embodiments, the actual utilization data indicates a total heating load and/or a total cooling load requested to be served by central plant 200 at a past or current time. The actual utilization data may also indicate any unmet heating and/or cooling load that is requested but not met by central plant 200 at a past or current time. In some embodiments, the actual utilization data indicates a past or current rate of utility consumption (e.g., water consumption, electricity consumption, natural gas consumption, photovoltaic energy consumption, etc.).

The actual utilization data may be provided at various levels of granularity. For example, the actual utilization data for a given subplant (e.g., chiller subplant 206) may include an aggregate value that represents the total thermal energy load served by the subplant (e.g., the total load served by all of chillers 232). In other embodiments, the actual utilization data may be provided for each of the individual devices within subplants 202-212 (e.g., the cooling load served by each of chillers 232 individually).

In some embodiments, subplant monitor 338 receives the actual utilization data as a continuous data signal. In other embodiments, subplant monitor 338 receives the actual utilization data at regular intervals (e.g., every minute, every fifteen minutes, every hour, etc.). Subplant monitor 338 may store the actual utilization data in memory 312 or in a separate subplant utilization database. In some embodiments, subplant monitor 338 stores the actual utilization data at regular intervals such that the stored utilization data represents a history of the relevant operating information for central plant 200 over time.

Subplant monitor 338 may receive predicted future utilization data indicating the thermal energy loads to be served by heater subplant 202, heat recovery chiller subplant 204, and chiller subplant 206 at a future time. The predicted utilization data may also indicate the predicted charging or discharging rates for hot TES subplant 210 and cold TES subplant 212 and the predicted status (i.e., storage level) of TES subplants 210-212 at a future time. In some embodiments, the predicted utilization data for subplants 202-212 is generated by central plant optimizer 328 for multiple time steps during a prediction window. For example, the predicted utilization data may include the optimal subplant loads predicted by high level optimizer 330 and/or the optimal equipment on/off states predicted by low level optimizer 332 for each time step during the prediction window.

In some embodiments, the predicted utilization data indicates a total heating load and/or a total cooling load predicted by load/rate predictor 322. The predicted utilization data may also indicate any unmet heating and/or cooling load that is predicted to be requested but not met by central plant 200. In some embodiments, the predicted utilization data indicates a predicted rate of utility consumption (e.g., water consumption, electricity consumption, natural gas consumption, photovoltaic energy consumption, etc.).

The predicted utilization data may be provided at various levels of granularity. For example, the predicted utilization data for a given subplant (e.g., chiller subplant 206) may include an aggregate value that represents the total thermal energy load estimated to be served by the subplant (e.g., the total predicted load served by all of chillers 232). In other embodiments, the predicted utilization data may be provided for each of the individual devices within subplants 202-212 (e.g., the predicted cooling load served by each of chillers 232 individually).

In some embodiments, subplant monitor 338 receives the predicted utilization data for each of a plurality of time steps during a prediction window. For example, central plant optimizer 328 may perform an optimization process (described in greater detail with reference to FIG. 4) to generate subplant load values for each time step during a prediction window that extends from the current time to a predetermined prediction horizon. Each time step may have a defined duration (e.g., fifteen minutes, one hour, etc.). The predicted subplant load values may be updated each time the optimization process is performed. Subplant monitor 338 may store the predicted utilization data in memory 312 or in a separate subplant utilization database. In some embodiments, subplant monitor 338 stores the predicted utilization data at regular intervals (e.g., hourly intervals) such that the stored utilization data represents a planned dispatch schedule for central plant 200 over time.

Data and processing results from central plant optimizer 328, subplant monitor 338, or other modules of EOS 302 may be accessed by (or pushed to) monitoring and reporting applications 336. Monitoring and reporting applications 336 may be configured to generate real time system health dashboards that can be viewed and navigated by a user (e.g., a central plant engineer). For example, monitoring and reporting applications 336 may include a web-based monitoring application with several graphical user interface (GUI) elements (e.g., widgets, dashboard controls, windows, etc.) for displaying key performance indicators (KPI) or other information to users of a GUI. In some embodiments, the GUI elements include a chart or graph (e.g., a dispatch bar chart) that represents the actual and predicted utilization data provided by subplant monitor 338. GUI elements or reports may be generated and shown based on actual and predicted utilization data that allow users to monitor the performance of subplants 202-212 and central plant 200 as a whole using a single screen. An exemplary dispatch GUI that may be generated by monitoring and reporting applications 336 is described in greater detail with reference to FIGS. 11-24.

Still referring to FIG. 3, EOS 302 may include one or more GUI servers, web services 314, or GUI engines 316 to support monitoring and reporting applications 336. In various embodiments, applications 336, web services 314, and GUI engine 316 may be provided as separate components outside of EOS 302 (e.g., as part of a smart building manager). EOS 302 may be configured to maintain detailed historical databases (e.g., relational databases, XML, databases, etc.) of relevant data and includes computer code modules that continuously, frequently, or infrequently query, aggregate, transform, search, or otherwise process the data maintained in the detailed databases. EOS 302 may be configured to provide the results of any such processing to other databases, tables, XML, files, or other data structures for further querying, calculation, or access by, for example, external monitoring and reporting applications.

EOS 302 is shown to include configuration tools 318. Configuration tools 318 can allow a user to define (e.g., via graphical user interfaces, via prompt-driven wizards, etc.) how EOS 302 should react to changing conditions in the central plant subsystems. In an exemplary embodiment, configuration tools 318 allow a user to build and store condition-response scenarios that can cross multiple central plant devices, multiple building systems, and multiple enterprise control applications (e.g., work order management system applications, entity resource planning applications, etc.). For example, configuration tools 318 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 318 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 4:
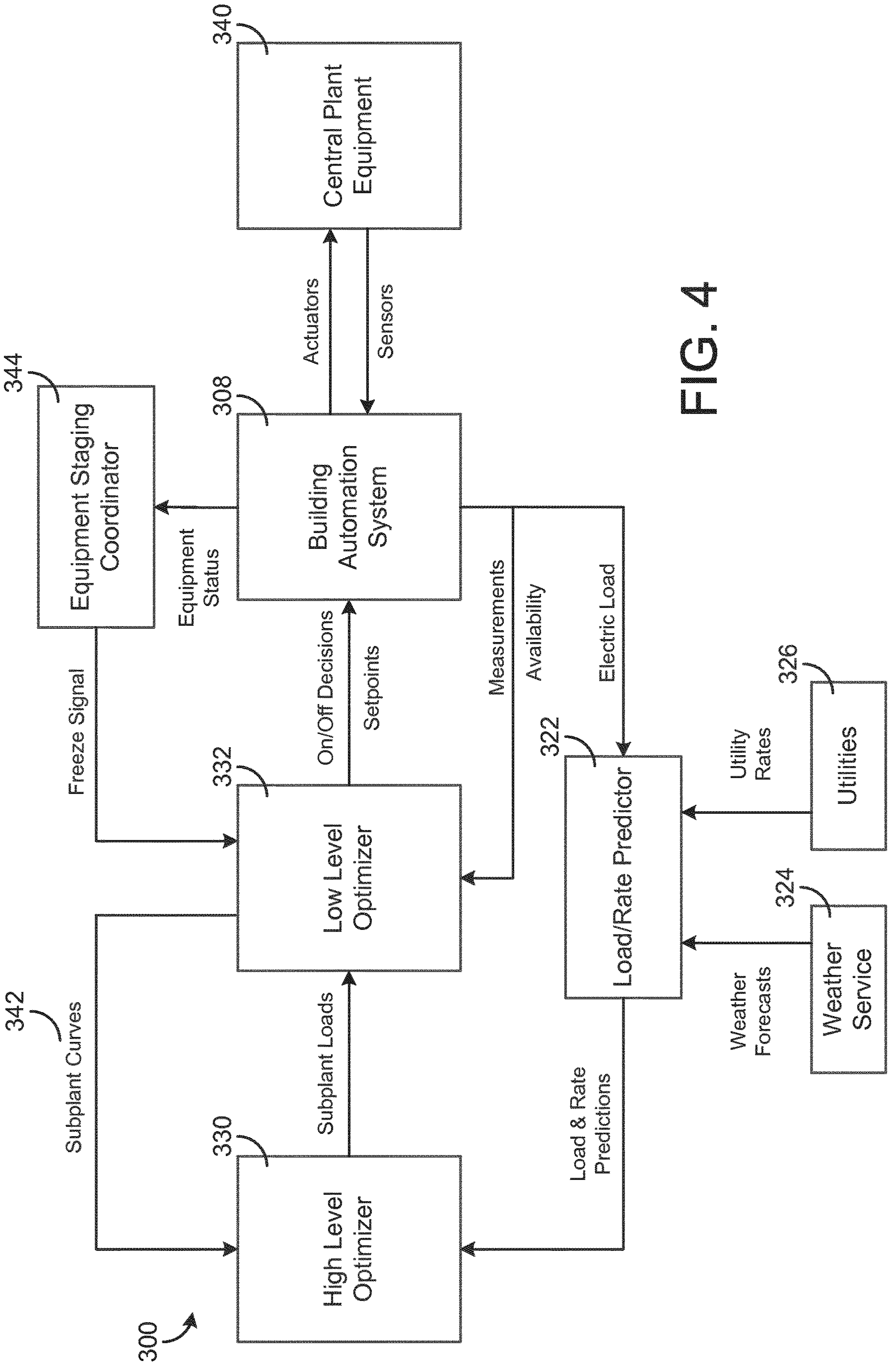
FIG. 4 is a block diagram of a central plant system illustrating a cascaded optimization process which may be performed by the EOS of FIG. 3, according to an exemplary embodiment.

Referring now to FIG. 4, a block diagram illustrating a portion of central plant system 300 in greater detail is shown, according to an exemplary embodiment. FIG. 4 illustrates the cascaded optimization process performed by central plant optimizer 328 to optimize the performance of central plant 200. In the cascaded optimization process, high level optimizer 330 performs a subplant level optimization that determines an optimal distribution of thermal energy loads across subplants 202-212 for each time step in the prediction window in order to minimize the cost of energy consumed by subplants 202-212. Low level optimizer 332 performs an equipment level optimization that determines how to best run each subplant at the subplant load setpoint determined by high level optimizer 330. For example, low level optimizer 332 may determine on/off states and/or operating setpoints for various devices of equipment 340 in order to optimize the energy consumption of each subplant while meeting the thermal energy load setpoint for the subplant.

One advantage of the cascaded optimization process performed by central plant optimizer 328 is the optimal use of computational time. For example, the subplant level optimization performed by high level optimizer 330 may use a relatively long time horizon due to the operation of the thermal energy storage. However, the equipment level optimization performed by low level optimizer 332 may use a much shorter time horizon or no time horizon at all since the low level system dynamics are relatively fast (compared to the dynamics of the thermal energy storage) and the low level control of equipment 340 may be handled by BAS 308. Such an optimal use of computational time makes it possible for central plant optimizer 328 to perform the central plant optimization in a short amount of time, allowing for real-time predictive control. For example, the short computational time enables central plant optimizer 328 to be implemented in a real-time planning tool with interactive feedback.

Another advantage of the cascaded optimization performed by central plant optimizer 328 is that the central plant optimization problem can be split into two cascaded subproblems. The cascaded configuration provides a layer of abstraction that allows high level optimizer 330 to distribute the thermal energy loads across subplants 202-212 without requiring high level optimizer 330 to know or use any details regarding the particular equipment configuration within each subplant. The interconnections between equipment 340 within each subplant may be hidden from high level optimizer 330 and handled by low level optimizer 332. For purposes of the subplant level optimization performed by high level optimizer 330, each subplant may be completely defined by one or more subplant curves 342.

Low level optimizer 332 may generate and provide subplant curves 342 to high level optimizer 330. Subplant curves 342 may indicate the rate of utility use by each of subplants 202-212 (e.g., electricity use measured in kW, water use measured in L/s, etc.) as a function of the subplant load. In some embodiments, low level optimizer 332 generates subplant curves 342 based on equipment models 320 (e.g., by combining equipment models 320 for individual devices into an aggregate curve for the subplant). Low level optimizer 332 may generate subplant curves 342 by running the low level optimization process for several different loads and weather conditions to generate multiple data points. Low level optimizer 332 may fit a curve to the data points to generate subplant curves 342. In other embodiments, low level optimizer 332 provides the data points to high level optimizer 330 and high level optimizer 330 generates the subplant curves using the data points.

High level optimizer 330 may receive the load and rate predictions from load/rate predictor 322 and the subplant curves 342 from low level optimizer 332. The load predictions may be based on weather forecasts from weather service 324 and/or information from building automation system 308 (e.g., a current electric load of the building, measurements from the building, a history of previous loads, a setpoint trajectory, etc.). The utility rate predictions may be based on utility rates received from utilities 326 and/or utility prices from another data source. High level optimizer 330 may determine the optimal load distribution for subplants 202-212 (e.g., a subplant load for each subplant) for each time step the prediction window and may provide the subplant loads as setpoints to low level optimizer 332. In some embodiments, high level optimizer 330 determines the subplant loads by minimizing the total operating cost of central plant 200 over the prediction window. In other words, given a predicted load and utility rate information from load/rate predictor 322, high level optimizer 330 may distribute the predicted load across subplants 202-212 over the optimization period to minimize operating cost.

In some instances, the optimal load distribution may include using TES subplants 210 and/or 212 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 210-212. The high level optimization may be described by the following equation:

$$\theta^*_{HL} = \underset{\theta_{HL}}{\arg\min}\, J_{HL}(\theta_{HL})$$

where $\theta^*_{HL}$ contains the optimal high level decisions (e.g., the optimal load for each of subplants 202-212) for the entire optimization period and $J_{HL}$ is the high level cost function.

To find the optimal high level decisions $\theta^*_{HL}$, high level optimizer 330 may minimize the high level cost function $J_{HL}$. The high level cost function $J_{HL}$ may be the sum of the economic (e.g., monetary) costs of each utility consumed by each of subplants 202-212 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \max_{n_h}(u_{elec}(\theta_{HL}), u_{max,ele})$$

where $w_d$ is a weighting term, $c_{demand}$ is the demand cost, and the max( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \max_{n_h}(u_{elec}(\theta_{HL}), u_{max,ele})$$

The decision vector $\theta_{HL}$ may be subject to several constraints. For example, the constraints may require that the subplants not operate at more than their total capacity, that the thermal storage not charge or discharge too quickly or under/over flow for the tank, and that the thermal energy loads for the building or campus are met. These restrictions may lead to both equality and inequality constraints on the high level optimization problem.

In some embodiments, the high level optimization performed by high level optimizer 330 is the same or similar to the high level optimization process described in U.S. patent application Ser. No. 14/634,609 filed Feb. 27, 2015 and titled "High Level Central Plant Optimization," the entire disclosure of which is incorporated by reference herein. High level optimizer 330 may include some or all of the features and/or functionality of the high level optimization module described in U.S. patent application Ser. No. 14/634,609.

Still referring to FIG. 4, low level optimizer 332 may use the subplant loads determined by high level optimizer 330 to determine optimal low level decisions $\theta^*_{LL}$ (e.g. binary on/off decisions, flow setpoints, temperature setpoints, etc.) for equipment 340. The low level optimization process may be performed for each of subplants 202-212. In various embodiments, the low level optimization process may be performed by centralized low level optimizer 332 that performs a separate low level optimization for each of subplants 202-212 or by a set of subplant level controllers that operate within each subplant (e.g., each subplant controller running an instance of low level optimizer 332). Low level optimizer 332 may be responsible for determining which devices of the subplant to use and/or the operating setpoints for such devices that will achieve the subplant load setpoint while minimizing energy consumption. The low level optimization may be described using the following equation:

$$\theta^*_{LL} = \underset{\theta_{LL}}{\arg\min}\, J_{LL}(\theta_{LL})$$

where $\theta^*_{LL}$ contains the optimal low level decisions and $J_{LL}$ is the low level cost function.

To find the optimal low level decisions $\theta^*_{LL}$, low level optimizer 332 may minimize the low level cost function $J_{LL}$.

The low level cost function $J_{LL}$ may represent the total energy consumption for all of equipment 340 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 340 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimizer 332 may minimize the low level cost function $J_{LL}$ subject to inequality constraints based on the capacities of equipment 340 and equality constraints based on energy and mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off. In some embodiments, low level optimizer 332 performs the equipment level optimization without considering system dynamics. The optimization process may be slow enough to safely assume that the equipment control has reached its steady-state. Thus, low level optimizer 332 may determine the optimal low level decisions $\theta^*_{LL}$ at an instance of time rather than over a long horizon.

In some embodiments, the optimal low level decisions $\theta^*_{LL}$ are constrained by an equipment staging coordinator 344 that prevents two or more of subplants 202-212 from reacting to a change in the subplant load too quickly after a change in another of subplants 202-212 has occurred. For example, equipment staging coordinator 344 is shown receiving equipment status information from BAS 308. Equipment staging coordinator 344 may use the equipment status information to determine when the equipment 340 within a given subplant has been staged (e.g., turned on/off). Equipment staging coordinator 344 may prevent multiple subplants from staging their equipment 340 simultaneously or within a predetermined time period after another subplant has staged its equipment 340. Advantageously, this functionality reduces the peak energy consumption for central plant 200 at any instant in time and results in a lower demand charge.

In some embodiments, equipment staging coordinator 344 causes low level optimizer 332 to halt its efficiency calculations and hold the optimal low level decisions $\theta^*_{LL}$ for a given subplant at previously-determined values shortly after the equipment 340 for another subplant has been staged (e.g., by providing a freeze signal to low level optimizer 332). Once a threshold time has passed since the equipment 340 for the other subplant has been staged, equipment staging coordinator 344 may allow low level optimizer 332 to resume its efficiency calculations and to determine new values for the optimal low level decisions $\theta^*_{LL}$ (e.g., by withdrawing the freeze signal).

Low level optimizer 332 may determine optimum operating statuses (e.g., on or off) for a plurality of devices of equipment 340. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimizer 332 may also determine optimum operating setpoints for equipment using nonlinear optimization. Nonlinear optimization may identify operating setpoints that further minimize the low level cost function $J_{LL}$. Low level optimizer 332 may provide the on/off decisions and setpoints to building automation system 308 for use in controlling the central plant equipment 340.

In some embodiments, the low level optimization performed by low level optimizer 332 is the same or similar to the low level optimization process described in U.S. patent application Ser. No. 14/634,615 filed Feb. 27, 2015 and titled "Low Level Central Plant Optimization," the entire disclosure of which is incorporated by reference herein. Low level optimizer 332 may include some or all of the features and/or functionality of the low level optimization module described in U.S. patent application Ser. No. 14/634,615.

Automatic, Advisory, and Manual Operating Modes

Referring now to FIGS. 5-10, several block diagrams and flow diagrams illustrating the operation of enterprise optimization system (EOS) 302 in an automatic operating mode (FIGS. 5-6), advisory operating mode (FIGS. 7-8), and manual operating mode (FIGS. 9-10) are shown, according to an exemplary embodiment. In brief overview, EOS 302 may determine optimal subplant loads and optimal equipment setpoints in each of the operating modes. In the automatic operating mode, EOS 302 may provide the optimal equipment setpoints to central plant 200. In the advisory operating mode, EOS 302 may provide the optimal subplant loads and equipment setpoints to a user interface as recommended setpoints for central plant 200. A user may view the recommended setpoints and provide user-defined setpoints for building automation system 308, which may or may not be based on the recommended setpoints. In the manual operating mode, EOS 302 may control central plant 200 based on manual (i.e., user-defined) subplant loads received via a user interface of EOS 302. EOS 302 may use the manual subplant loads to generate recommended equipment setpoints and equipment control signals that achieve the manual subplant loads. The equipment control signals may then be provided to central plant 200. Each of these operating modes is discussed in greater detail below.

Automatic Operating Mode

Figure 5:
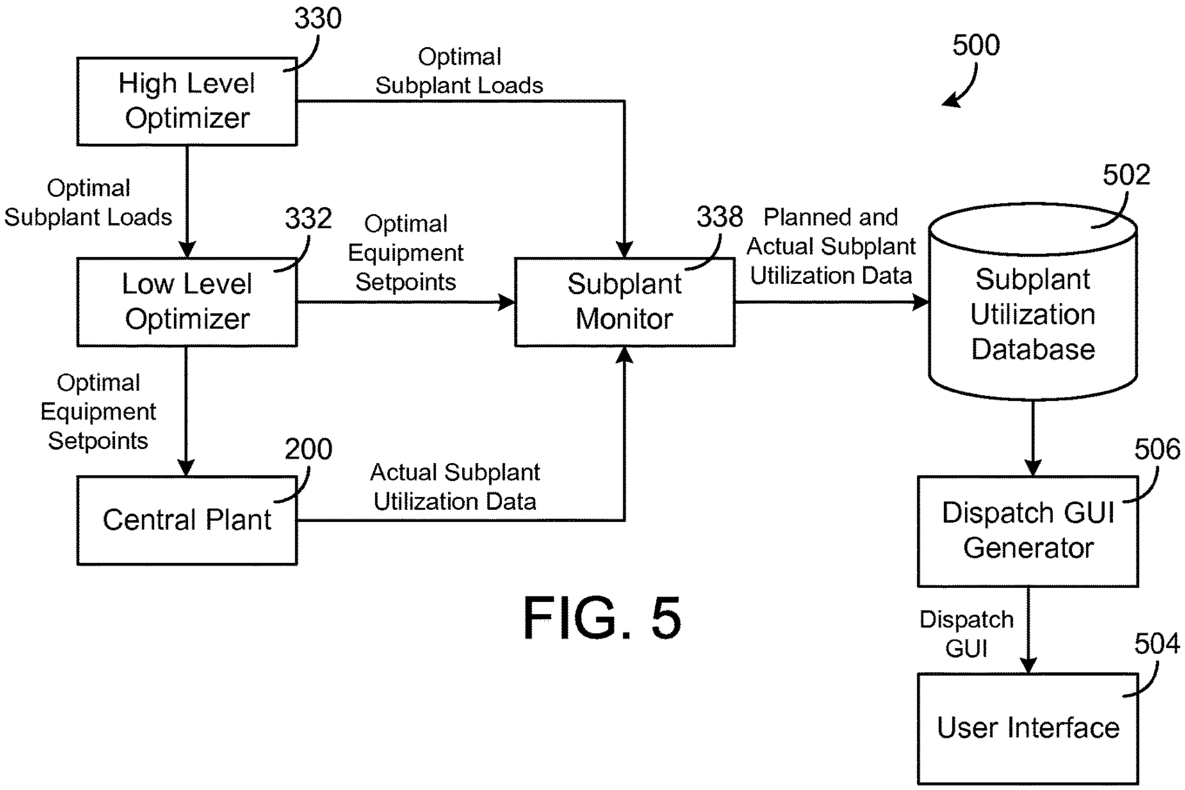
FIG. 5 is a block diagram illustrating the operation of the EOS of FIG. 3 in an automatic operating mode, according to an exemplary embodiment.

Referring now to FIG. 5, a block diagram illustrating a system 500 for monitoring and controlling a central plant in an automatic operating mode is shown, according to an exemplary embodiment. In the automatic operating mode, EOS 302 automatically determines optimal subplant loads for each of subplants 202-212 and optimal equipment setpoints for the central plant equipment 340. EOS 302 provides the optimal equipment setpoints to central plant 200, which uses the optimal equipment setpoints to control the central plant equipment 340. EOS 302 monitors actual subplant utilization via subplant monitor 338 and stores planned and actual subplant utilization data in a subplant utilization database 502. A dispatch GUI generator 506 uses the planned and actual subplant utilization data to generate a dispatch GUI. The dispatch GUI may be presented to a user via a user interface 504 to allow the user to monitor the operation of central plant 200.

System 500 is shown to include high level optimizer 330, low level optimizer 332, and central plant 200, which may be the same or similar as described with reference to FIGS. 2-4. For example, high level optimizer 330 may perform an optimization process to generate a set of optimal subplant loads for each of subplants 202-212. In some embodiments, the optimal subplant loads include a heating load served by heating subplant 202, a heating load served by heat recovery chiller subplant 204, a cooling load served by heat recovery chiller subplant 204, a cooling load served by chiller subplant 206, a heating load served or stored by hot TES subplant 210 (e.g., a rate at which hot TES subplant 210 is charging or discharging), and/or a cooling load served or stored by cold TES subplant 212 (e.g., a rate at which cold TES subplant 212 is charging or discharging). The heating and cooling loads served by hot TES subplant 210 and cold TES subplant 212, respectively, may be positive if the TES subplant is discharging stored thermal energy or negative if the TES subplant is charging or storing the thermal energy produced by other subplants.

In some embodiments, the optimal subplant loads include a charge state for TES subplants 210-212 defining an amount of thermal energy stored in each of TES subplants 210-212. In some embodiments, the optimal subplant loads include a total cold requested load and a total hot requested load. In some embodiments, the optimal subplant loads include an unmet heating load and/or an unmet cooling load. The unmet heating load may be defined as the amount by which the total requested heating load exceeds the sum of the heating loads produced by subplants 202-212. Similarly, the unmet cooling load may be defined as the amount by which the total requested cooling load exceeds the sum of the cooling loads produced by subplants 202-212. In some embodiments, the optimal subplant loads include an optimal amount of one or more resources (e.g., water, electricity, natural gas, etc.) consumed by subplants 202-212 to generate the optimal subplant loads.

High level optimizer 330 may determine the optimal subplant loads for a plurality of time steps between the current time and a future time horizon. Each of the time steps may have a defined or predetermined duration (e.g., fifteen minutes, one hour, etc.). The optimal subplant loads may be updated with each iteration of the high level optimization process. High level optimizer 330 may provide the optimal subplant loads to low level optimizer 332 and to subplant monitor 338. Subplant monitor 338 may store the optimal subplant loads as planned subplant utilization data in a subplant utilization database 502.

Low level optimizer 332 may use the optimal subplant loads to generate a set of optimal equipment setpoints for the equipment of subplants 202-212. The optimal equipment setpoints may include on/off states, operating setpoints, and/or other setpoints defining the utilization of individual devices of the subplants 202-212. The optimal equipment setpoints may include setpoints for individual devices of subplants 202-212 in order for each subplant to meet the optimal subplant load. In some embodiments, low level optimizer 332 performs an optimization process to generate the optimal equipment setpoints. Low level optimizer 332 may provide the optimal equipment setpoints to central plant 200 and to subplant monitor 338. Subplant monitor 338 may store the optimal equipment setpoints as planned subplant utilization data in subplant utilization database 502. In various embodiments, subplant utilization database 502 may be a component of EOS 302 (e.g., memory 312) or a separate database outside EOS 302.

Central plant 200 may use the optimal equipment setpoints to operate the equipment of subplants 202-212. Central plant 200 may monitor the utilization of subplants 202-212 and generate a set of actual subplant utilization data. The actual subplant utilization data may include actual values (rather than optimal values) for each of the subplant loads optimized by high level optimizer 330. For example, the actual subplant utilization data may include an actual heating load served by heating subplant 202, an actual heating load served by heat recovery chiller subplant 204, an actual cooling load served by heat recovery chiller subplant 204, an actual cooling load served by chiller subplant 206, an actual heating load served or stored by hot TES subplant 210 (e.g., a rate at which hot TES subplant 210 is charging or discharging), and/or an actual cooling load served or stored by cold TES subplant 212 (e.g., a rate at which cold TES subplant 212 is charging or discharging). The actual heating and cooling loads served by hot IES subplant 210 and cold TES subplant 212, respectively, may be positive if the TES subplant is discharging stored thermal energy or negative if the TES subplant is charging or storing the thermal energy produced by other subplants.

In some embodiments, the actual subplant utilization data include a charge state for IES subplants 210-212 defining an actual amount of thermal energy stored in each of TES subplants 210-212. In some embodiments, the actual subplant utilization data include a total cold requested load and a total hot requested load. In some embodiments, the actual subplant utilization data include an actual unmet heating load and/or unmet cooling load. In some embodiments, the actual subplant utilization data include an actual amount of one or more resources (e.g., water, electricity, natural gas, etc.) consumed by subplants 202-212 to generate the actual subplant loads.

Central plant 200 may report the actual subplant utilization data to subplant monitor 338. In some embodiments, central plant 200 reports the actual subplant utilization data at regular intervals (e.g., once every fifteen minutes, once per hour, etc.) Subplant monitor 338 may store the actual subplant utilization data in subplant utilization database 502. In some embodiments, subplant monitor 338 overwrites or replaces the planned subplant utilization data for a given time step with the actual subplant utilization data for the time step once the actual subplant utilization data for the time step is available (e.g., once the current time advances to the time step). Similarly, subplant monitor 338 may overwrite or replace the planned subplant data for a given time step with an updated optimal value for the time step each time a new set of optimal subplant utilization data is generated by high level optimizer 330. In other embodiments, subplant monitor 338 supplements the existing planned subplant utilization data with the updated optimal subplant utilization data and/or the actual subplant utilization data without replacing or overwriting the exiting subplant utilization data. For example, the existing subplant utilization data may be stored as a first version of the subplant utilization data and the updated subplant utilization data may be stored as a second version of the subplant utilization data.

Still referring to FIG. 5, system 500 is shown to include a dispatch GUI generator 506. Dispatch GUI generator 506 may access the data stored in subplant utilization database 502 and use the stored data to generate a dispatch GUI. The dispatch GUI may include various graphics (e.g., graphs, charts, flow diagrams, etc.) that illustrate the actual subplant utilization data (e.g., past and current subplant loads) and the planned subplant utilization data (e.g., future subplant loads)

in a graphical format. Exemplary dispatch GUIs which may be generated by dispatch GUI generator 506 are described in greater detail with reference to FIGS. 11-24. Dispatch GUI generator 506 may provide the dispatch GUI to a user interface 504 for presentation to a user.

In various embodiments, dispatch GUI generator 506 and user interface 504 may be components of BAS 308 or components of EOS 302 (e.g., monitoring and reporting applications 336). Dispatch GUI generator 506 may generate the dispatch GUI and provide the dispatch GUI to user interface 504 via a communications network. In other embodiments, dispatch GUI generator 506 and user interface 504 are components of a user device (e.g., a computer terminal, a workstation, a laptop, a tablet, a smartphone, etc.). For example, dispatch GUI generator 506 may be a web browser or a specialized application running on the user device. In some embodiments, the dispatch GUI is rendered using specialized viewing software (e.g., a central plant monitoring application) installed on the user device. In other embodiments, the dispatch GUI is provided via a web interface which allows the dispatch GUI to be rendered and viewed using a web browser without requiring any specialized applications or software to be installed on the user device.

Figure 6:
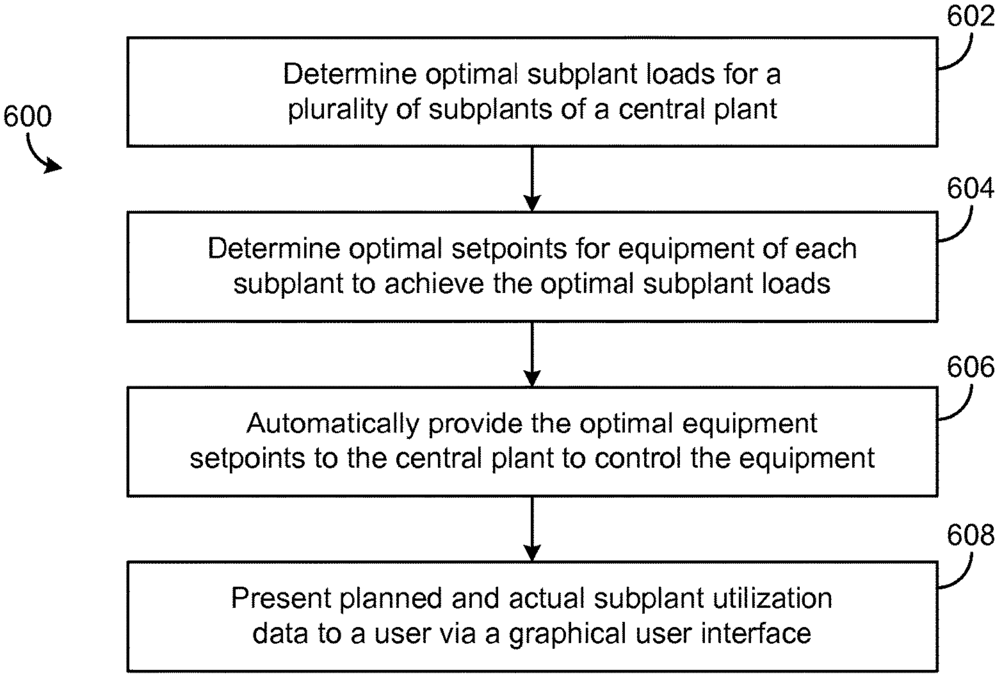
FIG. 6 is a flow diagram illustrating the operation of the EOS of FIG. 3 in the automatic operating mode, according to an exemplary embodiment.

Referring now to FIG. 6, a flow diagram illustrating a process 600 for monitoring and controlling a central plant in the automatic operating mode is shown, according to an exemplary embodiment. Process 600 may be performed by one or more components of central plant system 300 and/or system 500 as previously described. For example, process 600 may be performed by EOS 302, BAS 308, dispatch GUI generator 506, and/or other devices of central plant system 300 or system 500.

Process 600 is shown to include determining optimal subplant loads for a plurality of subplants of a central plant (step 602). Step 602 may be performed by high level optimizer 330. In some embodiments, the optimal subplant loads include a heating load served by heating subplant 202, a heating load served by heat recovery chiller subplant 204, a cooling load served by heat recovery chiller subplant 204, a cooling load served by chiller subplant 206, a heating load served or stored by hot TES subplant 210 (e.g., a rate at which hot TES subplant 210 is charging or discharging), and/or a cooling load served or stored by cold TES subplant 212 (e.g., a rate at which cold TES subplant 212 is charging or discharging), as previously described. Step 602 may include determining the optimal subplant loads for a plurality of time steps between the current time and a future time horizon. Each of the time steps may have a defined or predetermined duration (e.g., fifteen minutes, one hour, etc.). The optimal subplant loads may be updated with each iteration of the high level optimization process. High level optimizer 330 may provide the optimal subplant loads to low level optimizer 332 and to subplant monitor 338. Subplant monitor 338 may store the optimal subplant loads as planned subplant utilization data in a subplant utilization database 502.

Process 600 is shown to include determining optimal setpoints for equipment of each subplant to achieve the optimal subplant loads (step 604). Step 604 may be performed by low level optimizer 332. The optimal equipment setpoints may include on/off states, operating setpoints, and/or other setpoints defining the utilization of individual devices of the subplants 202-212. The optimal equipment setpoints may include setpoints for individual devices of subplants 202-212 in order for each subplant to meet the optimal subplant load. Low level optimizer 332 may provide the optimal equipment setpoints to central plant 200 and to subplant monitor 338. Subplant monitor 338 may store the optimal equipment setpoints as planned subplant utilization data in subplant utilization database 502.

Process 600 is shown to include automatically providing the optimal equipment setpoints to the central plant to control the equipment (step 606). Step 606 may include providing the optimal equipment setpoints from low level optimizer 332 to central plant 200. Central plant 200 may use the optimal equipment setpoints as control inputs for individual devices within each subplant (e.g., individual chillers, individual hot water generators, individual thermal energy storage tanks, etc.). In other words, central plant 200 may operate controllable devices within central plant 200 (e.g., equipment 340) in accordance with the optimal equipment setpoints. For example, central plant 200 may activate a device, deactivate a device, change a setpoint for a device, or otherwise control individual devices of the central plant equipment 340 based on the optimal equipment setpoints. Central plant 200 may provide actual subplant utilization data to subplant monitor 338. Subplant monitor 338 may store the actual subplant utilization data in subplant utilization database 502.

Process 600 is shown to include presenting planned and actual subplant utilization data to a user via a graphical user interface (step 608). Step 608 may be performed by dispatch GUI generator 506. In some embodiments, step 608 includes accessing the data stored in subplant utilization database 502 and using the stored data to generate a dispatch GUI. The dispatch GUI may include various graphics (e.g., graphs, charts, flow diagrams, etc.) that illustrate the actual subplant utilization data (e.g., past and current subplant loads) and the planned subplant utilization data (e.g., future subplant loads) in a graphical format. Dispatch GUI generator 506 may provide the dispatch GUI to a user interface 504 for presentation to a user.

In the automatic operating mode, the optimal subplant loads and equipment setpoints are used to control central plant 200. The optimal values determined by EOS 302 may be automatically provided as inputs to central plant 200. For example, low level optimizer 332 is shown providing the optimal equipment setpoints directly to central plant 200. In other embodiments, the optimal equipment setpoints may be provided to BAS 308, which may use the optimal equipment setpoints to generate control signals for the central plant equipment 340. Advantageously, the automatic operating mode allows EOS 302 to control central plant 200 without requiring user intervention by automatically providing the optimal equipment setpoints to central plant 200.

Advisory Operating Mode

Figure 7:
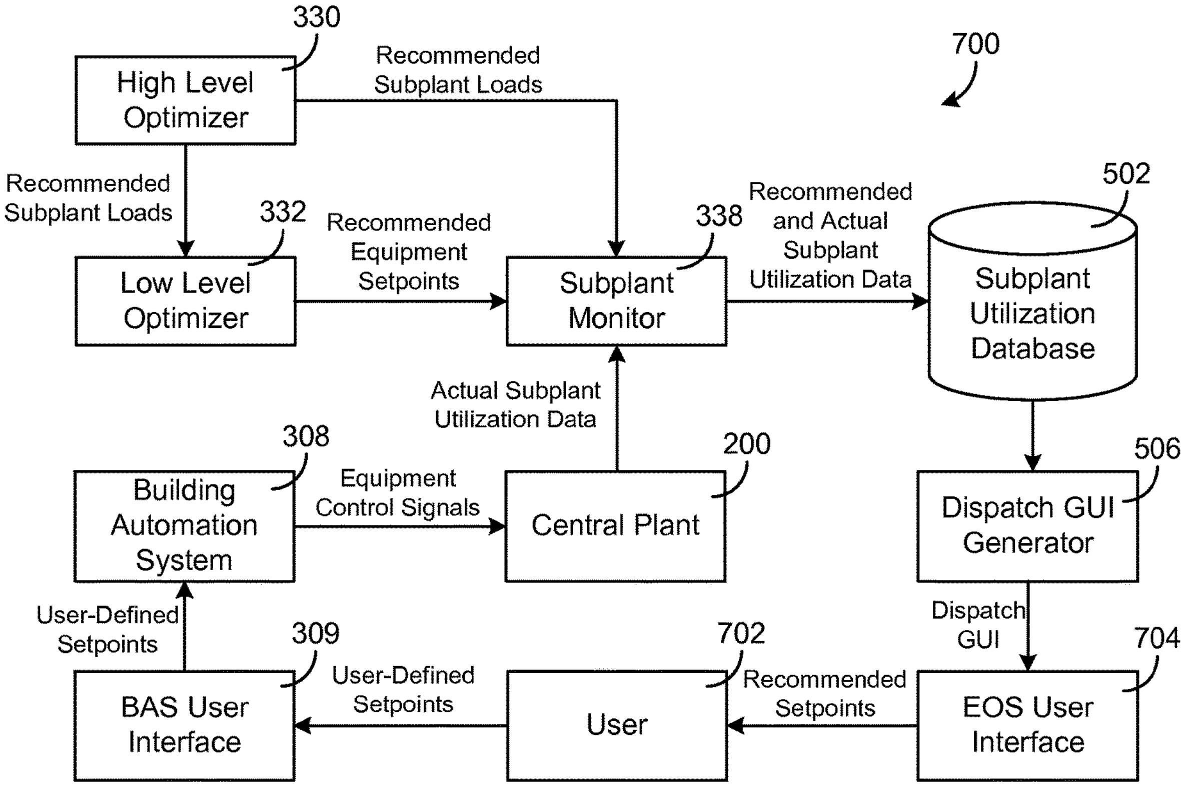
FIG. 7 is a block diagram illustrating the operation of the EOS of FIG. 3 in an advisory operating mode, according to an exemplary embodiment.

Referring now to FIG. 7, a block diagram illustrating a system 700 for monitoring and controlling a central plant in an advisory operating mode is shown, according to an exemplary embodiment. In the advisory operating mode, EOS 302 determines recommended subplant loads for each of subplants 202-212 and recommended equipment setpoints for the central plant equipment 340. The recommended subplant loads and recommended equipment setpoints may be the same or similar to the optimal subplant loads and optimal equipment setpoints as previously described. However, unlike the automatic operating mode, EOS 302 does not automatically provide the recommended equipment setpoints as control inputs to central plant 200. Instead, central plant 200 receives equipment control signals from BAS 308, which may generate the equipment control signals based in part on user-defined setpoints received from a user 702 via a BAS user interface 309.

System 700 is shown to include high level optimizer 330, low level optimizer 332, central plant 200, subplant monitor 338, subplant utilization database 502, dispatch GUI generator 506, and BAS 308, which may be the same or similar as described with reference to FIGS. 2-6. For example, high level optimizer 330 may perform an optimization process to generate a set of recommended subplant loads for each of subplants 202-212. High level optimizer 330 may determine the recommended subplant loads for a plurality of time steps between the current time and a future time horizon. Each of the time steps may have a defined or predetermined duration (e.g., fifteen minutes, one hour, etc.). High level optimizer 330 may provide the recommended subplant loads to low level optimizer 332 and to subplant monitor 338. Subplant monitor 338 may store the recommended subplant loads as recommended subplant utilization data in a subplant utilization database 502.

Low level optimizer 332 may use the recommended subplant loads to generate a set of recommended equipment setpoints for the equipment of subplants 202-212. The recommended equipment setpoints may include on/off states, operating setpoints, and/or other setpoints defining the utilization of individual devices of subplants 202-212. The recommended equipment setpoints may include setpoints for individual devices of subplants 202-212 in order for each subplant to meet the recommended subplant load. In some embodiments, low level optimizer 332 performs an optimization process to generate the recommended equipment setpoints. Low level optimizer 332 may provide the recommended equipment setpoints to subplant monitor 338. Subplant monitor 338 may store the recommended equipment setpoints as recommended subplant utilization data in subplant utilization database 502.

Central plant 200 may monitor the utilization of subplants 202-212 and generate a set of actual subplant utilization data. The actual subplant utilization data may include actual values (rather than recommended values) for each of the subplant loads produced by subplants 202-212. The actual subplant utilization data may also include actual equipment operating states (e.g., on/off states, load production, operating capacities, etc.) for individual devices of central plant equipment 340. Central plant 200 may report the actual subplant utilization data to subplant monitor 338. In some embodiments, central plant 200 reports the actual subplant utilization data at regular intervals (e.g., once every fifteen minutes, once per hour, etc.) Subplant monitor 338 may store the actual subplant utilization data in subplant utilization database 502.

Dispatch GUI generator 506 may access the data stored in subplant utilization database 502 and use the stored data to generate a dispatch GUI. The dispatch GUI may include various graphics (e.g., graphs, charts, flow diagrams, etc.) that illustrate the actual subplant utilization data (e.g., past and current subplant loads) and the recommended subplant utilization data (e.g., future subplant loads) in a graphical format. Dispatch GUI generator 506 may provide the dispatch GUI to EOS user interface 704 for presentation to a user 702.

In system 700, EOS 302 and central plant 200 may be decoupled such that the output of EOS 302 (i.e., recommended subplant loads and equipment setpoints) is not automatically provided as an input to central plant 200. User 702 can view the recommended setpoints (e.g., recommended subplant load setpoints, recommended equipment setpoints, etc.) and monitor actual subplant operation via EOS user interface 704. In some instances, user 702 may use the recommended setpoints to generate the user-defined setpoints provided to BAS 308; however, such use is not automatic or required when EOS 302 is operated in the advisory operating mode. Instead, EOS 302 may provide the recommended setpoints as suggestions or advice, which the user 702 can choose to accept or reject when generating the user-defined setpoints.

Figure 8:
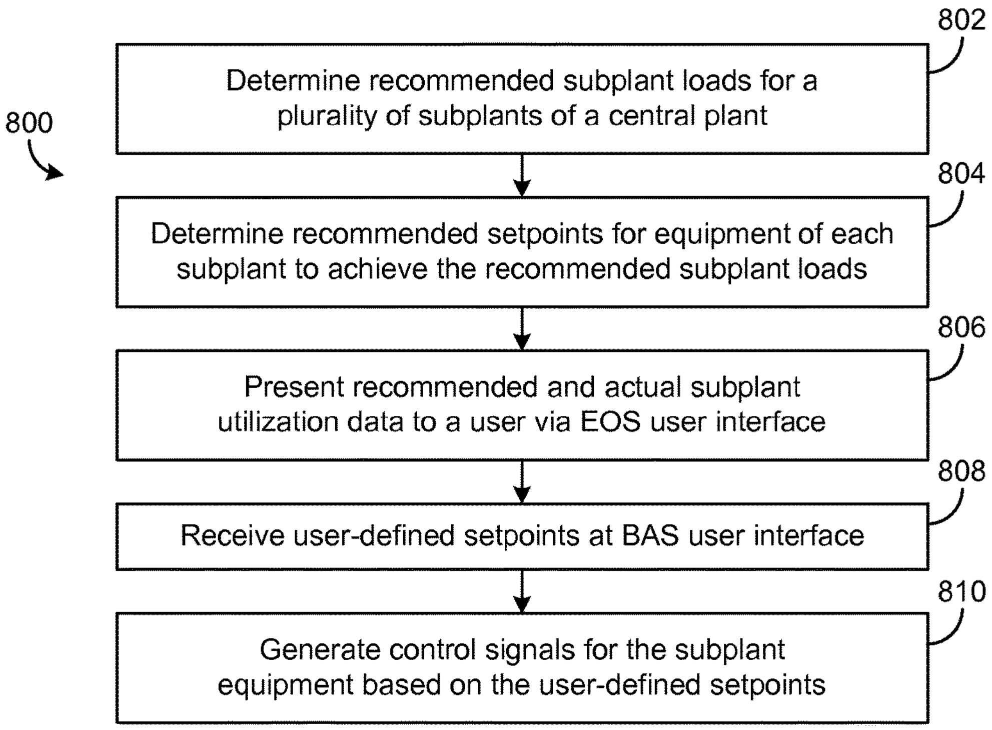
FIG. 8 is a flow diagram illustrating the operation of the EOS of FIG. 3 in the advisory operating mode, according to an exemplary embodiment.

Referring now to FIG. 8, a flow diagram illustrating a process 800 for monitoring and controlling a central plant in the advisory operating mode is shown, according to an exemplary embodiment. Process 800 may be performed by one or more components of central plant system 300 and/or system 700 as previously described. For example, process 800 may be performed by EOS 302, BAS 308, dispatch GUI generator 506, and/or other devices of central plant system 300 or system 700.

Process 800 is shown to include determining recommended subplant loads for a plurality of subplants of a central plant (step 802). Step 802 may be performed by high level optimizer 330. In some embodiments, the recommended subplant loads include a heating load served by heating subplant 202, a heating load served by heat recovery chiller subplant 204, a cooling load served by heat recovery chiller subplant 204, a cooling load served by chiller subplant 206, a heating load served or stored by hot TES subplant 210 (e.g., a rate at which hot TES subplant 210 is charging or discharging), and/or a cooling load served or stored by cold TES subplant 212 (e.g., a rate at which cold TES subplant 212 is charging or discharging), as previously described. Step 802 may include determining the recommended subplant loads for a plurality of time steps between the current time and a future time horizon. Each of the time steps may have a defined or predetermined duration (e.g., fifteen minutes, one hour, etc.). The recommended subplant loads may be updated with each iteration of the high level optimization process. High level optimizer 330 may provide the recommended subplant loads to low level optimizer 332 and to subplant monitor 338. Subplant monitor 338 may store the recommended subplant loads as planned subplant utilization data in a subplant utilization database 502.

Process 800 is shown to include determining recommended setpoints for equipment of each subplant to achieve the recommended subplant loads (step 804). Step 804 may be performed by low level optimizer 332. The recommended equipment setpoints may include on/off states, operating setpoints, and/or other setpoints defining the utilization of individual devices of the subplants 202-212. The recommended equipment setpoints may include setpoints for individual devices of subplants 202-212 in order for each subplant to meet the recommended subplant load. Low level optimizer 332 may provide the recommended equipment setpoints to central plant 200 and to subplant monitor 338. Subplant monitor 338 may store the recommended equipment setpoints as planned subplant utilization data in subplant utilization database 502.

Process 800 is shown to include presenting recommended and actual subplant utilization data to a user via an EOS user interface (e.g., EOS user interface 704) (step 806). Step 806 may be performed by dispatch GUI generator 506 and/or EOS user interface 704. The recommended subplant utilization data may include the recommended subplant loads generated by high level optimizer 330 and/or the recommended equipment setpoints generated by low level optimizer 332. The actual subplant utilization data may include data describing the actual operation of central plant 200 (e.g., actual subplant loads, actual equipment setpoints, etc.), which may be collected by subplant monitor 338 and stored in subplant utilization database 502.

In some embodiments, step 806 includes accessing the data stored in subplant utilization database 502 and using the stored data to generate a dispatch GUI. The dispatch GUI may include various graphics (e.g., graphs, charts, flow diagrams, etc.) that illustrate the actual subplant utilization data (e.g., past and current subplant loads) and the planned subplant utilization data (e.g., future subplant loads) in a graphical format. Dispatch GUI generator 506 may provide the dispatch GUI to EOS user interface 704 for presentation to a user 702.

Process 800 is shown to include receiving user-defined setpoints at a BAS user interface (e.g., BAS user interface 309) (step 808) and generating control signals for the subplant equipment based on the user-defined setpoints (step 810). In some embodiments, BAS user interface 309 is separate and distinct from EOS user interface 704. For example, EOS user interface 704 may be coupled to EOS 302 and configured to present information stored in subplant utilization database 502, whereas BAS user interface 309 may be coupled to BAS 308 and configured to allow user 702 to provide control inputs to BAS 308. In some embodiments, user 702 is the only link between EOS user interface 704 and BAS user interface 309.

In some instances, user 702 may view the recommended setpoints provided via EOS user interface 704 and generate the user-defined setpoints provided to BAS user interface 309 based on the recommended setpoints. In other instances, user 702 may generate the user-defined setpoints independent of the recommended setpoints. Advantageously, the advisory mode allows user 702 to exercise a greater level of control over central plant 200 relative to the automatic mode by allowing user 702 to choose whether to use the recommended setpoints to control central plant 200 or provide different user-defined setpoints.

Manual Operating Mode

Figure 9:
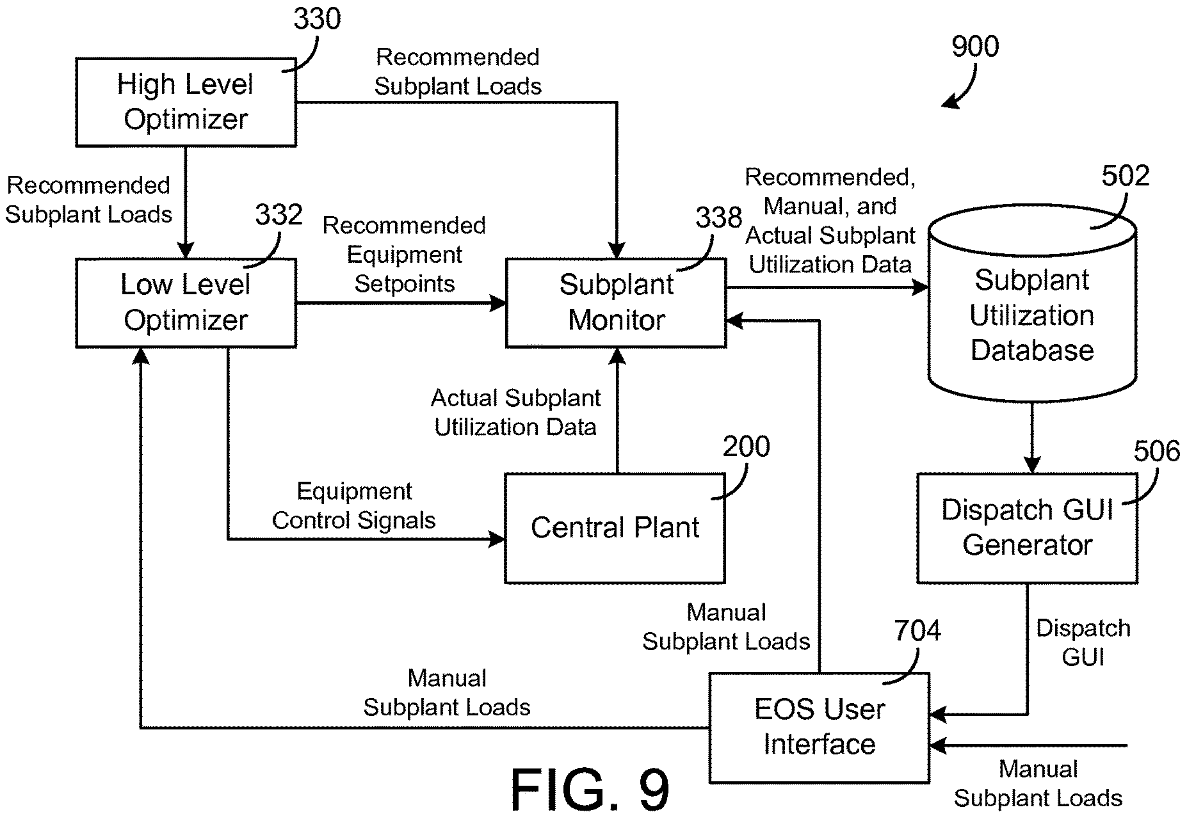
FIG. 9 is a block diagram illustrating the operation of the EOS of FIG. 3 in a manual operating mode, according to an exemplary embodiment.

Referring now to FIG. 9, a block diagram illustrating a system 900 for monitoring and controlling a central plant in a manual operating mode is shown, according to an exemplary embodiment. In the manual operating mode, EOS 302 determines recommended subplant loads for each of subplants 202-212 and recommended equipment setpoints for the central plant equipment 340. The recommended subplant loads and recommended equipment setpoints may be the same or similar to the optimal subplant loads and optimal equipment setpoints as previously described. However, EOS 302 does not automatically provide the recommended equipment setpoints as control inputs to central plant 200 when operating in the manual mode. Instead, EOS 302 receives manual (i.e., user-defined) subplant loads from a user via EOS user interface 704. EOS 302 uses the manual subplant loads to determine recommended (e.g., optimal) equipment setpoints to achieve the manual subplant loads. EOS 302 may generate equipment control signals for subplant equipment 340 based on the recommended equipment setpoints to achieve the manual subplant loads.

System 900 is shown to include high level optimizer 330, low level optimizer 332, central plant 200, subplant monitor 338, subplant utilization database 502, dispatch GUI generator 506, EOS user interface 704, and BAS 308, which may be the same or similar as described with reference to FIGS. 2-8. For example, high level optimizer 330 may perform an optimization process to generate a set of recommended subplant loads for each of subplants 202-212. High level optimizer 330 may determine the recommended subplant loads for a plurality of time steps between the current time and a future time horizon. Each of the time steps may have a defined or predetermined duration (e.g., fifteen minutes, one hour, etc.). High level optimizer 330 may provide the recommended subplant loads to low level optimizer 332 and to subplant monitor 338. Subplant monitor 338 may store the recommended subplant loads as recommended subplant utilization data in a subplant utilization database 502.

Low level optimizer 332 may use the recommended subplant loads to generate a first set of recommended equipment setpoints for the equipment of subplants 202-212. The first set of recommended equipment setpoints may include on/off states, operating setpoints, and/or other setpoints defining the utilization of individual devices of subplants 202-212. The first set of recommended equipment setpoints may include setpoints for individual devices of subplants 202-212 in order for each subplant to meet the recommended subplant load. In some embodiments, low level optimizer 332 performs an optimization process to generate the first set of recommended equipment setpoints. Low level optimizer 332 may provide the first set of recommended equipment setpoints to subplant monitor 338. Subplant monitor 338 may store the first set of recommended equipment setpoints as recommended subplant utilization data in subplant utilization database 502.

Low level optimizer 332 may also receive manual subplant loads from EOS user interface 704. The manual subplant loads may include user-defined loads for each of subplants 202-212. A user can specify the manual subplant loads via EOS user interface 704 (e.g., by entering values for the manual subplant loads, by adjusting sliders or dials, etc.). The manual subplant loads may be provided from EOS user interface 704 to low level optimizer 332. The manual subplant loads may also be provided to subplant monitor 338. Subplant monitor 338 may store the manual subplant loads as manual subplant utilization data in subplant utilization database 502.

Low level optimizer 332 may use the manual subplant loads to generate a second set of recommended equipment setpoints for the equipment of subplants 202-212. The second set of recommended equipment setpoints may include setpoints for individual devices of subplants 202-212 in order for each subplant to meet the manual subplant load. In some embodiments, low level optimizer 332 performs an optimization process to generate the second set of recommended equipment setpoints. Low level optimizer 332 may provide the second set of recommended equipment setpoints to subplant monitor 338. Subplant monitor 338 may store the recommended equipment setpoints as manual subplant utilization data in subplant utilization database 502.

In some embodiments, low level optimizer 332 uses the second set of recommended equipment setpoints to generate equipment control signals for central plant 200. The equipment control signals may include on/off signals, load production signals, power consumption signals, or other types of control signals which may be used to control individual devices of subplant equipment 340. The equipment control signals may cause each of subplants 202-212 to operate the individual devices of the subplant in a manner that achieves the manual subplant load for the subplant. For example, the equipment control signals for a chiller subplant may specify that a first chiller of the subplant operate at 75% capacity, a second chiller of the subplant operate at 40% capacity, and a third chiller of the subplant operate at 60% capacity. In some embodiments, the equipment control signals are provided directly from low level optimizer 332 to central plant 200 (as shown in FIG. 9). In other embodiments, the equipment control signals may be provided to central plant 200 via BAS 308 or generated by BAS 308 based on the second set of recommended equipment setpoints.

Central plant 200 may monitor the utilization of subplants 202-212 and generate a set of actual subplant utilization data. The actual subplant utilization data may include actual values (rather than recommended values) for each of the subplant loads produced by subplants 202-212. The actual subplant utilization data may also include actual equipment operating states (e.g., on/off states, load production, operating capacities, etc.) for individual devices of central plant equipment 340. Central plant 200 may report the actual subplant utilization data to subplant monitor 338. In some embodiments, central plant 200 reports the actual subplant utilization data at regular intervals (e.g., once every fifteen minutes, once per hour, etc.) Subplant monitor 338 may store the actual subplant utilization data in subplant utilization database 502.

Dispatch GUI generator 506 may access the data stored in subplant utilization database 502 and use the stored data to generate a dispatch GUI. The dispatch GUI may include various graphics (e.g., graphs, charts, flow diagrams, etc.) that illustrate the recommended subplant utilization data (e.g., recommended subplant loads and the first set of recommended equipment setpoints, etc.) manual subplant utilization data (e.g., manual subplant loads and the second set of recommended equipment setpoints), and actual subplant utilization data (e.g., actual subplant loads and actual equipment setpoints) in a graphical format. Dispatch GUI generator 506 may provide the dispatch GUI to EOS user interface 704 for presentation to a user 702. A user can view the dispatch GUI and provide the manual subplant loads via EOS user interface 704.

In some embodiments, EOS user interface 704 is a comprehensive monitoring and control interface that allows the user to monitor the operation of central plant 200 and provide control inputs (e.g., manual subplant loads) that affect the operation of central plant 200. In addition to displaying the dispatch GUI generated by dispatch GUI generator 506, EOS user interface 704 may be configured to receive input from the user via the dispatch GUI. For example, the dispatch GUI presented via user interface 504 may include interface options that allow a user to change the load setpoints for subplants 202-212, change the on/off states or operating setpoints for equipment 340, activate or deactivate entire subplants or individual devices of equipment 340, adjust the configuration of BAS 308 or central plant 200, or otherwise monitor and control the operation of central plant 200 and/or equipment 340. EOS 302 may control central plant 200 and/or equipment 340 (e.g., via actuators, power relays, etc.) in accordance with the user input received via EOS user interface 704.

In some embodiments, the user input received via EOS user interface 704 overrides automated control decisions made by EOS 302. For example, the manual subplant loads provided via EOS user interface 704 may override the recommended subplant loads determined by high level optimizer 330. In some embodiments, EOS 302 determines whether the manual subplant loads would cause EOS 302 to violate an optimization constraint (e.g., building temperature out of range, thermal energy storage tank fully depleted or filled to capacity, etc.). If the manual subplant loads would not cause EOS 302 to violate an optimization constraint, EOS 302 may override the recommended subplant loads determined by high level optimizer 330 with the manual subplant loads. However, if the manual subplant loads would cause EOS 302 to violate an optimization constraint, EOS 302 may not override the recommended subplant loads determined by high level optimizer 330. In some embodiments, EOS 302 causes the dispatch GUI to display a warning for the user if the manual subplant loads would cause EOS 302 to violate an optimization constraint within a predetermined time window. The user can then choose to override the recommended subplant loads and violate the optimization constraint or use the recommended subplant loads and satisfy the optimization constraint.

In some embodiments, dispatch GUI generator 506 updates the dispatch GUI based on the manual subplant loads before the manual subplant loads are used to affect the operation of central plant 200. For example, dispatch GUI generator 506 may display the second set of recommended equipment setpoints that would result from the manual subplant loads before the manual subplant loads are used to generate the equipment control signals. In some embodiments, EOS 302 uses the manual subplant loads to calculate an amount of time before the manual subplant loads would cause EOS 302 to violate an optimization constraint (e.g., time until thermal energy storage tanks are filled or depleted). Advantageously, this allows the user to view the predicted effects of the manual subplant loads before the manual subplant loads take effect.

Figure 10:
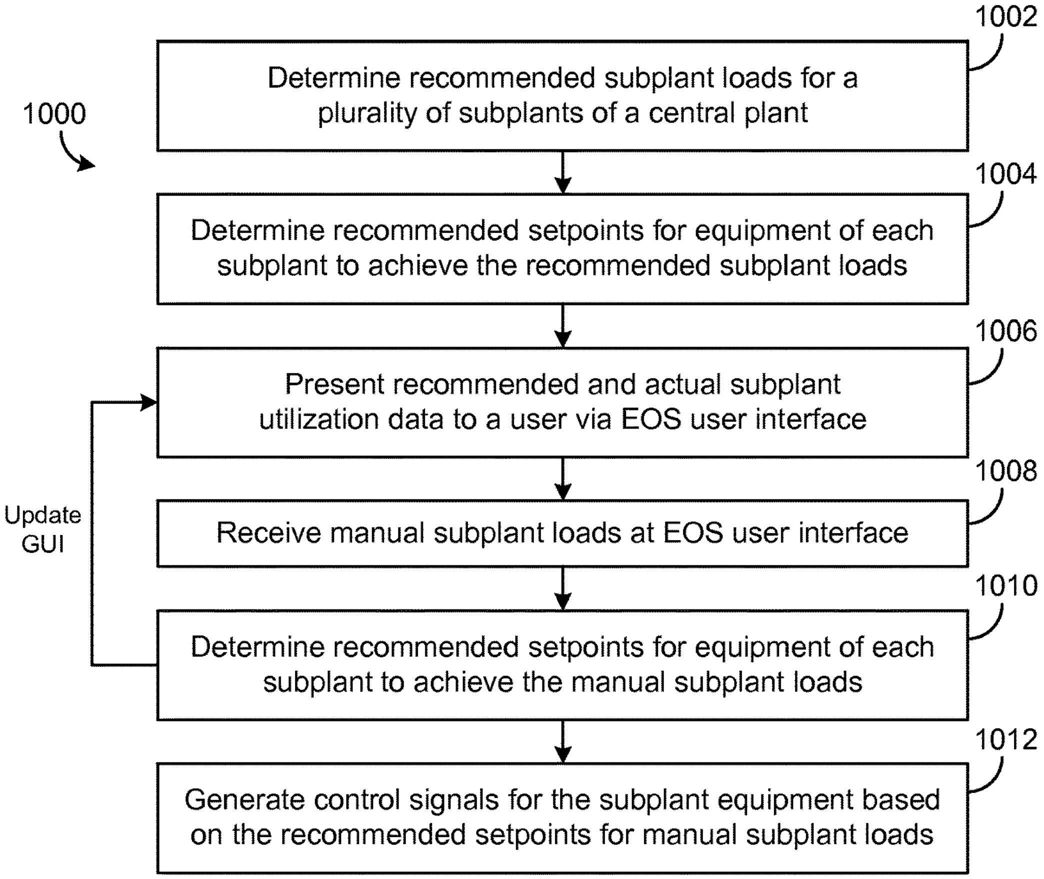
FIG. 10 is a flow diagram illustrating the operation of the EOS of FIG. 3 in the manual operating mode, according to an exemplary embodiment.

Referring now to FIG. 10, a flow diagram illustrating a process 1000 for monitoring and controlling a central plant in the manual operating mode is shown, according to an exemplary embodiment. Process 1000 may be performed by one or more components of central plant system 300 and/or system 900 as previously described. For example, process 1000 may be performed by EOS 302, BAS 308, dispatch GUI generator 506, and/or other devices of central plant system 300 or system 900.

Process 1000 is shown to include determining recommended subplant loads for a plurality of subplants of a central plant (step 1002). Step 1002 may be performed by high level optimizer 330. In some embodiments, the recommended subplant loads include a heating load served by heating subplant 202, a heating load served by heat recovery chiller subplant 204, a cooling load served by heat recovery chiller subplant 204, a cooling load served by chiller subplant 206, a heating load served or stored by hot TES subplant 210 (e.g., a rate at which hot TES subplant 210 is charging or discharging), and/or a cooling load served or stored by cold IES subplant 212 (e.g., a rate at which cold TES subplant 212 is charging or discharging), as previously described. Step 802 may include determining the recommended subplant loads for a plurality of time steps between the current time and a future time horizon. Each of the time steps may have a defined or predetermined duration (e.g., fifteen minutes, one hour, etc.). The recommended subplant loads may be updated with each iteration of the high level optimization process. High level optimizer 330 may provide the recommended subplant loads to low level optimizer 332 and to subplant monitor 338. Subplant monitor 338 may store the recommended subplant loads as planned subplant utilization data in a subplant utilization database 502.

Process 1000 is shown to include determining recommended setpoints for equipment of each subplant to achieve the recommended subplant loads (step 1004). Step 1004 may be performed by low level optimizer 332. The recommended equipment setpoints may include on/off states, operating setpoints, and/or other setpoints defining the utilization of individual devices of the subplants 202-212. The recommended equipment setpoints may include setpoints for individual devices of subplants 202-212 in order for each subplant to meet the recommended subplant load. Low level optimizer 332 may provide the recommended equipment setpoints to central plant 200 and to subplant monitor 338. Subplant monitor 338 may store the recommended equipment setpoints as planned subplant utilization data in subplant utilization database 502.

Process 1000 is shown to include presenting recommended and actual subplant utilization data to a user via an EOS user interface (e.g., EOS user interface 704) (step 1006). Step 1006 may be performed by dispatch GUI generator 506 and/or EOS user interface 704. The recommended subplant utilization data may include the recommended subplant loads generated by high level optimizer 330 and/or the first set of recommended equipment setpoints generated by low level optimizer 332. The actual subplant utilization data may include data describing the actual operation of central plant 200 (e.g., actual subplant loads, actual equipment setpoints, etc.), which may be collected by subplant monitor 338 and stored in subplant utilization database 502.

In some embodiments, step 1006 includes accessing the data stored in subplant utilization database 502 and using the stored data to generate a dispatch GUI. The dispatch GUI may include various graphics (e.g., graphs, charts, flow diagrams, etc.) that illustrate the actual subplant utilization data and the recommended subplant utilization data in a graphical format. Dispatch GUI generator 506 may provide the dispatch GUI to EOS user interface 704 for presentation to a user 702.

Process 1000 is shown to include receiving manual subplant loads at the EOS user interface (step 1008) and determining recommended setpoints for equipment of each subplant to achieve the manual subplant loads (step 1010). The manual subplant loads may be user-specified subplant loads and may override the recommended subplant loads determined by high level optimizer 330. Step 1010 may be the same or similar to step 1004, with the exception that the manual subplant loads are used instead of the recommended subplant loads to determine the recommended setpoints for the subplant equipment. In some embodiments, the dispatch GUI is updated to include the manual subplant loads and the set of recommended setpoints that result from the manual load setpoints.

Process 1000 is shown to include generating control signals for the subplant equipment based on the recommended setpoints to achieve the manual subplant loads (step 1012). The equipment control signals may include on/off signals, load production signals, power consumption signals, or other types of control signals which may be used to control individual devices of subplant equipment 340. The equipment control signals may cause each of subplants 202-212 to operate the individual devices of the subplant in a manner that achieves the manual subplant load for the subplant. In some embodiments, the equipment control signals are provided directly from low level optimizer 332 to central plant 200. In other embodiments, the equipment control signals may be provided to central plant 200 via BAS 308 or generated by BAS 308 based on the recommended equipment setpoints determined in step 1010.

Dispatch GUIs

Referring now to FIGS. 11-24 several images of a dispatch GUI 1100-2100 which may be generated by dispatch GUI generator 506 are shown, according to an exemplary embodiment. Dispatch GUI 1100-2100 may present the recommended (i.e., optimal) subplant loads, manual subplant loads, and actual subplant loads in a variety of visual formats (e.g., diagrams, charts, graphs, etc.) that illustrate the operation of central plant 200. Dispatch GUI 1100-2100 may also present the first set of recommended equipment setpoints (i.e., the setpoints that result from the recommended subplant loads), the second set of recommended equipment setpoints (i.e., the setpoints that result from the manual subplant loads), and the actual equipment setpoints to provide details regarding the operation of each subplant. Dispatch GUI 1100-2100 may include past dispatch data (e.g., past subplant loads, past equipment setpoints) and current dispatch data (e.g., current subplant loads, current equipment setpoints) to allow a user to view a history of central plant operations. Dispatch GUI 1100-2100 may also include future dispatch data (e.g., planned subplant loads, planned equipment setpoints) to allow the user to view planned central plant operations into the future.

Plant and Subplant Summary Interfaces

Figure 11:
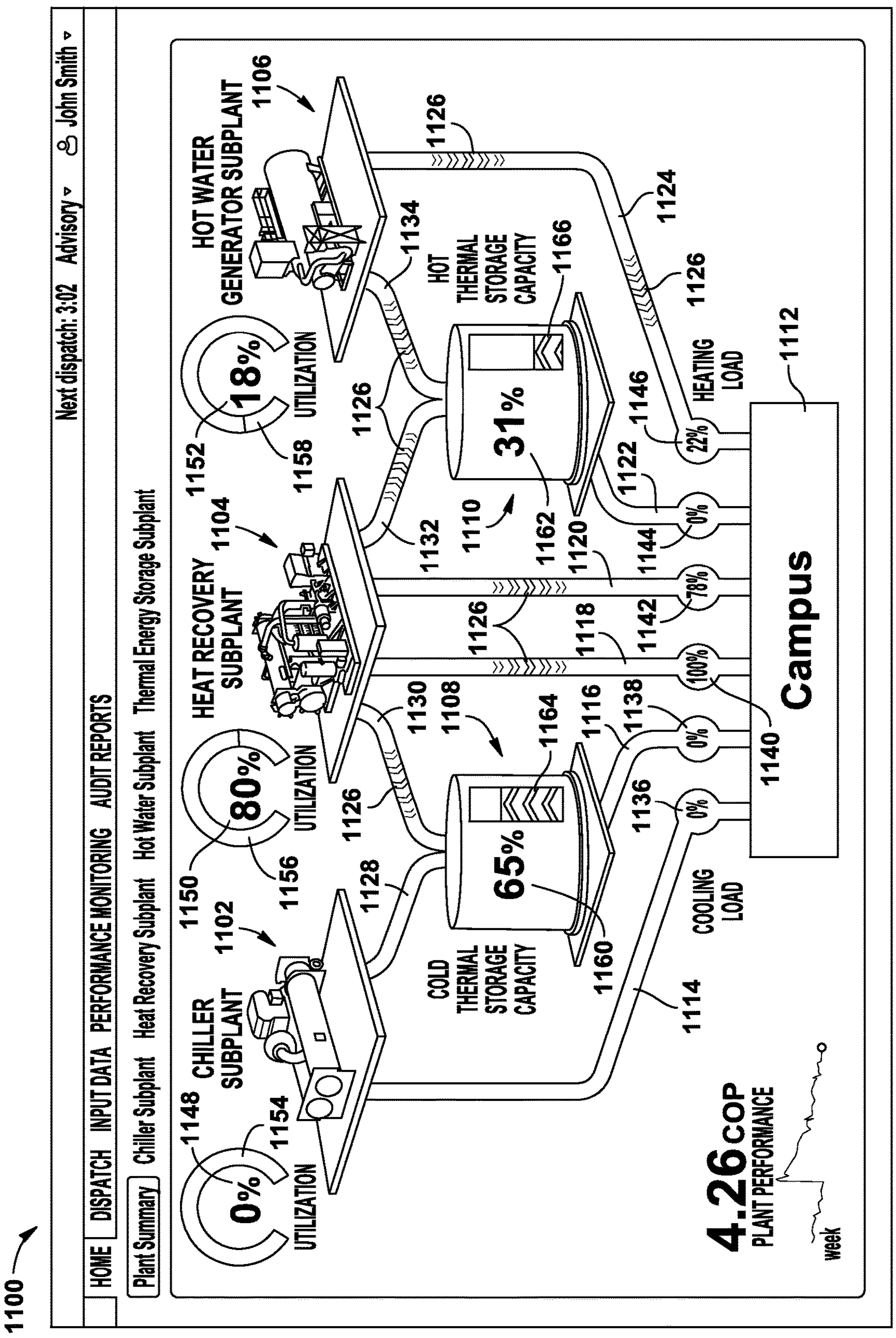
FIG. 11 is a drawing of a plant summary interface which may be generated by the EOS of FIG. 3, according to an exemplary embodiment.

Referring particularly to FIG. 11, a plant summary interface 1100 is shown, according to an exemplary embodiment. Plant summary interface 1100 may include graphics depicting each of the subplants within central plant 200. For example, plant summary interface 1100 is shown to include a chiller subplant 1102, a heat recovery subplant 1104, a hot water generator (HWG) subplant 1106, a cold thermal storage subplant 1108, and a hot thermal storage subplant 1110. Chiller subplant 1102 is configured to provide cold thermal energy (e.g., measured in tons) to satisfy the cooling load of campus 1112. The cold thermal energy can be provided directly to campus 1112 from chiller subplant 1102 and/or stored in cold thermal storage subplant 1108 for later use. Similarly, hot water generator subplant 1106 is configured to provide hot thermal energy (measured in mmBTU/h) to satisfy the heating load of campus 1112. The hot thermal energy can be provided directly to campus 1112 from hot water generator subplant 1106 or stored in hot thermal storage subplant 1110 for later use. Heat recovery subplant 1104 may be configured to provide both cold thermal energy and hot thermal energy to satisfy the cooling and heating loads of campus 1112. The thermal energy generated by heat recovery subplant 1104 can also be provided directly to campus 1112 or stored in thermal storage subplants 1108-1110 for later use.

Plant summary interface 1100 is shown to include paths 1114, 1106, 1118, 1120, 1122, and 1124 connecting each of subplants 1102-1110 to campus 1112. If a subplant is currently providing thermal energy to campus 1112, the path connecting the subplant to campus 1112 may be highlighted or otherwise marked to indicate the flow of thermal energy along the path. For example, paths 1120-1124 may be colored red to indicate the flow of hot thermal energy along paths 1120-1124, whereas paths 1114-1118 may be colored blue to indicate the flow of cold thermal energy along paths 1114-1118. In some embodiments, paths 1114-1124 are animated to indicate the flow of thermal energy. For example, arrows 1126 along each of paths 1114-1124 may move along the path to indicate the flow of thermal energy. Similarly, plant summary interface 1100 is shown to include paths 1128-1130 connecting chiller subplant 1102 and heat recovery subplant 1104 to cold thermal storage subplant 1108, and paths 1132-1134 connecting heat recovery subplant 1104 and hot water generator subplant 1106 to hot thermal storage subplant 1110. Like paths 1114-1124 connecting the subplants to the campus, paths 1128-1134 may be highlighted or otherwise marked to indicate the flow of thermal energy along paths 1128-1134.

Percentage indicators 1136-1146 along each of paths 1114-1124 connecting to campus 1112 may indicate the percentage of hot/cold thermal energy that campus 1112 is receiving from each of subplants 1102-1110. For example, FIG. 11 is shown to include a 0% indicator 1136 connecting chiller subplant 1102 to campus 1112, a 0% indicator 1138 connecting cold thermal storage subplant 1108 to campus 1112, and a 100% indicator 1140 connecting heat recovery subplant 1104 to campus 1112. This indicates that 100% of the cold thermal energy provided to campus 1112 is being provided by heat recovery subplant 1104. Similarly, FIG. 11 is shown to include a 78% indicator 1142 connecting heat recovery subplant 1104 to campus 1112, a 0% indicator 1144 connecting hot thermal storage subplant 1110 to campus 1112, and a 22% indicator 1146 connecting hot water generator subplant 1106 to campus 1112. This indicates that 78% of the hot thermal energy provided to campus 1112 is being provided by heat recovery subplant 1104 and 22% of the hot thermal energy provided to campus 1112 is being provided by hot water generator subplant 1106.

Percentage indicators 1148-1152 next to chiller subplant 1102, heat recovery subplant 1104, and hot water generator subplant 1106 indicate the percentage of utilization for each subplant 1102-1106 (i.e., the percentage of the total subplant capacity being utilized). For example, FIG. 11 is shown to include a 0% indicator 1148 next to chiller subplant 1102, an 80% indicator 1150 next to heat recovery subplant 1104, and an 18% indicator 1152 next to hot water generator subplant 1106. This indicates that chiller subplant 1102 is being utilized at 0% of its maximum capacity, heat recovery subplant 1104 is being utilized at 80% of its maximum capacity, and hot water generator subplant 1106 is being utilized at 18% of its maximum capacity. The utilization rings 1154-1158 associated with each subplant 1102-1106 may be filled to visually indicate the utilization percentage.

Percentage indicators 1160 and 1162 associated with each of thermal storage subplants 1108-1110 may indicate the current charge level of each thermal storage subplant 1108-1110 (i.e., the percentage of the total storage capacity currently being used). For example, FIG. 11 is shown to include a 65% indicator 1160 associated with cold thermal storage subplant 1108 and a 31% indicator 1162 associated with hot thermal storage subplant 1110. This indicates that cold thermal storage subplant 1108 is currently 65% full and hot thermal storage subplant 1110 is currently 31% full. Arrows 1164 and 1166 within each of storage subplants 1108-1110 may indicate whether each storage subplant 1108-1110 is currently charging (e.g., upward arrows) or discharging (e.g., downward arrows).

Figure 12:
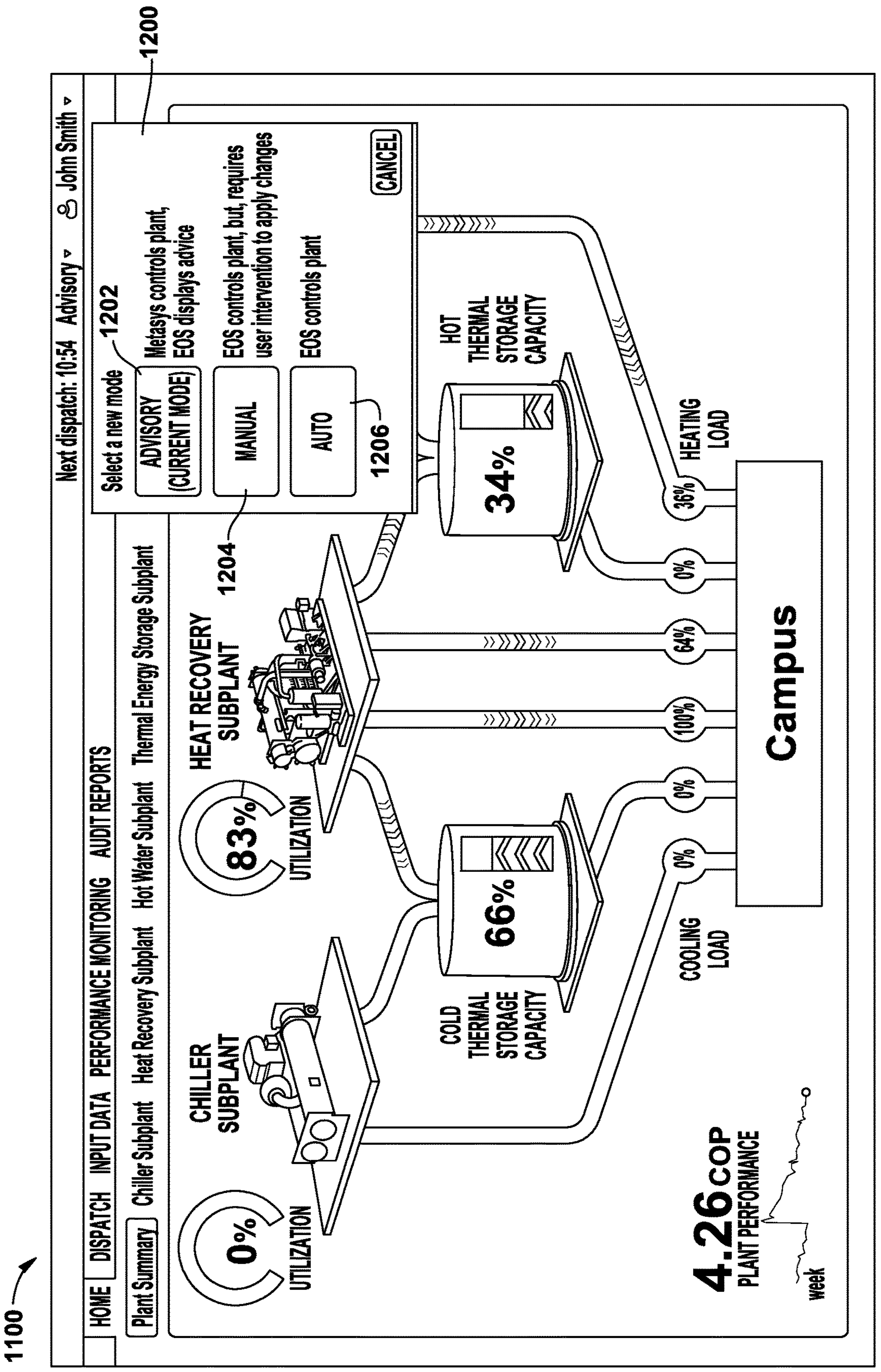
FIG. 12 is a drawing of the plant summary interface of FIG. 13 with a mode selector panel, according to an exemplary embodiment.

Referring now to FIG. 12, dispatch GUI 1100-2100 is shown to include a mode selector panel 1200. Mode selector panel 1200 may indicate the current operating mode of EOS 302 and may allow a user to switch among the various operating modes. For example, mode selector panel 1200 may allow the user to switch among advisory mode 1202, manual mode 1204, and automatic mode 1206. EOS 302 may determine optimal subplant loads and optimal equipment setpoints in each of operating modes 1202-1206. In automatic operating mode 1202, EOS 302 may provide the optimal equipment setpoints to central plant 200. In advisory operating mode 1204, EOS 302 may provide the optimal subplant loads and equipment setpoints to a user interface as recommended setpoints for central plant 200. A user may view the recommended setpoints and provide user-defined setpoints for building automation system 308, which may or may not be based on the recommended setpoints. In manual operating mode 1206, EOS 302 may control central plant 200 based on manual (i.e., user-defined) subplant loads received via a user interface of EOS 302. EOS 302 may use the manual subplant loads to generate recommended equipment setpoints and equipment control signals that achieve the manual subplant loads. The equipment control signals may then be provided to central plant 200.

Figure 13:
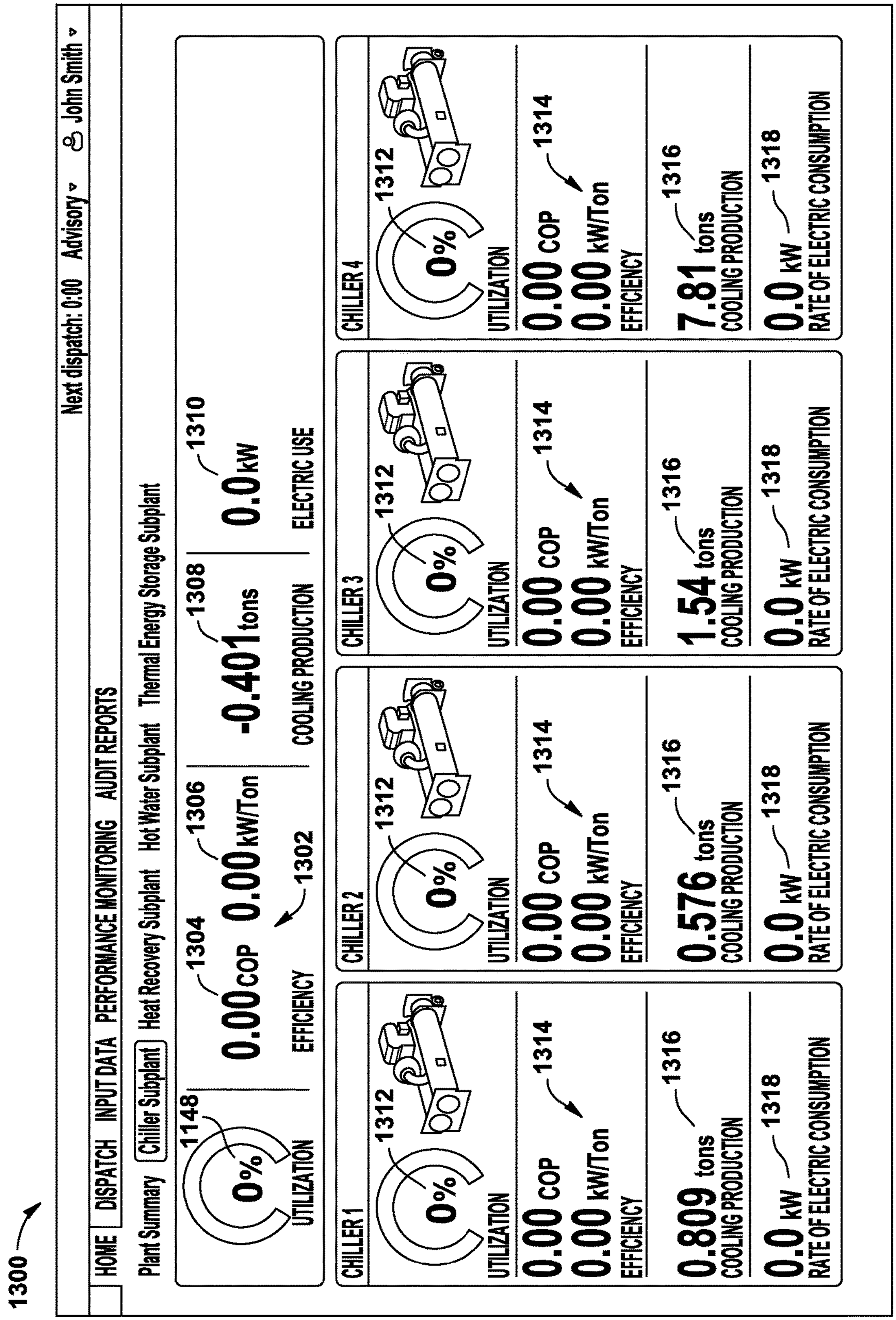
FIG. 13 is a drawing of a chiller subplant interface which may be generated by the EOS of FIG. 3, according to an exemplary embodiment.

Referring now to FIG. 13, a chiller subplant interface 1300 is shown, according to an exemplary embodiment. Chiller subplant interface 1300 is shown to include the overall percentage utilization 1148 of chiller subplant 1102, the overall efficiency 1302 of chiller subplant 1102 (e.g., a coefficient of performance 1304 and energy consumption per unit of thermal energy 1306 (measured in kW/ton)), the overall cooling production 1308 of chiller subplant 1102 (measured in tons), and the overall electricity use 1310 of chiller subplant 1102 (measured in kW). Chiller subplant interface 1300 is also shown to include detailed information for each of the chillers (i.e., chiller 1, chiller 2, chiller 3, and chiller 4) within chiller subplant 1102. For each chiller, chiller subplant interface 1300 may display the chiller's percentage utilization 1312, efficiency 1314, cooling production 1316, and electricity use 1318.

Figure 14:
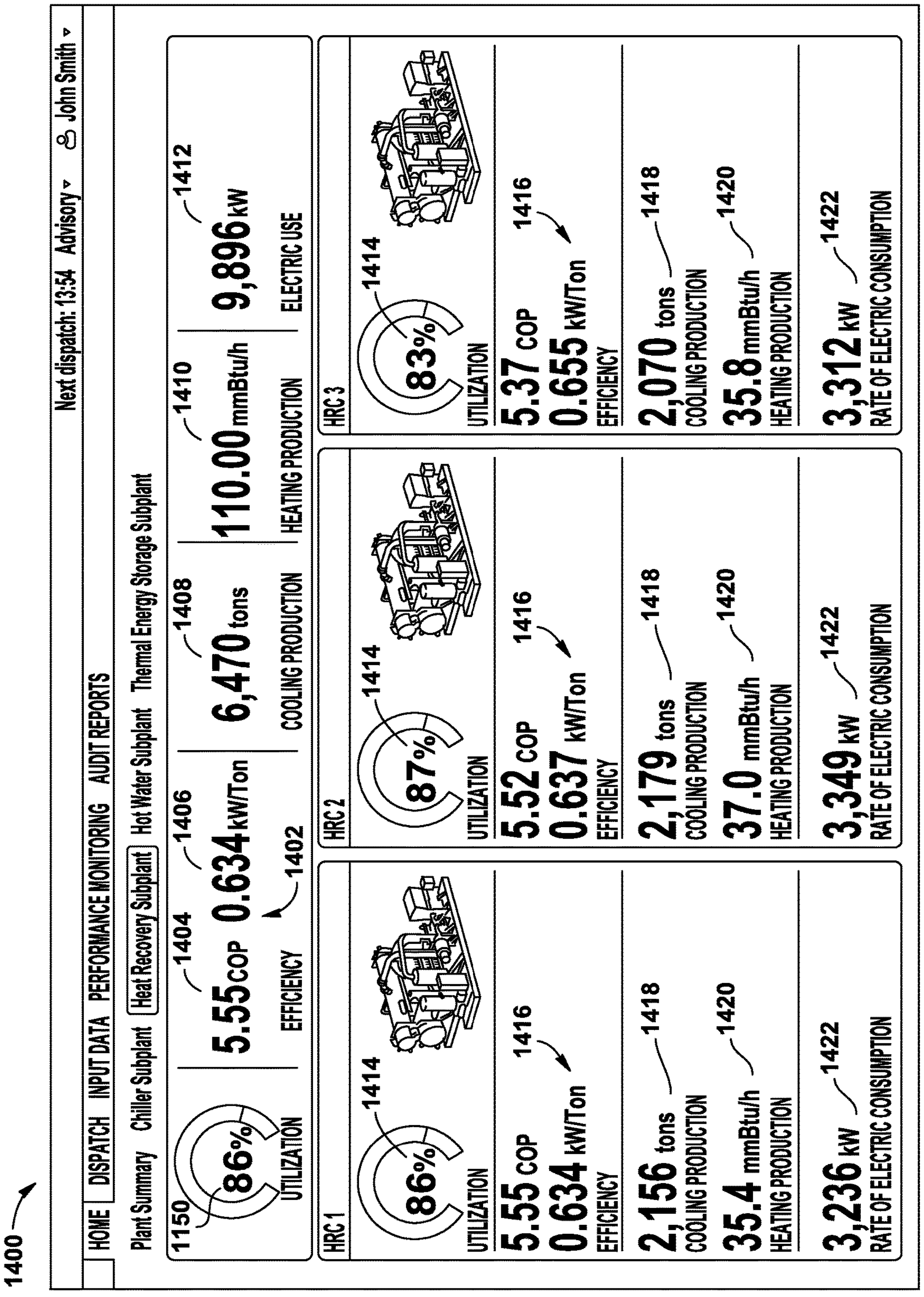
FIG. 14 is a drawing of a heat recovery subplant interface which may be generated by the EOS of FIG. 3, according to an exemplary embodiment.

Referring now to FIG. 14, a heat recovery subplant interface 1400 is shown, according to an exemplary embodiment. Heat recovery subplant interface 1400 is shown to include the overall percentage utilization 1150 of heat recovery subplant 1104, the overall efficiency 1402 of heat recovery subplant 1104 (e.g., a coefficient of performance 1404 and energy consumption per unit of thermal energy 1406 (measured in kW/ton)), the overall cooling production 1408 of heat recovery subplant 1104 (measured in tons), the overall heating production 1410 of heat recovery subplant 1104 (measured in mmBTU/h), and the overall electricity use 1412 of heat recovery subplant 1104 (measured in kW). Heat recovery subplant interface 1400 is also shown to include detailed information for each of the heat recovery chillers (i.e., HRC 1, HRC 2, and HRC 3) within heat recovery subplant 1104. For each heat recovery chiller (HRC), heat recovery subplant interface 1400 may display the HRC's percentage utilization 1414, efficiency 1416, cooling production 1418, heating production 1420, and electricity use 1422.

Figure 15:
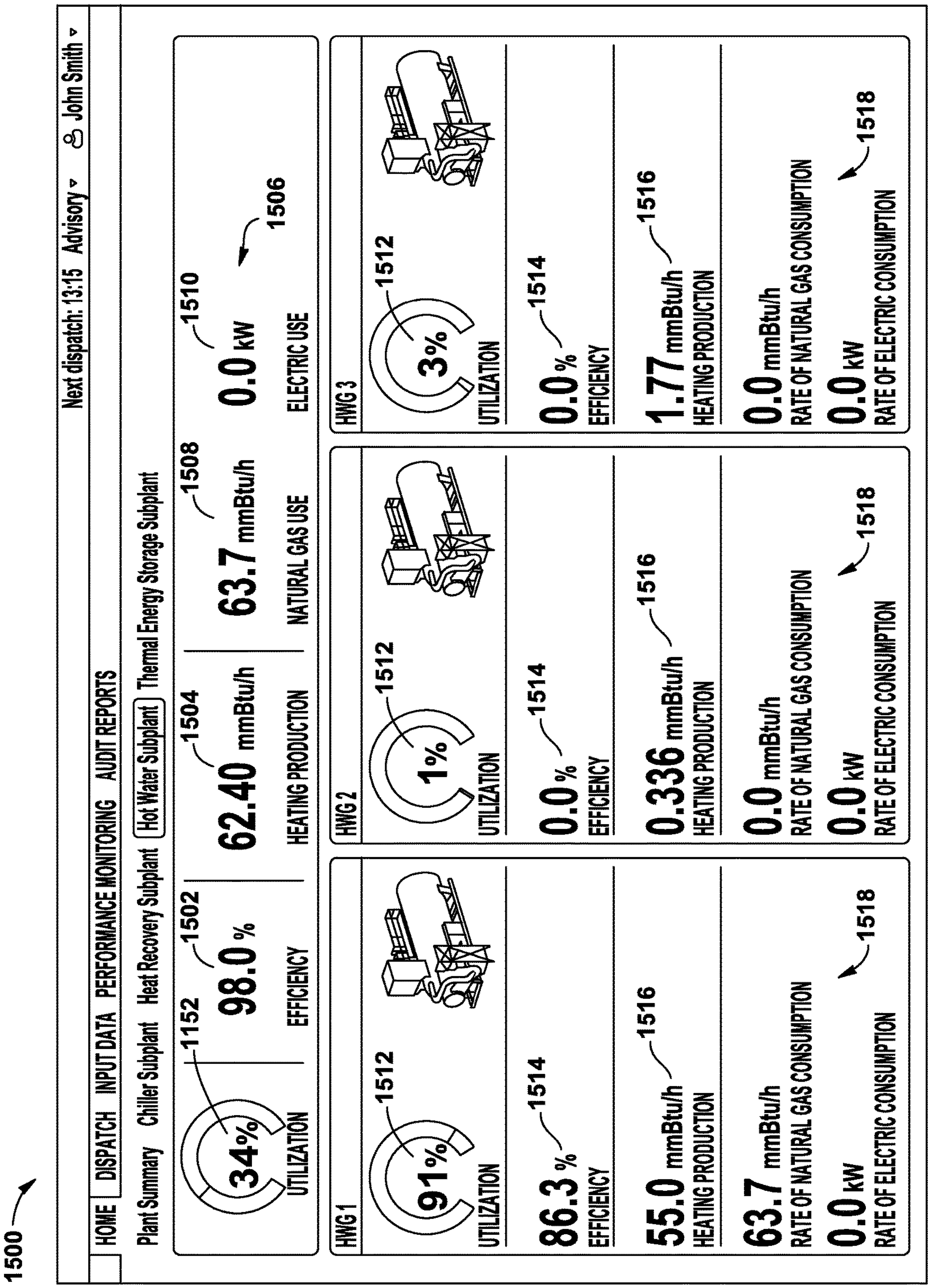
FIG. 15 is a drawing of a hot water subplant interface which may be generated by the EOS of FIG. 3, according to an exemplary embodiment.

Referring now to FIG. 15, a hot water subplant interface 1500 is shown, according to an exemplary embodiment. Hot water subplant interface 1500 is shown to include the overall percentage utilization 1152 of hot water subplant 1106, the overall efficiency 1502 of hot water subplant 1106, the overall heating production 1504 of hot water subplant 1106 (measured in mmBTU/h), and the overall resource consumption 1506 of hot water subplant 1106. Resource consumption 1506 may include natural gas use 1508 (measured in mmBTU/h) and electricity use 1510 (measured in kW). Hot water subplant interface 1500 is also shown to include detailed information for each of the hot water generators (i.e., HWG 1, HWG 2, and HWG 3) within hot water subplant 1106. For each hot water generator (HWG), hot water subplant interface 1500 may display the HWG's percentage utilization 1512, efficiency 1514, heating production 1516, and resource consumption 1518.

Figure 16:
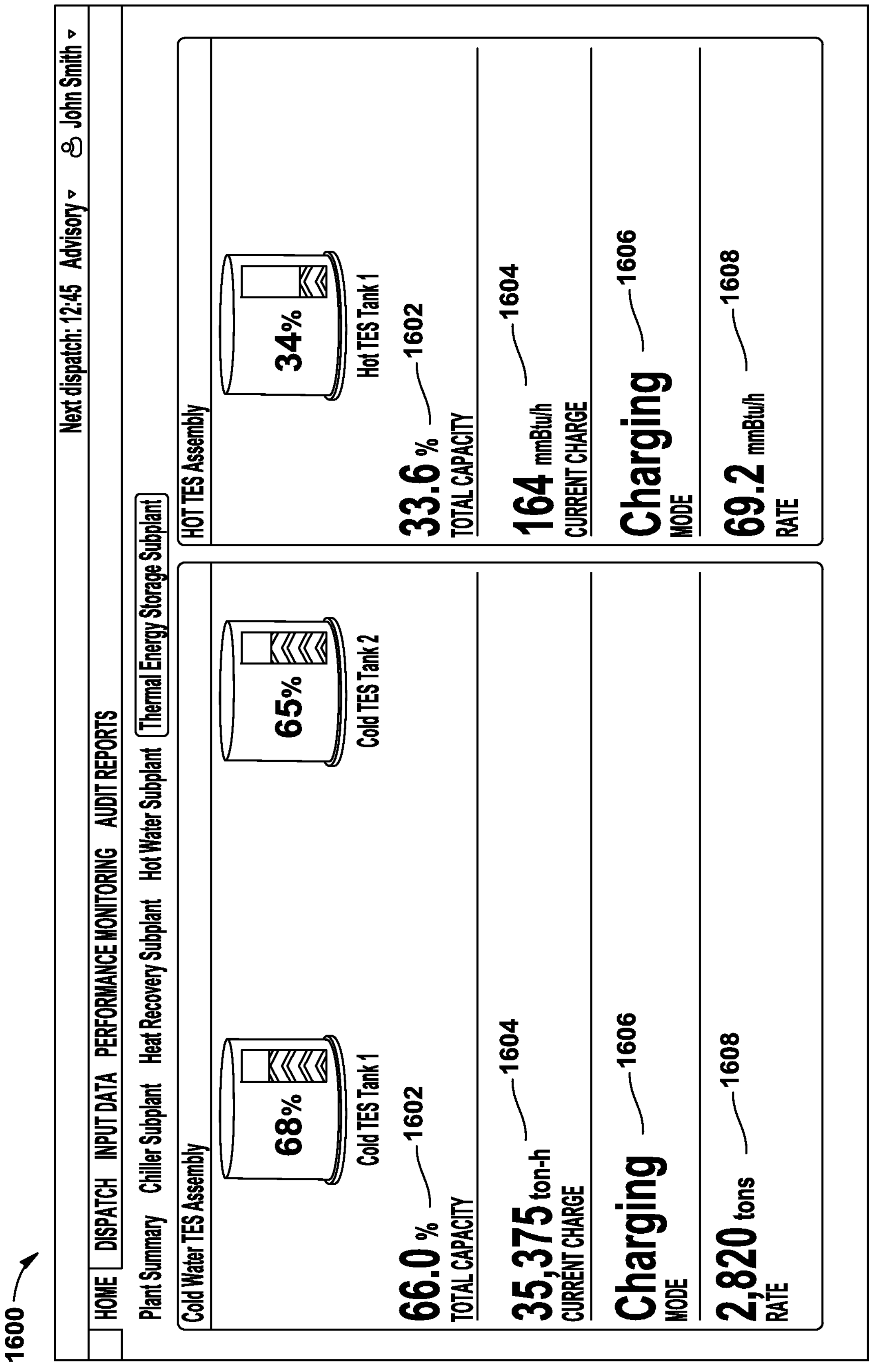
FIG. 16 is a drawing of a thermal energy storage (TES) subplant interface which may be generated by the EOS of FIG. 3, according to an exemplary embodiment.
Figure 17A:
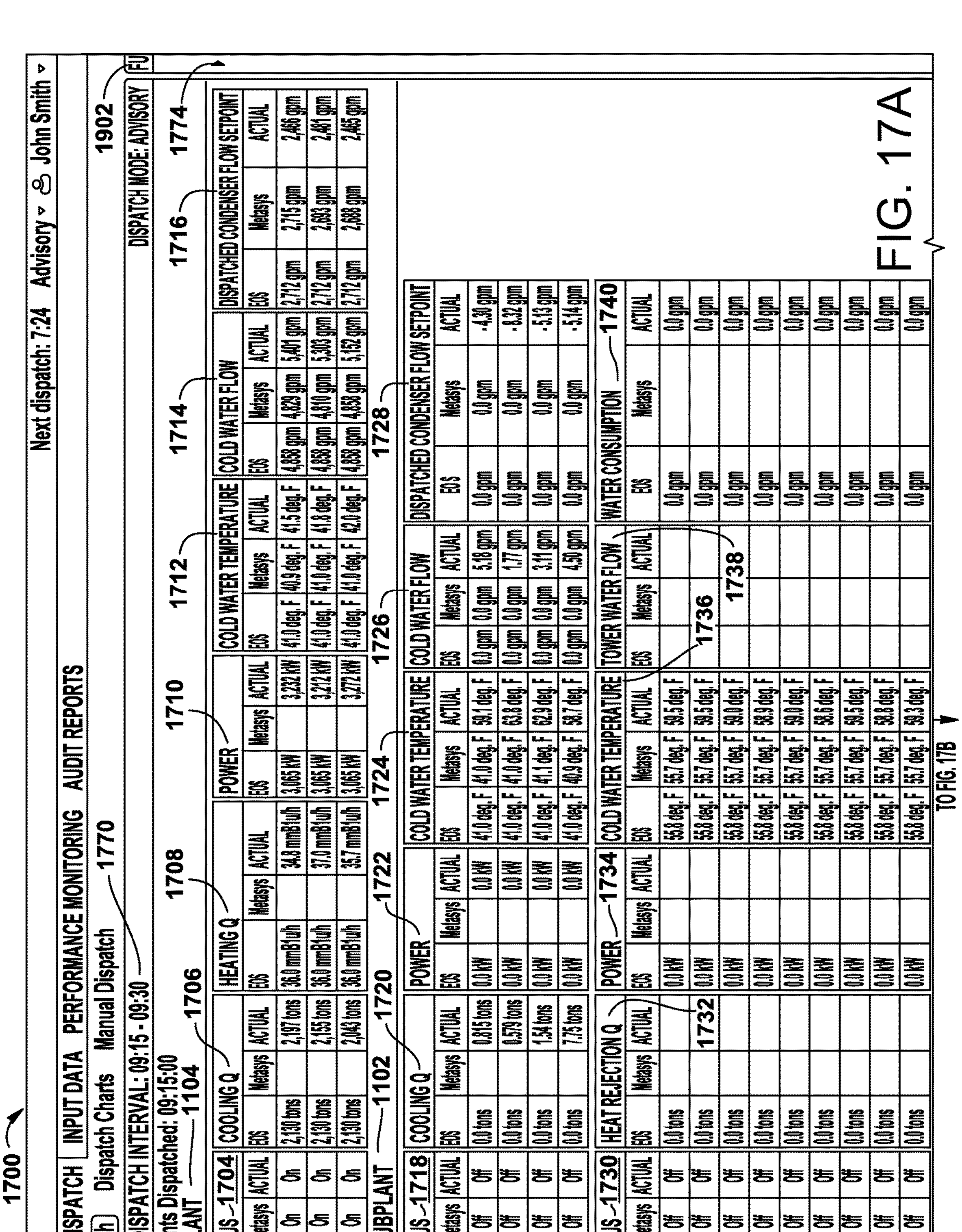

Referring now to FIG. 16, thermal energy storage (TES) subplant interface is shown, according to an exemplary embodiment. The TES subplant interface is shown to include the total capacity of the cold thermal storage subplant and the hot thermal storage subplant currently being utilized (measured in percentage), the current charge of each subplant (measured in ton-h for cooling and mmBTU for heating), the current mode of each storage subplant (i.e., charging or discharging), and the rate at which each storage subplant is charging or discharging (measured in tons for cooling and mmBTU/h for heating). If the cold thermal storage subplant or the hot thermal storage subplant includes multiple thermal energy storage tanks, the TES subplant interface may include such information for each of the storage tanks.

Full Dispatch Interface

Referring now to FIGS. 17A-19B, a full dispatch interface 1700 which may be generated by dispatch GUI generator 506 is shown, according to an exemplary embodiment. Full dispatch interface 1700 may include detailed dispatch information for each of the subplants within central plant 200. For example, full dispatch interface 1700 is shown to include detailed dispatch information for HRC subplant 1104, chiller subplant 1102, HWG subplant 1106, an excess heat exchanger subplant 1702, cold water storage subplant 1108, and hot water storage subplant 1110. Full dispatch interface may also include detailed dispatch information for each of the individual devices within each subplant. For example, full dispatch interface 1700 is shown to include detailed dispatch information for each of the HRCs within HRC subplant 1104, each of the chillers and cooling towers within chiller subplant 1102, each of the HWGs within HWG subplant 1106, each of the heat exchangers with in excess heat exchanger subplant 1702, each of the cold TES tanks within cold water storage subplant 1108, and each of the hot TES tanks within hot water storage subplant 1110.

The detailed dispatch information for each heat recovery chiller may include the HRC's status 1704 (e.g., on or off), the amount of cooling energy 1706 (i.e., "Cooling Q") produced by the HRC (measured in tons), the amount of heating energy 1708 (i.e., "Heating Q) produced by the HRC (measured in mmBTU/h), the power consumption 1710 of each HRC (measured in kW), the temperature 1712 of the cold water produced by each HRC, the flow rate 1714 of the cold water produced by each HRC, and the dispatched condenser flow setpoint 1716 for each HRC.

The detailed dispatch information for each chiller may include the chiller's status 1718 (e.g., on or off), the amount of cooling energy 1720 (i.e., "Cooling Q") produced by the chiller (measured in tons), the power consumption 1722 of each chiller (measured in kW), the temperature 1724 of the cold water produced by each chiller, the flow rate 1726 of the cold water produced by each chiller, and the dispatched condenser flow setpoint 1728 for each chiller. The detailed dispatch information for each cooling tower may include the cooling tower's status 1730 (e.g., on or off), the amount of heat 1732 rejected by the cooling tower (i.e., "Heat Rejection Q") produced by the chiller (measured in tons), the power consumption 1734 of each cooling tower (measured in kW), the temperature 1736 of the outlet water from each cooling tower, the flow rate 1738 of the water through each cooling tower, and the water consumption 1740 of each cooling tower.

The detailed dispatch information for each hot water generator may include the HWG's status 1742 (e.g., on or off), the amount of heating energy 1744 (i.e., "Heating Q") produced by the HWG (measured in mmBTU/h), the amount of fuel usage 1746 of each HWG (measured in mmBTU/h), the power consumption 1748 of each HWG (measured in kW), and the temperature 1750 of the hot water produced by each HWG. The detailed dispatch information for excess heat exchanger subplant 1702 may include the amount of heat rejected 1752 by each heat exchanger (i.e., "Heat Rejection Q"), the hot side water flow rate 1754, the cold side water flow rate 1756, and the dispatched temperature setpoint 1758.

The detailed dispatch information for each cold TES tank may include the status 1760 of the cold TES tank (e.g., charging or discharging) and the amount of cooling energy 1762 (i.e., "Cooling Q") provided by the cold TES tank (measured in tons). Similarly, the detailed dispatch information for each hot TES tank may include the status 1764 of the hot TES tank (e.g., charging or discharging), the amount of heating energy 1766 (i.e., "Heating Q") provided by the hot TES tank (measured in mmBTU/h), and the dispatched flow setpoint 1768.

In some embodiments, full dispatch interface 1700 includes multiple values for each of the variables included in the detailed dispatch information. For example, full dispatch interface 1700 may include an optimal value for each variable (i.e., the "EOS" value), a building automation system (BAS) value for each variable (i.e., the "Metasys" value), and an actual value for each variable. The optimal values may be determined by EOS 302 as previously described. In some instances, the optimal values are based on the optimal or recommended subplant loads determined by high level optimizer 330. In other instances, the optimal values may be based on the manual subplant loads received via EOS user interface 704. When EOS 302 is operated in the automatic mode, the optimal values may be the same as the BAS values since the optimal values are automatically provided as inputs to the BAS. However, when EOS 302 is operated in the advisory mode, the optimal values may be different from the BAS values since the optimal values are provided as recommendations but not automatically applied as inputs to the BAS. The actual values may represent measured or observed values of the variables obtained from central plant 200, as indicated by the actual subplant utilization data collected by subplant monitor 338.

In some embodiments, full dispatch interface 1700 presents snapshots of the detailed dispatch information for multiple different dispatch intervals. For example, FIG. 17 shows a snapshot of the detailed dispatch information for the present dispatch interval 1770. Similarly, FIG. 18 shows a snapshot of the detailed dispatch information for a past dispatch interval 1802 and FIG. 19 shows a snapshot of the detailed dispatch information for a future dispatch interval 1902. A user can navigate between the views shown in FIGS. 17-19 by selecting the arrows 1772-1782 located on the sides of each window. For example, clicking the left arrow 1772 shown on the left side of FIG. 17 may cause full dispatch interface 1700 to transition from displaying the snapshot for present dispatch interval 1770 (FIG. 17) to the snapshot for past dispatch interval 1802 (FIG. 18). Similarly, clicking the right arrow 1774 shown on the right side of FIG. 17 may cause full dispatch interface 1700 to transition from displaying the snapshot for present dispatch interval 1770 (FIG. 17) to the snapshot for future dispatch interval 1902 (FIG. 19). Advantageously, this allows a user to navigate between past, present, and future snapshots of the detailed dispatch information to view subplant loads and equipment setpoints for a series of dispatch intervals.

Dispatch Chart Interface

Figure 20:
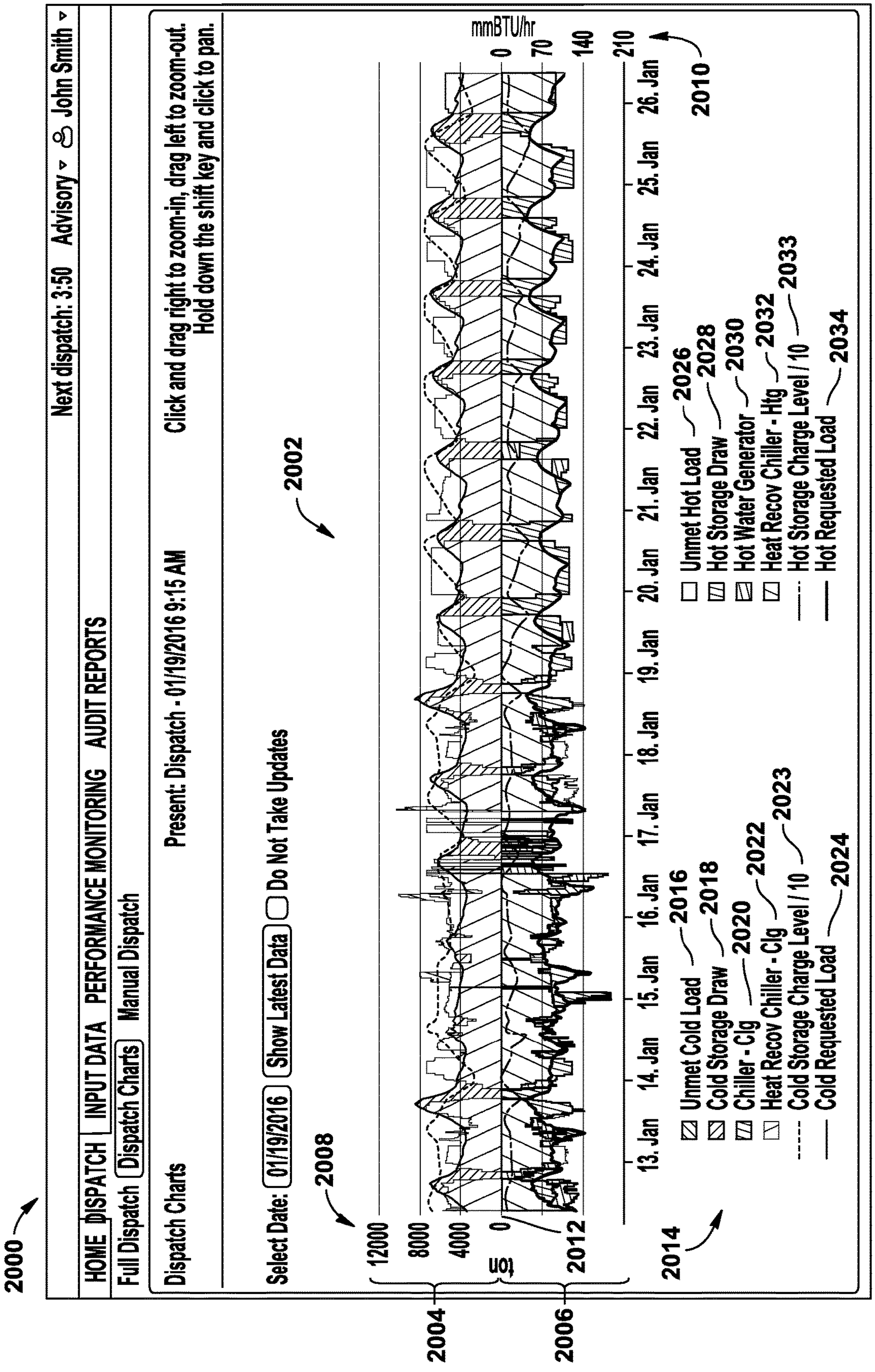
FIG. 20 is a drawing of a dispatch chart which may be generated by the EOS of FIG. 3, according to an exemplary embodiment.

Referring now to FIG. 20, a dispatch chart interface 2000 which may be generated by dispatch GUI generator 506 is shown, according to an exemplary embodiment. Dispatch chart interface 2000 is shown to include a subplant loads graph 2002. Subplant loads graph 2002 illustrates the actual and predicted subplant loads for each of subplants 202-212 at each of the time steps represented in dispatch GUI 1100-2100. Advantageously, subplant loads graph 2002 shows the heating and/or cooling loads produced by each of subplants 202-212 during each time step as separate bars to illustrate the contribution of each of subplants 202-212 to the requested heating and cooling loads. The bars may stack on top of each other to indicate whether the total heating or cooling load production meets, exceeds, or fails to meet the requested heating and cooling loads.

Ssubplant loads graph 2002 is shown to include a top half 2004 which includes cooling-related data (i.e., the data above the zero line) and a bottom half 2006 which includes heating-related data (i.e., the data below the zero line). Both halves 2004-2006 of subplant load graph 2002 represent positive deviations from zero. For example, the scales 2008-2010 that accompany the vertical axes become increasingly positive as the distance from the zero line 2012 increases for both top half 2004 and bottom half 2006. In FIG. 20, the magnitude of a cooling load is shown as an upward deviation from zero line 2012, whereas the magnitude of a heating load is shown as a downward deviation from zero line 2012. The legend 2014 below graph 2002 identifies the different types of data represented in the subplant loads graph.

The bars above zero line 2012 represent amounts and/or rates of cooling provided by the subplants of central plant 200 equipped to handle cooling. For example, some bars 2020 above zero line 2012 indicate the cooling provided by chiller subplant 206, other bars 2022 above zero line 2012 indicate the cooling provided by heat recovery chiller subplant 204, and other bars 2018 above zero line 2012 represent the cooling provided by discharging cold TES subplant 212. If any unmet cooling loads are present, other bars 2016 above zero line 2012 may indicate the amount of the unmet cooling load. The requested cooling line 2024 indicates the requested cooling load. The vertical axis to the left of chart 2002 provides the scale and/or units for cooling bars 2016-2022 and for requested cooling line 2024. In some embodiments the cooling loads measured by the cooling axis are presented as cooling rates in units of tons.

Bars positioned between zero line 2012 and requested cooling line 2024 indicate cooling production that contributes to the requested cooling load. Bars positioned above requested cooling line 2024 indicate cooling production in excess of the requested cooling load. Excess cooling production may be used to charge cold TES subplant 212. The amount of excess cooling production used to recharge cold TES subplant 212 may be indicated by a label above each of the excess cooling bars.

In some embodiments, top half 2004 of chart 2002 includes a cold storage charge level line 2033 that indicates the charge level of cold TES subplant 212. The charge level of cold TES subplant 212 may increase when excess cooling load is produced and used to charge cold TES subplant 212 (indicated by bars above the requested cooling line). The charge level of cold TES subplant 212 may decrease when cold TES subplant 212 is discharged to meet the requested cooling load. Discharging stored thermal energy from cold TES subplant 212 is indicated by bars between zero line 2012 and requested cooling line 2024.

The bars below zero line 2012 represent amounts and/or rates of heating provided by the subplants of central plant 200 equipped to handle heating. For example, some bars 2030 below zero line 2012 indicate the heating provided by heater subplant 202, other bars 2032 below zero line 2012 indicate the heating provided by heat recovery chiller subplant 204, and other bars 2028 below zero line 2012 represent the heating provided by discharging hot TES subplant 210. If any unmet heating loads are present, other bars 2026 below zero line 2012 may indicate the amount of the unmet heating load. A requested heating line 2034 indicates the requested heating load.

The vertical axis to the right of chart 2002 provides the scale and/or units for heating bars 2026-2032 and for requested heating line 2034. In some embodiments the heating loads measured by the heating axis are presented as heating rates in units of mmBTU/hr. In some embodiments, the heating axis may have different units than the cooling axis. For example, the cooling axis may measure the cooling loads in units of tons, whereas the heating axis may measure the heating loads in units of mmBTU/hr.

Bars positioned between zero line 2012 and requested heating line 2034 indicate heating production that contributes to the requested heating load. Bars positioned below requested heating line 2034 indicate heating production in excess of the requested heating load. Excess heating production may be used to charge hot TES subplant 210. The amount of excess heating production used to recharge hot TES subplant 210 may be indicated by a label below each of the excess heating bars.

In some embodiments, bottom half 2006 of chart 2002 includes a hot storage charge level line 2033 that indicates the charge level of hot TES subplant 210. The charge level of hot TES subplant 210 may increase when excess heating load is produced and used to charge hot TES subplant 210 (indicated by bars below the requested heating line). The charge level of hot TES subplant 210 may decrease when hot TES subplant 210 is discharged to meet the requested heating load. Discharging stored thermal energy from hot TES subplant 210 is indicated by bars between zero line 2012 and requested heating line 2034.

In some embodiments, dispatch chart interface 2000 includes some or all of the features described in U.S. patent application Ser. No. 14/815,845 filed Jul. 31, 2015, and titled "Systems and Methods for Visualizing Equipment Utilization in a Central Plant." The entire disclosure of U.S. patent application Ser. No. 14/815,845 is incorporated by reference herein.

Manual Dispatch Interface

Referring now to FIGS. 21-24, a manual dispatch interface 2100 which may be generated by dispatch GUI generator 506 is shown, according to an exemplary embodiment. Manual dispatch interface 2100 may allow a user to specify the manual subplant loads when EOS 302 is operated in the manual mode. Manual dispatch interface 2100 is shown to include the plant summary graphic 2102 (described with reference to FIG. 11) and a summary chart 2104 to the right of plant summary graphic 2102.

Summary chart 2104 is shown to include a campus loads row 2106 and a plant totals row 2108. Campus loads row 2106 indicates the total heating and cooling loads of campus 1112 to be satisfied by central plant 200. Plant totals row 2108 indicates the total heating and cooling loads produced by central plant 200. For example, the plant total cooling may be the sum of the cooling energy provided by chiller subplant 206, HRC subplant 204, and cold water TES subplant 212. Similarly, the plant total heating may be the sum of the heating energy provided by HRC subplant 204, HWG subplant 202, and hot water TES subplant 210. The load production by each of the subplants is indicated by the subplant charts 2110, 2112, and 2114 below summary chart 2104.

Summary chart 2104 and subplant charts 2110-2114 are shown to include three sets of columns 2116, 2118, and 2120. The left set of columns 2116 represents the manual cooling and heating loads, which may be based on the manual subplant loads specified by a user. The middle set of columns 2118 represents the optimal heating and loads determined by EOS 302. The right set of columns 2120 represents the actual heating and cooling loads produced by central plant 200. A user can adjust the manual subplant loads via manual dispatch interface 2100 (described in greater detail below). However, the optimal subplant loads may not change when the manual subplant loads are adjusted. The optimal subplant loads may be determined by EOS 302 and provided in manual dispatch interface 2100 as recommended values for the subplant loads.

Figure 21:
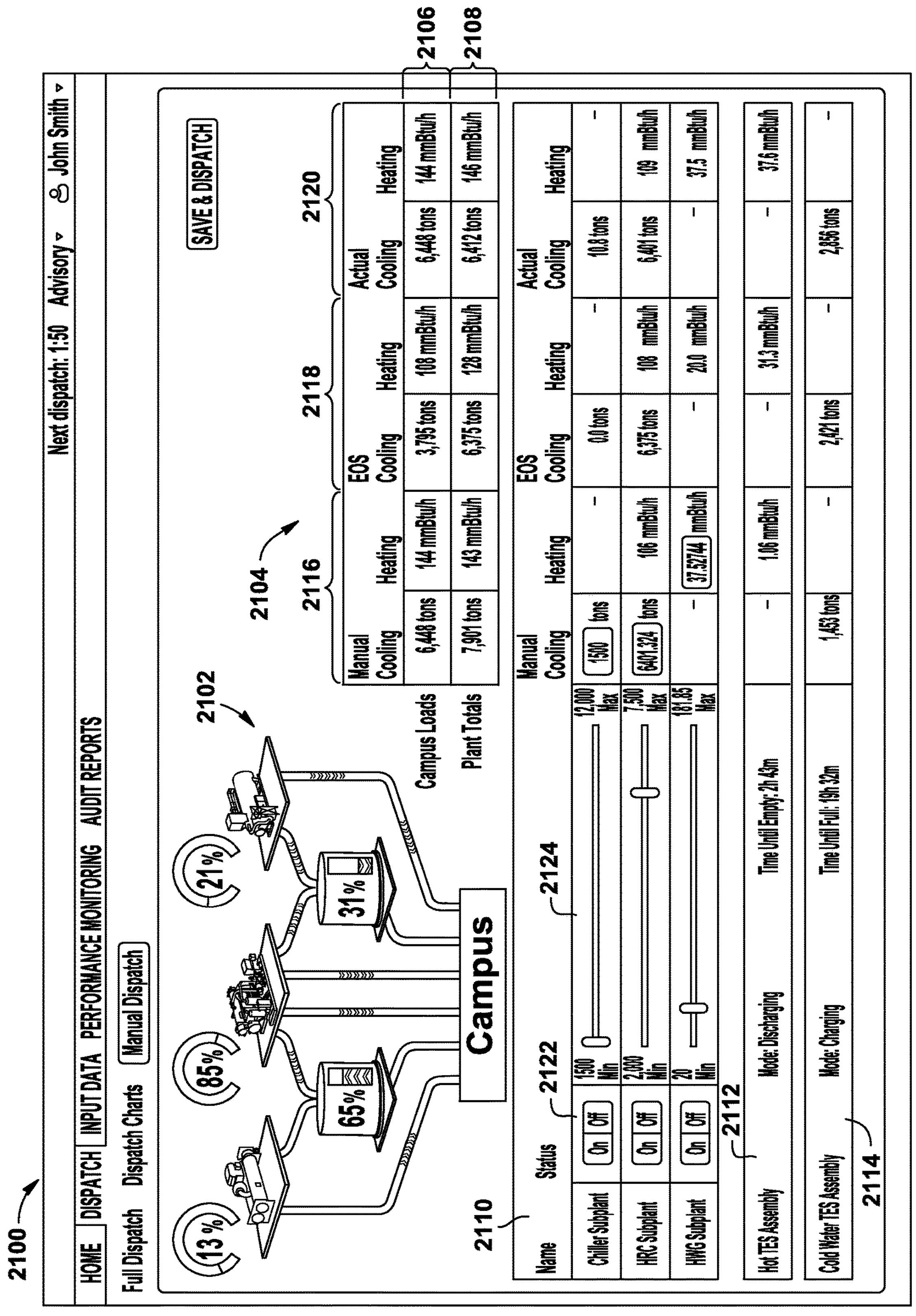
FIG. 21 is a drawing of a manual dispatch interface which may be generated by the EOS of FIG. 3 when the EOS is operating in an advisory mode, according to an exemplary embodiment.

Referring particularly to FIG. 21, manual dispatch interface 2100 is shown when EOS 302 is operating in advisory mode 1202. In advisory mode 1202, several of the user inputs to manual dispatch interface 2100 may be disabled or otherwise unavailable. For example, the options 2122 to switch subplants on/off or adjust the manual load setpoints 2124 for the subplants may be disabled when EOS 302 is operated in advisory mode 1202.

Figure 22:
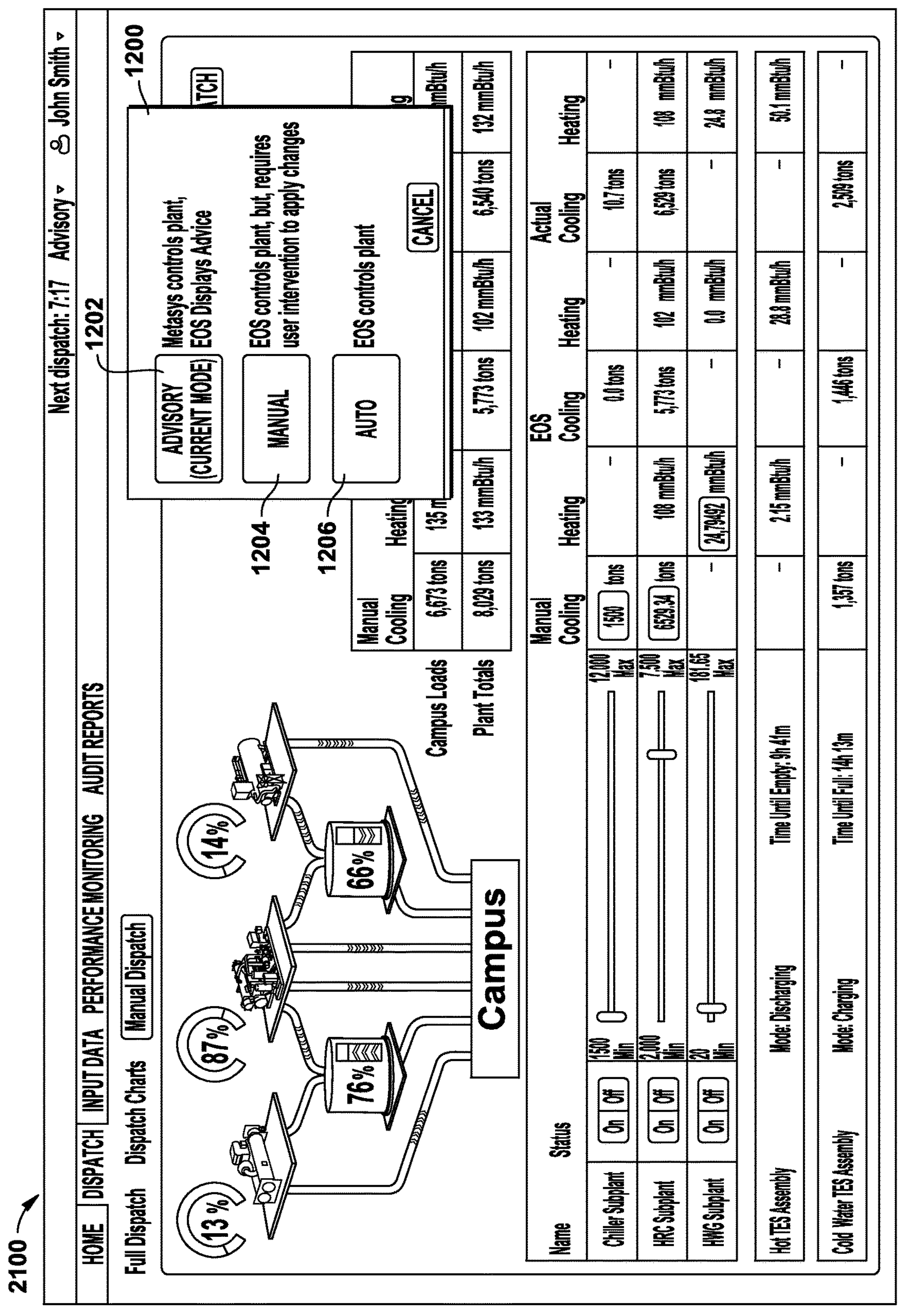
FIG. 22 is a drawing of the manual dispatch interface of FIG. 21 with an operating mode selector for switching the operating mode, according to an exemplary embodiment.

Referring now to FIG. 22, the operating mode of EOS 302 can be switched by selecting a different operating mode via the operating mode selector 1200. For example, a user can click the "Manual" button shown in operating mode selector 1200 to cause EOS 302 to begin operating in the manual operating mode 1204.

Figure 23:
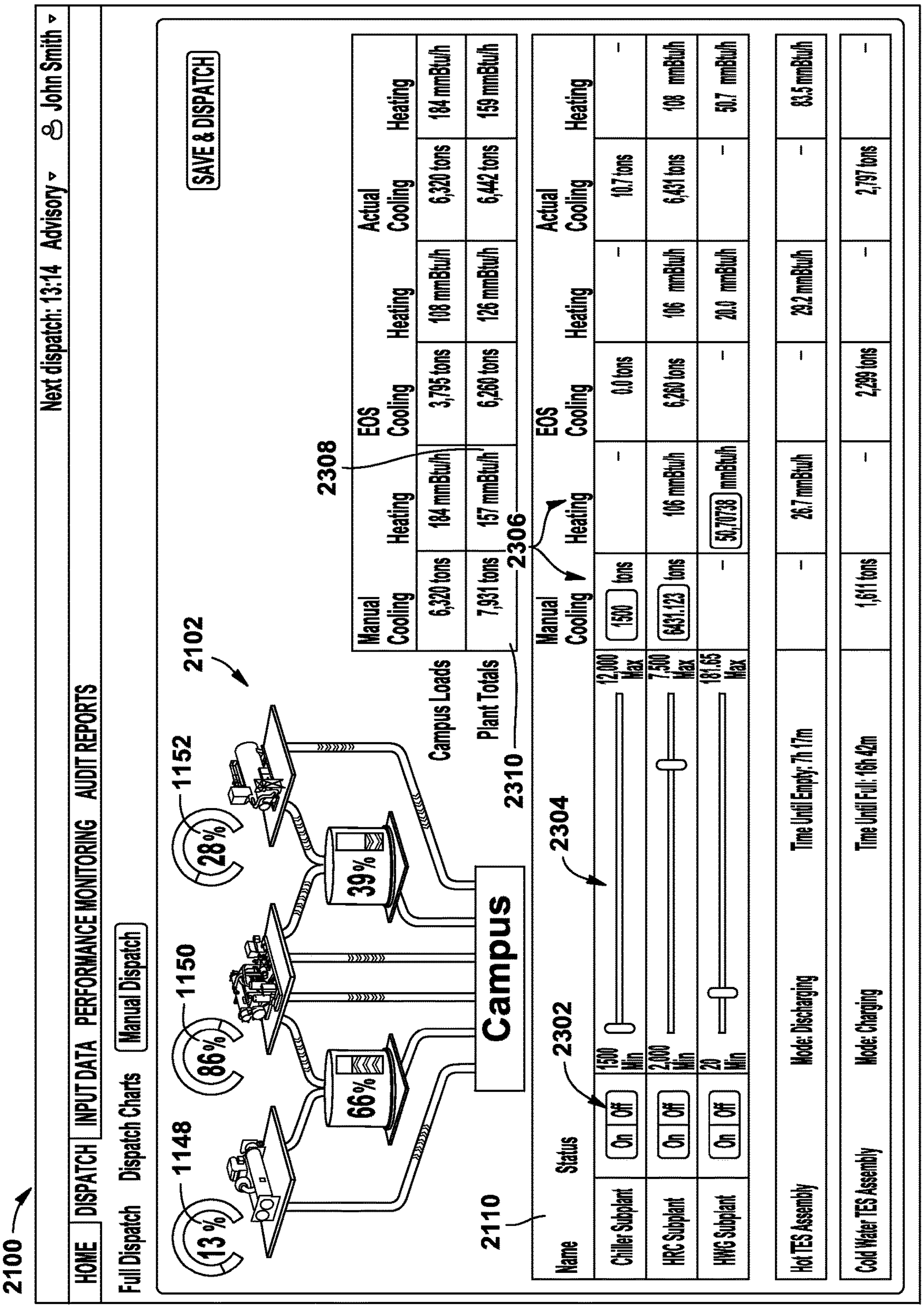
FIG. 23 is a drawing of the manual dispatch interface of FIG. 21 when the EOS is operating in a manual operating mode, according to an exemplary embodiment.

Referring now to FIG. 23, manual dispatch interface 2100 is shown when EOS 302 is operating in manual mode 1202. In manual mode 1202, several user inputs may be enabled to allow a user to change the status of each subplant and/or adjust the manual subplant loads. For example, the user can select the on/off buttons 2302 in the status column to switch the chiller subplant, HRC subplant, and the HWG subplant on/off. In response to switching a subplant off, manual dispatch interface 2100 may set the load setpoint(s) for the subplant to zero. The user can adjust the positions of the sliders 2304 in each subplant row to adjust the manual load setpoint for the subplant. Alternatively, the user can enter specific values for the manual subplant loads into the manual load columns 2306 of the subplant charts 2110 to the right of sliders 2304. Manual dispatch interface 2100 may sum the manual heating and cooling values in manual subplant load columns 2306 to calculate the total manual heating load 2308 and cooling load 2310 (shown in the plant totals row 2108 of summary chart 2104).

Figure 24:
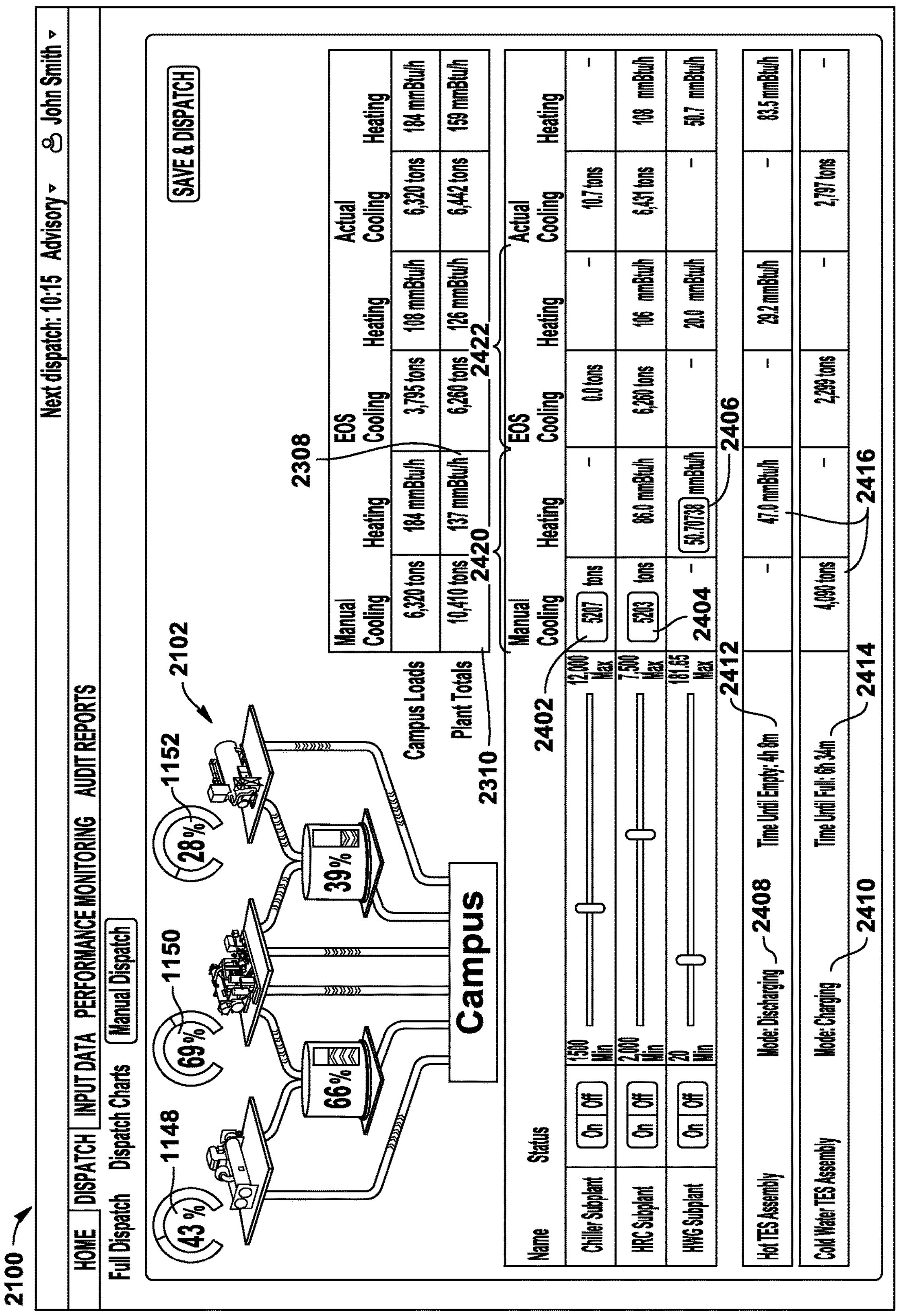
FIG. 24 is a drawing of the manual dispatch interface of FIG. 21 after a user has adjusted the manual subplant loads from the initial values shown in FIG. 23, according to an exemplary embodiment.

Referring now to FIG. 24, manual dispatch interface 2100 is shown after a user has adjusted the manual subplant loads 2402, 2404, and 2406 from the initial values shown in FIG. 23. In some embodiments, manual dispatch interface 2100 automatically updates plant summary graphic 2102 in response to a user adjusting manual subplant loads 2402-2406. For example, manual dispatch interface 2100 may automatically update the utilization percentages 1148-1152 for each of the subplants resulting from the adjusted manual subplant loads. Increasing manual cooling load 2402 of the chiller subplant may cause manual dispatch interface 2100 to increase the utilization percentage 1148 of the chiller subplant (e.g., from 13% in FIG. 23 to 43% in FIG. 24), whereas decreasing manual cooling load 2402 of the chiller subplant may cause manual dispatch interface 2100 to decrease the utilization percentage 1148 of the chiller subplant. Similarly, increasing manual heating or cooling load 2404 of the HRC subplant may cause manual dispatch interface 2100 to increase the utilization percentage 1150 of the HRC subplant, whereas decreasing manual heating or cooling load 2404 of the HRC subplant may cause manual dispatch interface 2100 to decrease the utilization percentage 1150 of the HRC subplant (e.g., from 86% in FIG. 23 to 69% in FIG. 24). Increasing manual heating load 2406 of the HWG subplant may cause manual dispatch interface 2100 to increase the utilization percentage 1152 of the HWG subplant, whereas decreasing manual heating load 2406 of the HWG subplant may cause manual dispatch interface 2100 to decrease the utilization percentage 1152 of the HWG subplant.

In some embodiments, EOS 302 is configured to determine whether the adjusted manual subplant loads 2402-2406 would result in overproduction or underproduction relative to the campus loads. Overproduction of the heating load may occur when the total heating load produced by the HRC subplant and HWG subplant exceeds the campus heating load, whereas underproduction of the heating load may occur when the total heating load produced by the HRC subplant and HWG subplant is less than the campus heating load. Similarly, overproduction of the cooling load may occur when the total cooling load produced by the chiller subplant and HRC subplant exceeds the campus cooling load, whereas underproduction of the cooling load may occur when the total cooling load produced by the chiller subplant and HRC subplant is less than the campus cooling load.

EOS 302 may be configured to compensate for overproduction and/or underproduction of the heating and cooling loads using the hot TES subplant and the cold TES subplant. For example, EOS 302 may compensate for overproduction of the heating and cooling loads by storing the excess (i.e., overproduced) thermal energy in the hot TES subplant and/or the cold IES subplant, thereby charging the TES subplant(s). Similarly, EOS 302 may compensate for underproduction of the heating and cooling loads by discharging thermal energy from the hot TES subplant and/or cold TES subplant to make up the difference between the load production and the campus loads.

Manual dispatch interface 2100 may indicate whether the manual subplant loads 2402-2406 would result in charging or discharging the hot TES subplant and/or the cold TES subplant. For example, manual dispatch interface 2100 is shown (in FIG. 24) to include an indication 2408 that the hot TES subplant would be discharging at a rate of 47.0 mmBTU/h to compensate for the underproduction of the manual heating load (i.e., 137 mmBTU/h) relative to the campus heating load (i.e., 184 mmBTU/h). Similarly, manual dispatch interface 2100 is shown to include an indication 2410 that the cold TES subplant would be charging at a rate of 4,090 tons to compensate for the overproduction of the manual cooling load (i.e., 10,410 tons) relative to the campus cooling load (i.e., 6,320 tons).

In some embodiments, EOS 302 is configured to determine the times until each of the TES subplants are fully depleted (i.e., "Time Until Empty") or filled to capacity (i.e., "Time Until Full") based on the current charge levels of the TES subplants and the rates at which the TES subplants are discharging or charging. Manual dispatch interface 2100 may present the determined times to a user. For example, manual dispatch interface 2100 is shown to include in indication 2412 that the hot TES subplant will be fully depleted in 4 hours and 8 minutes (i.e., "Time Until Empty: 4 h 8 m") if the discharge rate of 47 mmBTU/h is continued. Similarly, manual dispatch interface 2100 is shown to include in indication 2414 that the cold TES subplant will be filled to capacity in 6 hours and 34 minutes (i.e., "Time Until Full: 6 h 34 m") if the charge rate of 4,090 tons is continued.

In some embodiments, EOS 302 is configured to use manual subplant loads 2402-2406 to determine recommended equipment setpoints. For example, low level optimizer 330 may use manual subplant loads 2402-2406 to determine recommended equipment setpoints and/or equipment control signals that achieve manual subplant loads 2402-2406 for each of the subplants (as described with reference to FIGS. 9-10). The recommended equipment setpoints may be added to the detailed dispatch charts shown in FIGS. 17-19. In some embodiments, dispatch GUI generator 506 adds a new "manual" column for each of the variables shown in the detailed dispatch charts. The manual column may indicate the equipment setpoints that result from manual subplant loads 2402-2406. In some embodiments, dispatch GUI generator 506 adds the manual column in response to switching into manual operating mode 1204. In some embodiments, dispatch GUI generator 506 removes the manual column in response to switching into advisory operating mode 1202 or automatic operating mode 1206.

In some embodiments, dispatch GUI generator 506 updates dispatch GUI 1100-2100 in response to a user adjusting manual subplant loads 2402-2406. Updating dispatch GUI 1100-2100 may include updating manual plant totals 2308-2310 by summing manual heating and manual cooling loads 2402-2406, calculating an amount of overproduction or underproduction relative to the campus loads, and updating the charge or discharge rates 2416 of the TES subplants to compensate for the overproduction or underproduction. In some embodiments, updating dispatch GUI 1100-2100 includes updating plant summary graphic 2102 to reflect the adjusted subplant utilization percentages 1148-1152, updated indications 2408-2410 of whether the TES subplants are charging and discharging, and/or updated campus load percentages (i.e., the percentages indicating the portions of the total campus load provided by each of the subplants). Updating dispatch GUI 1100-2100 may include updating the equipment setpoints shown in the detailed dispatch charts based on manual subplant loads 2402-2406.

In some embodiments, dispatch GUI generator 506 updates dispatch GUI 1100-2100 prior to saving and dispatching manual subplant loads 2402-2406 and resultant equipment setpoints. Advantageously, this allows a user to view the changes estimated to result from manual subplant loads 2402-2406 (e.g., changed equipment setpoints, changed energy consumption, changed subplant utilization, etc.) before manual subplant loads 2402-2406 are dispatched and used to affect the operation of the central plant. The user can make any number of adjustments to manual subplant loads 2402-2406 prior to saving and dispatching manual subplant loads 2402-2406. With each adjustment, the estimated effects of the adjustment may be displayed to the user to allow the user to decide whether to dispatch manual subplant loads 2402-2406.

In some embodiments, dispatch GUI 1100-2100 concurrently presents both the manual subplant loads 2420 (i.e., manual subplant loads 2402-2406 and 2416) and the recommended subplant loads 2422 generated by EOS 302. For example, manual subplant loads 2420 and recommended subplant loads 2422 may be displayed concurrently in different columns of the same chart, as shown in FIGS. 21-24. This allows a user to easily compare manual subplant loads 2420 to recommended subplant loads 2422 without requiring the user to switch the operating mode. Similarly, dispatch GUI 1100-2100 may concurrently present both the equipment setpoints resulting from manual subplant loads 2420 and the recommended equipment setpoints determined automatically by EOS 302. For example, both sets of equipment setpoints may be displayed concurrently in different columns of full dispatch interface 1700. This allows a user to easily compare the recommended equipment setpoints with the equipment setpoints resulting from the manual load setpoints (i.e., resulting from manual subplant loads 2420) to determine whether the effects of the manual load setpoints are acceptable.

In some embodiments, dispatch GUI 1100-2100 displays a warning message if manual subplant loads 2420 would cause EOS 302 to violate a constraint or threshold condition. For example, EOS 302 may determine the estimated effects of manual subplant loads 2420 on resource consumption (e.g., electricity, natural gas, water, etc.), energy cost, subplant utilization, TES tank fill levels, building temperature, and other variables monitored and controlled by EOS 302. If manual subplant loads 2420 would cause any of the variables to violate a threshold condition for the variable, dispatch GUI 1100-2100 may display a message that informs the user of the expected result. For example, if a user specifies manual subplant loads 2420 that result in underproduction of the cooling load, dispatch GUI 1100-2100 may display a message that manual subplant loads 2420 will cause the cold TES tanks to fully deplete and may include the estimated time until the cold TES tanks are empty. As another example, dispatch GUI 1100-2100 may display a message that manual subplant loads 2420 will cause building temperature to exceed a maximum temperature threshold and may include an amount of time until the threshold violation is expected to occur. Dispatch GUI may 1100-2100 prompt the user to confirm manual subplant loads 2420 after presenting the warning message.

As previously described, EOS 302 may use manual subplant loads 2420 to override the optimal or recommended subplant load values 2422 determined by high level optimizer 330 when operating in manual mode 1204. However, EOS 302 may revert to the optimal or recommended subplant load values 2422 to avoid violating a constraint or threshold condition. For example, EOS 302 may use manual subplant loads 2420 to operate central plant 200 until the time at which continued use of manual subplant loads 2420 would violate the constraint or threshold, at which time EOS 302 may revert to optimal or recommended subplant loads 2422. In some embodiments, EOS 302 displays a message via dispatch GUI 1100-2100 indicating that manual subplant loads 2420 will be ignored in order to satisfy a constraint or threshold.

In some embodiments, EOS 302 automatically modifies manual subplant load setpoints 2420 to avoid violating a constraint or threshold condition. EOS 302 may determine values for manual subplant loads 2420 that are similar to the user-specified subplant load values but will not result in the constraint of threshold being violated. In some embodiments, EOS 302 determines values for the manual subplant loads 2420 that are as close as possible to the user-specified subplant load values without violating constraints or thresholds. EOS 302 may present the determined subplant load values to the user via dispatch GUI 1100-2100 and prompt the user to either accept the modified manual subplant load values or use the user-specified subplant load values.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for monitoring and controlling a central plant having a plurality of subplants configured to serve thermal energy loads, the system comprising:

a high level optimizer configured to determine recommended subplant loads for each of the plurality of subplants as an output of an optimization process;

a user interface configured to receive one or more values of manual subplant loads provided by a user, the manual subplant loads overriding the recommended subplant loads output by the optimization process;

a dispatch graphical user interface (GUI) generator configured to generate a dispatch GUI and present the dispatch GUI via the user interface, the dispatch GUI concurrently comprising the recommended subplant loads and the manual subplant loads;

a low level optimizer configured to determine recommended equipment setpoints for equipment of the central plant based on at least one of the recommended subplant loads and the manual subplant loads; and a building automation system configured to provide control signals for the equipment of the central plant based on the recommended equipment setpoints.

2. The system of claim 1, wherein the high level optimizer is configured to perform the optimization process subject to a plurality of constraints, and wherein the system is configured to operate in:

an automatic operating mode in which the low level optimizer is configured to determine a first set of recommended equipment setpoints to achieve the recommended subplant loads in response to a determination that the manual subplant loads violate one or more of the plurality of constraints; and a manual operating mode in which the low level optimizer is configured to determine a second set of recommended equipment setpoints to achieve the manual subplant loads in response to a determination that the manual subplant loads satisfy the plurality of constraints.

3. The system of claim 1, wherein the high level optimizer is configured to determine an amount of overproduction or underproduction resulting from the manual subplant loads by comparing the manual subplant loads to a required thermal energy load of a building or campus served by the central plant.

4. The system of claim 3, wherein:

the plurality of subplants comprise a thermal energy storage subplant; and the dispatch GUI comprises an indication of an amount of time until the thermal energy storage subplant is (1) fully depleted based on an amount of underproduction or (2) filled to capacity based on the amount of overproduction.

5. The system of claim 1, wherein the dispatch GUI generator is configured to update the dispatch GUI in response to a change in the manual subplant loads, the change resulting in changed manual subplant loads.

6. The system of claim 5, wherein updating the dispatch GUI comprises:

updating the recommended equipment setpoints based on the changed manual subplant loads; and presenting the updated equipment setpoints via the dispatch GUI.

7. The system of claim 6, wherein the dispatch GUI generator is configured to update the dispatch GUI before dispatching the changed manual subplant loads or the updated equipment setpoints to the central plant.

8. A system for monitoring and controlling a central plant having a plurality of subplants configured to serve a thermal energy load, the system comprising:

a high level optimizer configured to determine recommended subplant loads for each of the plurality of subplants as an output of an optimization process;

a subplant monitor configured to monitor the central plant and identify actual subplant loads for each of the plurality of subplants;

a user interface configured to receive one or more values of manual subplant loads provided by a user, the manual subplant loads overriding the recommended subplant loads output by the optimization process; and a dispatch graphical user interface (GUI) generator configured to generate a dispatch GUI and present the dispatch GUI via the user interface, the dispatch GUI concurrently comprising the recommended subplant loads, the actual subplant loads, and the manual subplant loads; and a building automation system configured to provide control signals for equipment of the central plant based on the recommended subplant loads, the actual subplant loads, or the manual subplant loads.

9. The system of claim 8, wherein the thermal energy load comprises at least one of a heating load and a cooling load.

10. The system of claim 8, further comprising a subplant utilization database configured to store the recommended subplant loads, the actual subplant loads, and the manual subplant loads for each of a plurality of past dispatch intervals.

11. The system of claim 10, wherein:

the dispatch GUI comprises at least one of the recommended subplant loads, the actual subplant loads, and the manual subplant loads for each of the plurality of past dispatch intervals; and the dispatch GUI comprises at least one of the recommended subplant loads and the manual subplant loads for a plurality of future dispatch intervals.

12. The system of claim 8, further comprising a low level optimizer configured to determine recommended equipment setpoints for the equipment within each of the plurality of subplants based on at least one of the recommended subplant loads and the manual subplant loads.

13. The system of claim 12, wherein the low level optimizer is configured to:

in response to a determination that the manual subplant loads violate one or more optimization constraints, provide a first set of recommended equipment setpoints based on the recommended subplant loads; and in response to a determination that the manual subplant loads do not violate the one or more optimization constraints, provide a second set of recommended equipment setpoints based on the manual subplant loads.

14. The system of claim 12, wherein the building automation system is configured to provide the control signals for the equipment within each of the plurality of subplants based on the recommended equipment setpoints.

15. The system of claim 8, wherein the dispatch GUI comprises an operating mode selector configured to display a plurality of operating modes and to receive a user selection of one of the operating modes;

the plurality of operating modes comprising an automatic operating mode, an advisory operating mode, and a manual operating mode.

16. The system of claim 8, wherein:

the plurality of subplants comprise a thermal energy storage subplant; and the dispatch GUI comprises an indication of an amount of overproduction or underproduction of the thermal energy load based on the manual subplant loads.

17. The system of claim 8, wherein the dispatch GUI generator is configured to update the dispatch GUI in response to a change in the manual subplant loads.

18. A system for monitoring and controlling a central plant having a plurality of subplants configured to serve thermal energy loads, the system comprising:

a central plant optimizer configured to determine recommended subplant load setpoints for each of the plurality of subplants as an output of an optimization process and equipment setpoints to achieve the recommended subplant load setpoints;

a user interface configured to receive one or more values of manual subplant load setpoints provided by a user, the manual subplant loads overriding the output of the optimization process;

a dispatch graphical user interface (GUI) generator configured to generate a dispatch GUI and present the dispatch GUI via the user interface, the dispatch GUI concurrently comprising the manual subplant load setpoints and at least one of the recommended subplant load setpoints and equipment setpoints for each of a plurality of dispatch intervals; and a building automation system configured to provide control signals for equipment of the central plant based on the equipment setpoints.

19. The system of claim 18, wherein the plurality of dispatch intervals comprises a past dispatch interval, a present dispatch interval, and a future dispatch interval.

20. The system of claim 19, wherein the dispatch GUI generator is configured to:

populate the past dispatch interval with actual dispatch data received from the central plant;

populate the present dispatch interval with at least one of:

recommended dispatch data based on the recommended subplant load setpoints determined by the central plant optimizer, and manual dispatch data based on the manual subplant load setpoints specified by the user via the user interface; and populate the future dispatch interval with recommended dispatch data based on recommended future subplant loads determined by the central plant optimizer.

* * * * *